United States Patent
Zhang et al.

(10) Patent No.: US 12,105,518 B1
(45) Date of Patent: Oct. 1, 2024

(54) AUTONOMOUS PLATFORM GUIDANCE SYSTEMS WITH UNKNOWN ENVIRONMENT MAPPING

(71) Applicant: TRIFO, INC., Santa Clara, CA (US)

(72) Inventors: Zhe Zhang, Sunnyvale, CA (US); Qingyu Chen, Campbell, CA (US); Yen-Cheng Liu, Santa Clara, CA (US); Weikai Li, Santa Clara, CA (US)

(73) Assignee: TRIFO, INC., Santa Clara, CA (US)

( * ) Notice: Subject to any disclaimer, the term of this patent is extended or adjusted under 35 U.S.C. 154(b) by 0 days.

(21) Appl. No.: 18/373,919

(22) Filed: Sep. 27, 2023

Related U.S. Application Data

(62) Division of application No. 16/724,087, filed on Dec. 20, 2019, now Pat. No. 11,774,983.

(60) Provisional application No. 62/787,690, filed on Jan. 2, 2019.

(51) Int. Cl.
*G05D 1/00* (2024.01)
*G01C 21/00* (2006.01)
*G06T 7/73* (2017.01)

(52) U.S. Cl.
CPC ......... *G05D 1/0253* (2013.01); *G01C 21/005* (2013.01); *G01C 21/3804* (2020.08); *G05D 1/0251* (2013.01); *G05D 1/0272* (2013.01); *G06T 7/74* (2017.01); *G06T 2207/30244* (2013.01)

(58) Field of Classification Search
CPC .... G01C 21/005; G01C 21/32; G05D 1/0251; G05D 1/0253; G05D 1/0272; G06T 2207/30244
See application file for complete search history.

(56) References Cited

U.S. PATENT DOCUMENTS

| | | |
|---|---|---|
| 8,380,384 B2 | 2/2013 | Lee et al. |
| 8,565,958 B1 | 10/2013 | Montemerlo et al. |
| 8,655,094 B2 | 2/2014 | Miller et al. |
| 8,774,517 B1 | 7/2014 | Khosla et al. |
| 8,787,700 B1 | 7/2014 | Aly et al. |
| 8,824,802 B2 | 9/2014 | Kutliroff et al. |
| 8,825,391 B1 | 9/2014 | Urmson et al. |

(Continued)

FOREIGN PATENT DOCUMENTS

| | | |
|---|---|---|
| CN | 104764452 A | 7/2015 |
| CN | 105184776 A | 12/2015 |

(Continued)

OTHER PUBLICATIONS

Liang X. Research on Robot Indoor Localization and Mapping Based on Integration of Laser and Monocular Vision (Year: 2016).*

(Continued)

*Primary Examiner* — Charles J Han

(74) *Attorney, Agent, or Firm* — HAYNES BEFFEL & WOLFELD LLP; Ernest J. Beffel, Jr.; Paul A. Durdik

(57) ABSTRACT

The described positional awareness techniques employing sensory data gathering and analysis hardware with reference to specific example implementations implement improvements in the use of sensors, techniques and hardware design that can enable specific embodiments to find new area to cover by a robot performing an area coverage task of an unexplored area. The sensory data are gathered from an operational camera and one or more auxiliary sensors.

7 Claims, 30 Drawing Sheets

(56) References Cited

U.S. PATENT DOCUMENTS

| | | |
|---|---|---|
| 9,026,941 B1 | 5/2015 | Krueger et al. |
| 9,058,563 B1 | 6/2015 | Krueger et al. |
| 9,076,212 B2 | 7/2015 | Ernst et al. |
| 9,280,576 B2 | 3/2016 | Trotta et al. |
| 9,378,431 B2 | 6/2016 | Stoeffler et al. |
| 9,420,265 B2 | 8/2016 | Taguchi et al. |
| 9,519,289 B2 | 12/2016 | Munich et al. |
| 9,607,428 B2 | 3/2017 | Li |
| 9,751,210 B2 | 9/2017 | Fong et al. |
| 9,836,653 B2 | 12/2017 | Schnittman |
| 9,965,689 B2 | 5/2018 | dos Santos Mendonca et al. |
| 10,032,276 B1 | 7/2018 | Liu et al. |
| 10,043,076 B1 | 8/2018 | Zhang et al. |
| 10,162,362 B2 | 12/2018 | Tsai et al. |
| 10,222,805 B2 | 3/2019 | Munich et al. |
| 10,395,117 B1 | 8/2019 | Zhang et al. |
| 10,402,663 B1 | 9/2019 | Tsai et al. |
| 10,423,832 B1 | 9/2019 | Zhang et al. |
| 10,444,761 B2 | 10/2019 | Liu et al. |
| 10,453,213 B2 | 10/2019 | Tsai et al. |
| 10,496,103 B2 | 12/2019 | Tsai et al. |
| 10,571,925 B1 | 2/2020 | Zhang et al. |
| 10,571,926 B1 | 2/2020 | Zhang et al. |
| 10,755,428 B2 | 8/2020 | Aswin |
| 10,769,440 B1 | 9/2020 | Zhang et al. |
| 10,832,056 B1 | 11/2020 | Zhang et al. |
| 10,929,690 B1 | 2/2021 | Tsai et al. |
| 10,943,361 B2 | 3/2021 | Tsai et al. |
| 10,983,527 B2 | 4/2021 | Tsai et al. |
| 11,126,196 B2 | 9/2021 | Zhang et al. |
| 11,314,262 B2 | 4/2022 | Zhang et al. |
| 11,328,158 B2 | 5/2022 | Zhang et al. |
| 11,398,096 B2 | 7/2022 | Zhang et al. |
| 2001/0043738 A1 | 11/2001 | Sawhney et al. |
| 2007/0156286 A1 | 7/2007 | Yamauchi |
| 2008/0249732 A1 | 10/2008 | Lee et al. |
| 2009/0234499 A1 | 9/2009 | Nielsen et al. |
| 2009/0285450 A1 | 11/2009 | Kaiser et al. |
| 2009/0319170 A1 | 12/2009 | Madsen et al. |
| 2010/0045701 A1 | 2/2010 | Scott et al. |
| 2010/0094460 A1 | 4/2010 | Choi et al. |
| 2010/0121601 A1 | 5/2010 | Eckert |
| 2010/0220173 A1 | 9/2010 | Anguelov et al. |
| 2011/0044543 A1 | 2/2011 | Nakamura et al. |
| 2011/0288684 A1 | 11/2011 | Farlow et al. |
| 2012/0121161 A1 | 5/2012 | Eade et al. |
| 2012/0201469 A1 | 8/2012 | Livet et al. |
| 2013/0120736 A1 | 5/2013 | Bosse et al. |
| 2013/0282208 A1 | 10/2013 | Mendez-Rodriguez et al. |
| 2013/0335554 A1 | 12/2013 | Brunner et al. |
| 2014/0207282 A1 | 7/2014 | Angle et al. |
| 2014/0369557 A1 | 12/2014 | Kayombya et al. |
| 2015/0012209 A1 | 1/2015 | Park et al. |
| 2015/0071524 A1 | 3/2015 | Lee |
| 2015/0219767 A1 | 8/2015 | Humphreys et al. |
| 2015/0221133 A1 | 8/2015 | Groten et al. |
| 2015/0268058 A1 | 9/2015 | Samarasekera et al. |
| 2015/0369609 A1 | 12/2015 | Roumeliotis et al. |
| 2016/0063330 A1 | 3/2016 | Xu et al. |
| 2016/0144511 A1 | 5/2016 | Romanov et al. |
| 2016/0188977 A1 | 6/2016 | Kearns et al. |
| 2016/0209217 A1 | 7/2016 | Babu et al. |
| 2016/0246302 A1 | 8/2016 | Liao et al. |
| 2016/0327653 A1 | 11/2016 | Humphreys et al. |
| 2016/0364835 A1 | 12/2016 | Srebnik et al. |
| 2017/0004630 A1 | 1/2017 | Al-Hamad et al. |
| 2017/0010109 A1 | 1/2017 | Hayon et al. |
| 2017/0028556 A1 | 2/2017 | Summer et al. |
| 2017/0083748 A1 | 3/2017 | Zhou et al. |
| 2017/0089948 A1 | 3/2017 | Ho et al. |
| 2017/0157769 A1 | 6/2017 | Aghamohammadi et al. |
| 2017/0206418 A1 | 7/2017 | Schnittman |
| 2017/0277197 A1 | 9/2017 | Liao et al. |
| 2017/0357873 A1 | 12/2017 | Roimela et al. |
| 2018/0035606 A1 | 2/2018 | Burdoucci |
| 2018/0074508 A1 | 3/2018 | Kleiner et al. |
| 2018/0082128 A1 | 3/2018 | Cameron et al. |
| 2018/0158197 A1 | 6/2018 | Dasgupta et al. |
| 2018/0188032 A1 | 7/2018 | Ramanandan et al. |
| 2018/0224286 A1 | 8/2018 | Pickering et al. |
| 2018/0231385 A1 | 8/2018 | Fourie et al. |
| 2018/0239355 A1 | 8/2018 | Lee et al. |
| 2019/0025851 A1 | 1/2019 | Ebrahimi Afrouzi |
| 2019/0197769 A1 | 6/2019 | Khosrowpour |
| 2020/0043130 A1* | 2/2020 | Qi .................. G06T 7/44 |
| 2020/0241554 A1 | 7/2020 | Takahashi et al. |

FOREIGN PATENT DOCUMENTS

| | | |
|---|---|---|
| CN | 106525003 A | 3/2017 |
| CN | 106537186 A | 3/2017 |
| CN | 106681330 A | 5/2017 |
| CN | 107137026 A | 9/2017 |
| CN | 107153247 A | 9/2017 |
| CN | 107235013 A | 10/2017 |
| CN | 107241441 A | 10/2017 |
| CN | 107273881 A | 10/2017 |
| CN | 107291080 A | 10/2017 |
| CN | 107323301 A | 11/2017 |
| CN | 107329478 A | 11/2017 |
| CN | 107444179 A | 12/2017 |
| CN | 107451611 A | 12/2017 |
| CN | 107462892 A | 12/2017 |
| CN | 107562660 A | 1/2018 |
| CN | 206932609 U | 1/2018 |
| CN | 206932645 U | 1/2018 |
| CN | 206932646 U | 1/2018 |
| CN | 206932647 U | 1/2018 |
| CN | 206932653 U | 1/2018 |
| CN | 206932676 U | 1/2018 |
| CN | 206932680 U | 1/2018 |
| CN | 206932902 U | 1/2018 |
| CN | 206935560 U | 1/2018 |
| CN | 206946068 U | 1/2018 |
| CN | 207070610 U | 3/2018 |
| CN | 207070612 U | 3/2018 |
| CN | 207070613 U | 3/2018 |
| CN | 207070619 U | 3/2018 |
| CN | 207070621 U | 3/2018 |
| CN | 207070629 U | 3/2018 |
| CN | 207070630 U | 3/2018 |
| CN | 207070638 U | 3/2018 |
| CN | 207070639 U | 3/2018 |
| CN | 207070641 U | 3/2018 |
| CN | 207070652 U | 3/2018 |
| CN | 207070703 U | 3/2018 |
| CN | 207070709 U | 3/2018 |
| CN | 207070710 U | 3/2018 |
| CN | 207071933 U | 3/2018 |
| CN | 207073092 U | 3/2018 |
| CN | 207074202 U | 3/2018 |
| CN | 207074269 U | 3/2018 |
| CN | 207074560 U | 3/2018 |
| CN | 207151236 U | 3/2018 |
| CN | 207151465 U | 3/2018 |
| CN | 207152927 U | 3/2018 |
| CN | 207154149 U | 3/2018 |
| CN | 207154238 U | 3/2018 |
| CN | 207155071 U | 3/2018 |
| CN | 207155773 U | 3/2018 |
| CN | 207155774 U | 3/2018 |
| CN | 207155775 U | 3/2018 |
| CN | 207155776 U | 3/2018 |
| CN | 207155817 U | 3/2018 |
| CN | 207155818 U | 3/2018 |
| CN | 207155819 U | 3/2018 |
| CN | 207155840 U | 3/2018 |
| CN | 207155841 U | 3/2018 |
| CN | 207157464 U | 3/2018 |
| CN | 207158940 U | 3/2018 |
| CN | 207159724 U | 3/2018 |
| CN | 207159810 U | 3/2018 |
| CN | 207159811 U | 3/2018 |
| CN | 207159812 U | 3/2018 |

(56) References Cited

FOREIGN PATENT DOCUMENTS

| | | | |
|---|---|---|---|
| CN | 207159840 | U | 3/2018 |
| CN | 207159970 | U | 3/2018 |
| CN | 207160626 | U | 3/2018 |
| CN | 207164589 | U | 3/2018 |
| CN | 207164772 | U | 3/2018 |
| CN | 107958285 | A | 4/2018 |
| CN | 107958451 | A | 4/2018 |
| CN | 107976999 | A | 5/2018 |
| CN | 108010271 | A | 5/2018 |
| CN | 207321871 | U | 5/2018 |
| CN | 207321872 | U | 5/2018 |
| CN | 207321889 | U | 5/2018 |
| CN | 207322208 | U | 5/2018 |
| CN | 207322217 | U | 5/2018 |
| CN | 207328169 | U | 5/2018 |
| CN | 207328170 | U | 5/2018 |
| CN | 207328818 | U | 5/2018 |
| CN | 207328819 | U | 5/2018 |
| CN | 207336762 | U | 5/2018 |
| CN | 207354913 | U | 5/2018 |
| CN | 207356393 | U | 5/2018 |
| CN | 207356394 | U | 5/2018 |
| CN | 207356420 | U | 5/2018 |
| CN | 207356421 | U | 5/2018 |
| CN | 207356422 | U | 5/2018 |
| CN | 207356963 | U | 5/2018 |
| CN | 207359050 | U | 5/2018 |
| CN | 207360243 | U | 5/2018 |
| CN | 207367052 | U | 5/2018 |
| CN | 207367336 | U | 5/2018 |
| CN | 207369157 | U | 5/2018 |
| CN | 207443447 | U | 6/2018 |
| CN | 207443493 | U | 6/2018 |
| EP | 3224649 | A1 | 10/2017 |
| JP | 2017053820 | A | 3/2017 |
| JP | 2017538208 | A | 12/2017 |
| WO | 0077786 | A1 | 12/2000 |
| WO | 2012040644 | A1 | 3/2012 |
| WO | 2016085717 | A1 | 6/2016 |

OTHER PUBLICATIONS

Multilateration—Wikipedia, http://en.wikipedia.org/w/index.php?title=Multilateration&oldid=523281858, accessed Mar. 8, 2018, 5 pages.

OpenCV—Camera Calibration and 3D Reconstruction, Open Source Computer Vision, https://docs.opencv.org/master/d9/d0c/group_calib3d.html (accessed Feb. 13, 2018), 50 pages.

CN 201810616266.7—First Office Action, 16 pages with English Translation.

CN 201810616266.7—Notice to Grant, 3 pages with English Translation.

Liang, "Research on Robot Indoor Localization and Mapping Based on Integration of Laser and Monocular Vision," 2016, 67 pages.

Rublee et al., "ORB: An efficient alternative to SIFT or SURF." Computer Vision (ICCV), 2011 IEEE international conference on. IEEE, 2011, 8 pages.

ORB Feature Detector and Binary Descriptor, http://scikit-image.org/docs/dev/auto_examples/features_detection/plot_orb.html (accessed Feb. 13, 2018), 3 pages.

Multilateration—Wikipedia, http://en.wikipedia.org/w/index.php?title=Multilaterationoldid=523281858, accessed Mar. 8, 2018, 5 pages.

OpenCV—Camera Calibration and 3D Reconstruction, Open Source Computer Vision, https://docs.opencv.org/master/d9/doc/group_calib3d.html (accessed Feb. 13, /2018), 50 pages.

Endres, Felix, et al., "An Evaluation of the RGB-D Slam System", May 14, 2012, 6 pages.

Li, et.al., "High-precision, consistent EKF-based visual-inertial odometry", International Journal of Robotics Research, May 2013, 2 pages, [retrieved on Aug. 22, 2016]. Retrieved from the Internet: < http://ijr.sagepub.com/content/32/6/690.abstract>.

Mur-Artal, et al., ORB-SLAM: A Versatile and Accurate Monocular SLAM System, abstract, IEEE Transactions on Robotics, 2015. vol 31, Issue 5, 2 pages, [retrieved on Aug. 22, 2016]. Retrieved from the Internet: < >.

How Oculus Rift works: Everything you need to knowabout the VR sensation, 15 -pages, [retrieved on Jul. 8, 2016]. Retrieved from the Internet: <http://www.wareable.com/oculus-rift/how-oculus-rift-works>.

Wahba, "A least squares estimate of satellite attitude," SIAM review 7, No. 3 (1965): 409-409.

EP 18182408.7—Extended European Search Report dated Nov. 21, 2018, 12 pages.

EP 18184739.3—Extended Search Report dated Jan. 30, 2019, 8 pages.

EP 18184739.3—Response to Extended Search Report dated Jan. 30, 2019, as filed Aug. 21, 2019, 23 pages.

CN-201810818972.X, Request for Examination Filed Jul. 17, 2020, 16 pages of with English translation.

EP 18184739.3—Communication under Rule 71(3) dated Jul. 22, 2020, 93 pages.

EP 18182408.7—Response to Extended European Search Report dated Nov. 21, 2018, as filed Jun. 27, 2019, 24 pages.

EP 18182408.7—Communication under Rule 71(3) dated Sep. 29, 2020, 79 pages.

CN 201810616266.7-Request for Examination Filed Jun. 15, 2020, 22 pages with English Translation.

CN 201810616266.7—Voluntary Amendments filed Aug. 11, 2020 w/English Translation of Updated Claims, 26 pages.

Cadena et al., "Past Present, and Future of Simultaneous Localization and Mapping: Toward the Robust-Perception Age", IEEE Transactions on Robotics, IEEE Service Center, Piscataway, NJ, US, vol. 32, No. 6, Dec. 1, 2016, pp. 1309-1332 (Part 1 of 2).

CN 201810818972.X—First Office Action dated Feb. 3, 2023, 11 pages.

CN 201810818972.X—Notification to Grant dated Jul. 16, 2023, 4 pages.

EP 18184739.3—Decision to Grant dated Dec. 10, 2020, 2 pages.

CN 201810616266.7—First Office Action received Jan. 11, 2023, 16 pages with English Translation.

CN 201810616266.7—Notice to Grant received Jun. 8, 2023, 3 pages with English Translation.

\* cited by examiner

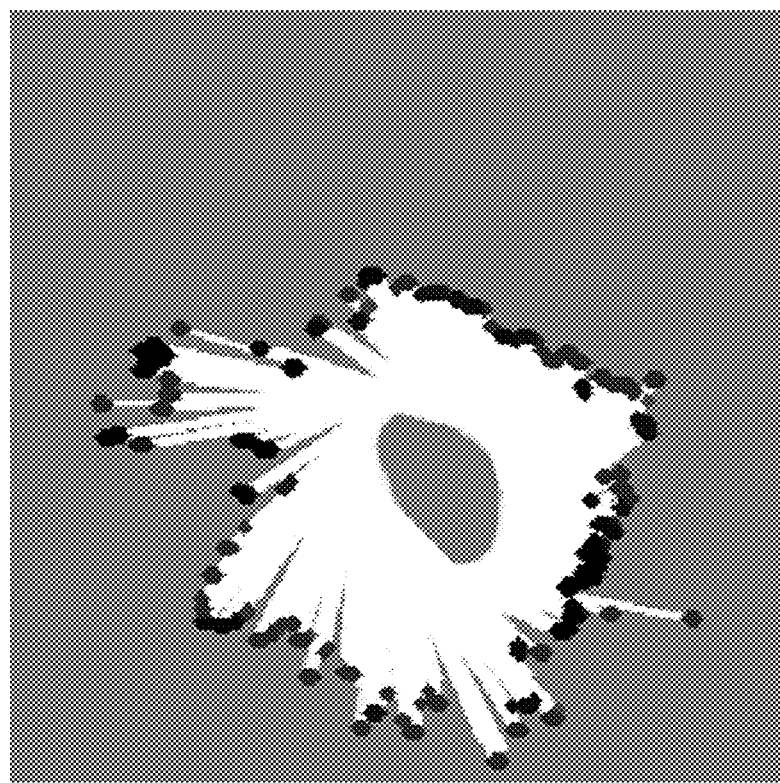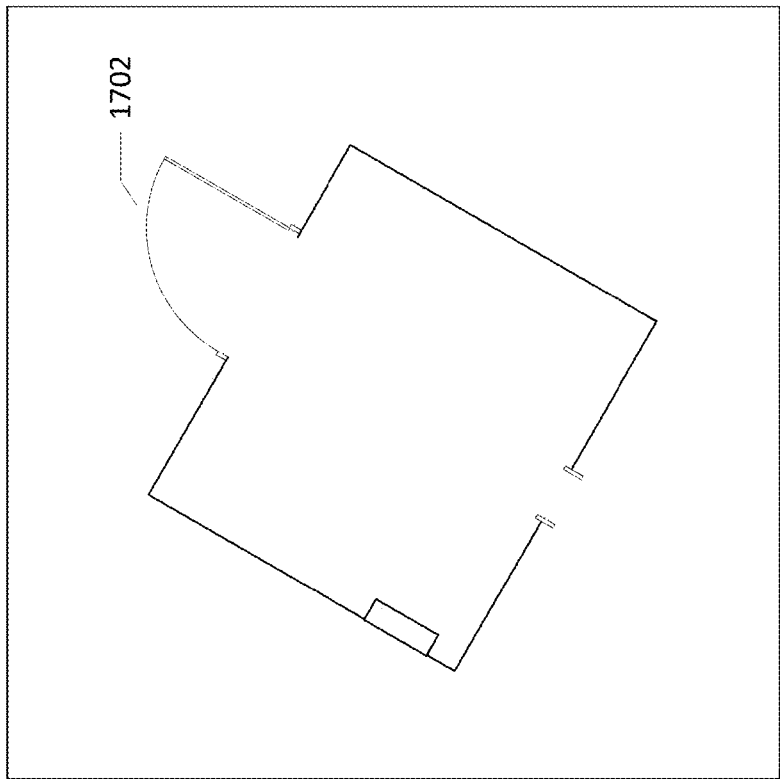
FIG. 17

AUTONOMOUS PLATFORM GUIDANCE SYSTEMS WITH UNKNOWN ENVIRONMENT MAPPING

RELATED APPLICATIONS

This application a is divisional application of U.S. application Ser. No. 16/724,087, filed Dec. 20, 2019, entitled "PREDICTIVE INFORMATION FOR FREE SPACE GESTURE CONTROL AND COMMUNICATION,", which claims the benefit of U.S. Provisional Patent Application No. 62/787,690, entitled "AUTONOMOUS PLATFORM GUIDANCE SYSTEMS WITH UNKNOWN ENVIRONMENT MAPPING," filed Jan. 2, 2019, which provisional application is hereby incorporated by reference in its entirety for all purposes.

INCORPORATIONS

The following U.S. patent applications are incorporated by reference herein: U.S. patent application Ser. No. 15/658,279 filed Jul. 24, 2017, which application is a continuation-in-part of U.S. patent application Ser. No. 15/250,393 filed Aug. 29, 2016.

The following U.S. patent applications are incorporated by reference herein: U.S. patent application Ser. No. 15/623,106 filed Jun. 14, 2017, U.S. patent application Ser. No. 15/648,372 filed Jul. 12, 2017 and U.S. patent application Ser. No. 15/250,581 filed Aug. 29, 2016.

The following U.S. patent applications are incorporated by reference herein: U.S. patent application Ser. No. 16/197,329 filed Nov. 20, 2018 and U.S. patent application Ser. No. 16/197,330 filed Nov. 20, 2018.

FIELD OF THE TECHNOLOGY DISCLOSED

The technology disclosed generally relates to detecting location and positioning of a robot, and more particularly relates to application of recovering a robot that has lost track of its position or location while performing an area coverage task employing visual processing, inertial sensor data and wheel odometry data to positioning and guidance technologies.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Autonomous robots have long been the stuff of science fiction fantasy. One technical challenge in realizing the truly autonomous robot is the need for the robot to be able to identify where they are, where they have been and plan where they are going. Traditional Simultaneous Localization and Mapping (SLAM) techniques have improved greatly in recent years; however, there remains considerable technical challenge to providing fast accurate and reliable positional awareness to robots and self-guiding mobile platforms. Further, solutions in the field of task planning fail to include sensory data captured in real time, and thus are incapable of conducting planning or altering plans based upon changing conditions sensed in real time.

One especially challenging area involves planning and executing tasks in a complex area involving recognizing a location and obstructions accurately and quickly. A variety of different approaches have been tried. For example RFID/WiFi approaches have proven to be expensive and of limited accuracy. Depth sensor based approaches have been found to be high cost and suffer from power drain and interference issues. Marker based approaches require markers placed within the work area—limiting the useful area in which the device can operate. Visual approaches currently are slow leading to failure when used in fast motion applications. Such approaches can also suffer scale ambiguity. Yet these implementations failed to live up to the standards required for widespread adoption.

Conventional approaches are not sufficiently robust to deal with the robot that has lost track of its position. In conventional approaches, the robot experiences difficulty relocalizing itself when it has lost track. This situation is very common in the floor coverage application scenarios in which the robot needs to cover as much area as possible. When robot is close to wall, under some furniture, or the like, it is very likely unable to track successfully using visual information. We propose herein a variety of unique and heretofore not implemented techniques for dealing with robot that has lost its way.

The challenge of providing fast reliable affordable positional awareness to robotic devices heretofore remained largely unsolved.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 17 illustrates an example of an occupancy grid map in one implementation.

DESCRIPTION

Figure 1:
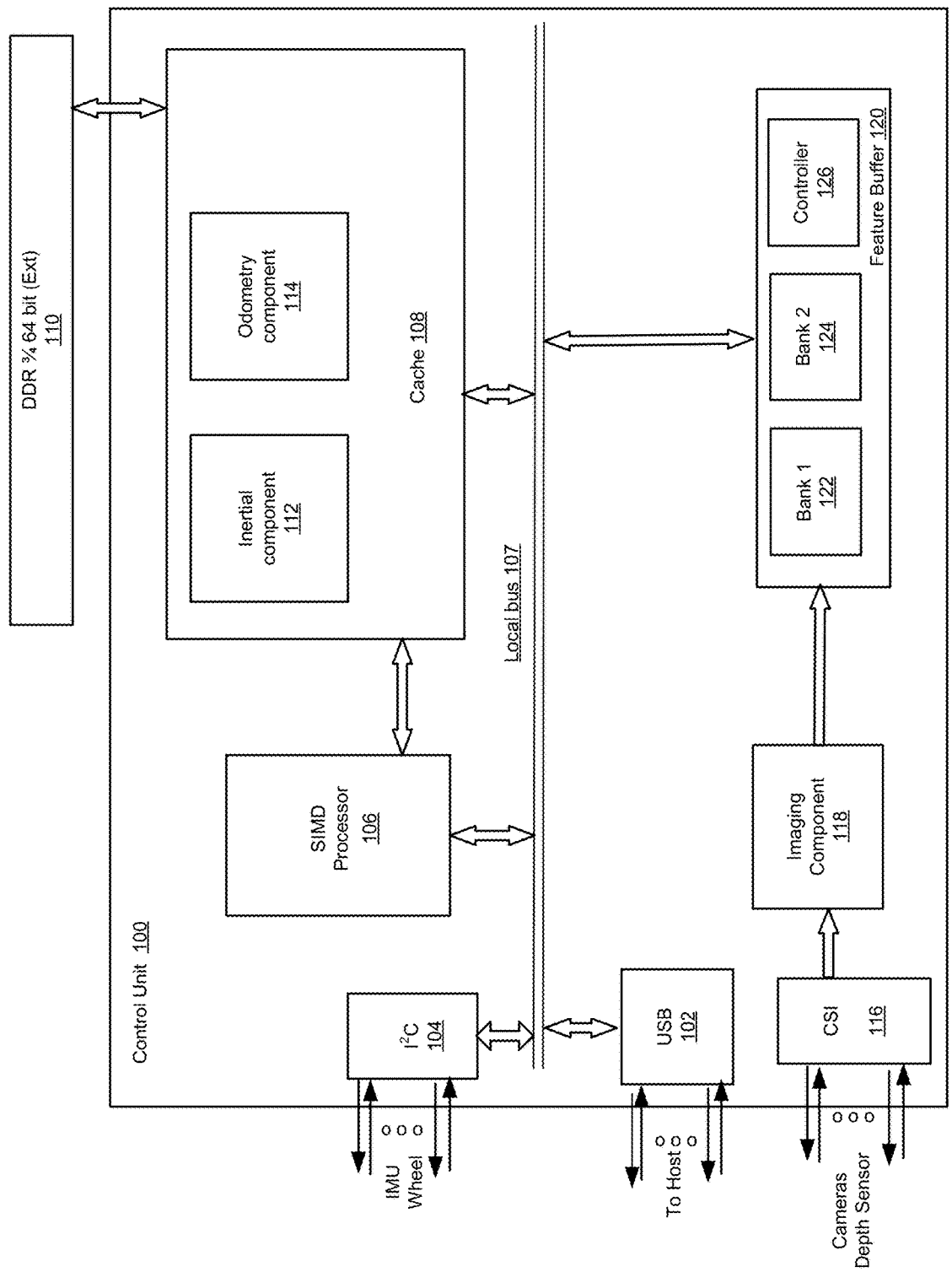
FIG. 1 illustrates an example of a control unit for a monocular-auxiliary sensor.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The discussion is organized as follows. First, an introduction describing some of the problems addressed by various implementations will be presented. Then, a high-level description of one implementation will be discussed at an architectural level. Next, the processes used by some implementations to efficiently process image and data from the auxiliary sensors are discussed. Lastly, the technology disclosed will be illustrated with reference to particular applications of a robot in a self-guided autonomous platform. The references to specific examples are intended to be illustrative of the approaches disclosed herein rather than limiting.

This document describes techniques employed to recover from a loss of positional awareness by a mobile unit that uses visual sensory data from an operational camera. In embodiments, a multi-map structure facilitates a lost robot to relocalize itself. Some embodiments implement additional techniques of reusing visual information when the robot has lost track if its position to create a local submap and merge this submap into an existing global map kept by the robot.

In one embodiment, the mobile unit is a monocular system provided capabilities to conduct planning and to alter plans based upon changing conditions such as moving obstacles sensed in real time using tactile as well as non-tactile sensing and sophisticated environmental mapping. One of the main reasons that monocular mobile units are preferred for positional awareness is because they are cheaper and physically smaller than multiple-camera systems. In another embodiment, a mobile unit with a plurality of cameras can have only one functioning camera. The other cameras in the multiple-camera system can be inoperative due to hardware or software malfunctions, obstruction of view, etc. As used herein, the term "monocular" will be used to describe any system with one operational camera.

When a monocular mobile unit moves, images taken before and after the movement can be analyzed to estimate the direction of the movement. This process is known as stereo matching. The working assumption is that the camera translates in space over time. Therefore, the pair of consecutive frames can be compared by extracting and matching key features in the frames. One main limitation of stereo matching is the inaccurate estimation of the absolute depth scale or magnitude of the movement of the mobile unit. Indeed, even if camera pose estimation and scene reconstruction are carried out accurately, the absolute depth scale of such reconstruction remains inherently ambiguous. Some approaches suggest solving the issue via object detection by matching the scene with a pre-defined set of 3D models, so as to recover the initial depth scale based on the estimated object size, which nevertheless fails in absence of known shapes in the scene.

Data from one or more auxiliary sensors can be used to estimate the depth or magnitude of the movement. In one embodiment, the auxiliary sensor can be a multi-axis inertial measurement unit (IMU), which measures and reports the mobile unit's linear acceleration using one or more accelerometers and rotational rate using one or more gyroscopes. In one embodiment, the auxiliary sensor can be a wheel odometry unit (WOU), which measures and reports the mobile unit's displacement from the encoder readings of the mobile unit's wheels. In one embodiment, the mobile unit can have two auxiliary sensors, an IMU and a WOU. In one embodiment, the auxiliary sensor can be a depth sensor. The position of the mobile unit on the global map is determined after the displacement inferred by the camera is calibrated by the displacement inferred by the auxiliary sensors.

The camera or the imaging sensor in the monocular system can be RGB or grayscale. Using low-end imaging sensors to construct a sensor, e.g., cameras having resolution of 640×480, obviates the cost of high-end image sensors.

Examples of robot applications that benefit from employing positional awareness techniques such as described herein include:
- Caregiver and Service robots (traveling on a ground plane)
- A robot performing a floor coverage application (e.g., vacuuming/mopping/cleaning the floor, etc.).
- A robot being commanded to carry objects around the environment.
- A telepresence robot moving around a remote environment automatically.
- A robot butler that follows a person around.

The positional awareness techniques described herein can also be used in Virtual Reality (VR) and Augmented Reality (AR) scenarios, where a wearable headset tracks its own location, and is able to recognize the objects that it encounters.

In each of the scenarios listed above, the robot utilizes the techniques described herein in order to track its own location and to recognize the objects that it encounters. Also, since the robot performs many complex tasks, each with real-time constraints, it is beneficial that the sensing be done rapidly to accelerate the perception pipeline. To overcome the computational burden imposed by this processing, implementations offload some computation with regards to image processing from the main processor to an imaging component or a digital signal processor. In addition, since it is a mobile robot, which carries limited battery, energy consumption is a major challenge. Accordingly, some implementations offload some computational tasks from the main processor to a low-power sensor module, thereby enabling implementations to achieve overall energy efficiency.

Examples of systems, apparatus, and methods according to the disclosed implementations are described in a robot guidance context. In other instances, the technology disclosed can be applied to autonomous vehicle guidance technology, VR and AR wearable devices, navigation, telecommunications systems, financial systems, security trading, banking, business intelligence, marketing, mining, energy, etc. and using sonar, audio, and LIDAR data. Other services are possible, such that the following examples should not be taken as definitive or limiting either in scope, context, or setting.

The technology disclosed relates to improving utilization of computing resources such as computational power and memory use during processing of image and data from auxiliary sensors inside a single input-multiple data (SIMD) architecture. The technology disclosed can be implemented in the context of any computer-implemented system including a reduced instruction set (RISC) system, emulated hardware environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

The technology disclosed can be implemented in the context of any computer-implemented system like a NEON ARM VFP9-S processor, an ARM core processor, or a compatible processor implementation.

In addition, the technology disclosed can be implemented using a variety of different imaging sensors and technologies, including RGB, grayscale, binary (e.g., digital image subjected to threshold intensity level), IR, sonar, LIDAR or combinations thereof.

System Overview

Control Unit for the Monocular-Auxiliary Sensor

FIG. 1 illustrates an example of a Control Unit for a monocular-auxiliary sensor in block diagram format. Control Unit 100 in FIG. 1 can be coupled to an external memory 110, a flash memory (not shown in FIG. 1 for clarity sake), and one or more persistent storages such as HDDs, optical drives or the like (also not shown in FIG. 1 for clarity sake). Control Unit 100 includes a memory cache 108, a USB I/O port 102, a Camera Serial Interface (CSI) I/O port 116, that facilitates directly receiving images from cameras (not shown in FIG. 1 for clarity sake) by imaging component 118, an Inter-Integrated Circuit (I2C) I/O ports 104, a single instruction multiple-data (SIMD) capable processor 106, and a feature buffer 120. The components in the Control Unit 100 are intercoupled by a local bus 107. In an embodiment, the external memory 110 is a 64-bit double data rate (DDR) random access memory (RAM). In an embodiment, the SIMD capable processor 106 is implemented as a reduced instruction set computer (RISC) architecture. In an embodiment, the SIMD capable processor 106 is implemented as a NEON ARM VFP9-S. An inertial component 112 and an odometry component 114 reside within the memory cache 108.

Figure 2:
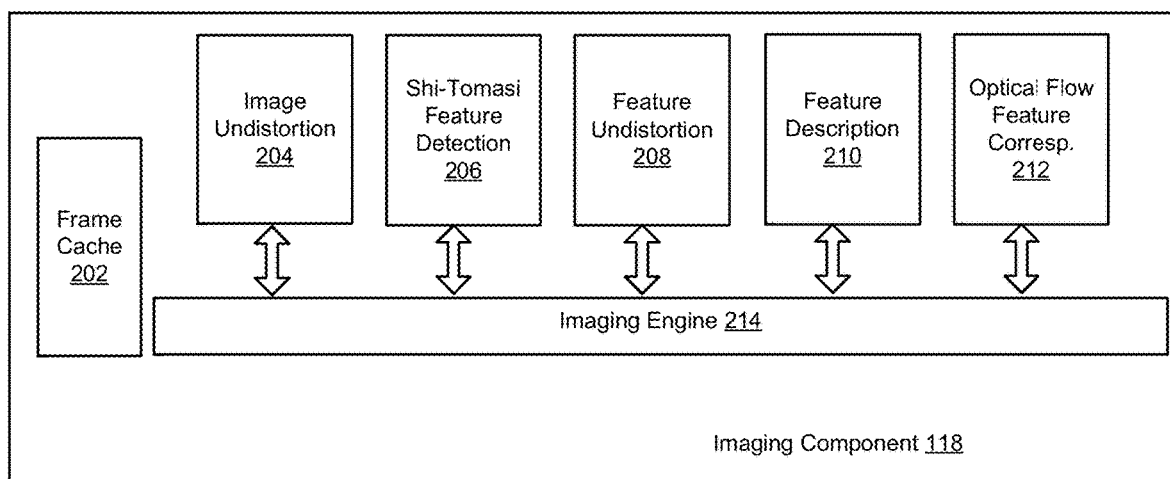
FIG. 2 illustrates an example of an imaging component in FIG. 1.

FIG. 2 illustrates an example of an imaging component 118 in FIG. 1. An Imaging component 118 includes a direct memory access (DMA) 202, an image undistortion processor 204, a Shi-Tomasi processor 206, a feature undistortion processor 208, a feature description engine 210, and an optical flow feature correspondence processor 212 under control of an Imaging Engine 214.

If each incoming image from the visual sensor or camera through Camera Serial Interface (CSI) I/O port 116 is at least 3 MB and 30 images per second are captured, then there is at least 90 MB of memory allocation per second for the incoming images. To process the rather large amount of visual data with a short period of time, frames captured by the camera in the monocular-auxiliary sensor can be directly processed by the imaging component 118 to extract useful corner features and generates a descriptor for each feature. Imaging engine 214 can be implemented as a Digital Signal Processor (DSP). The imaging component 118 directly processes the incoming images without involving the SIMD processor 106 or storing the image data in the cache 108. In some implementations, the incoming image size is at least 2 MB. In some implementations, the incoming image size is at least 1 MB. In some implementations, the images may be arriving at the rate of 20 images per second through the Camera Serial Interface (CSI) I/O port.

Figure 3:
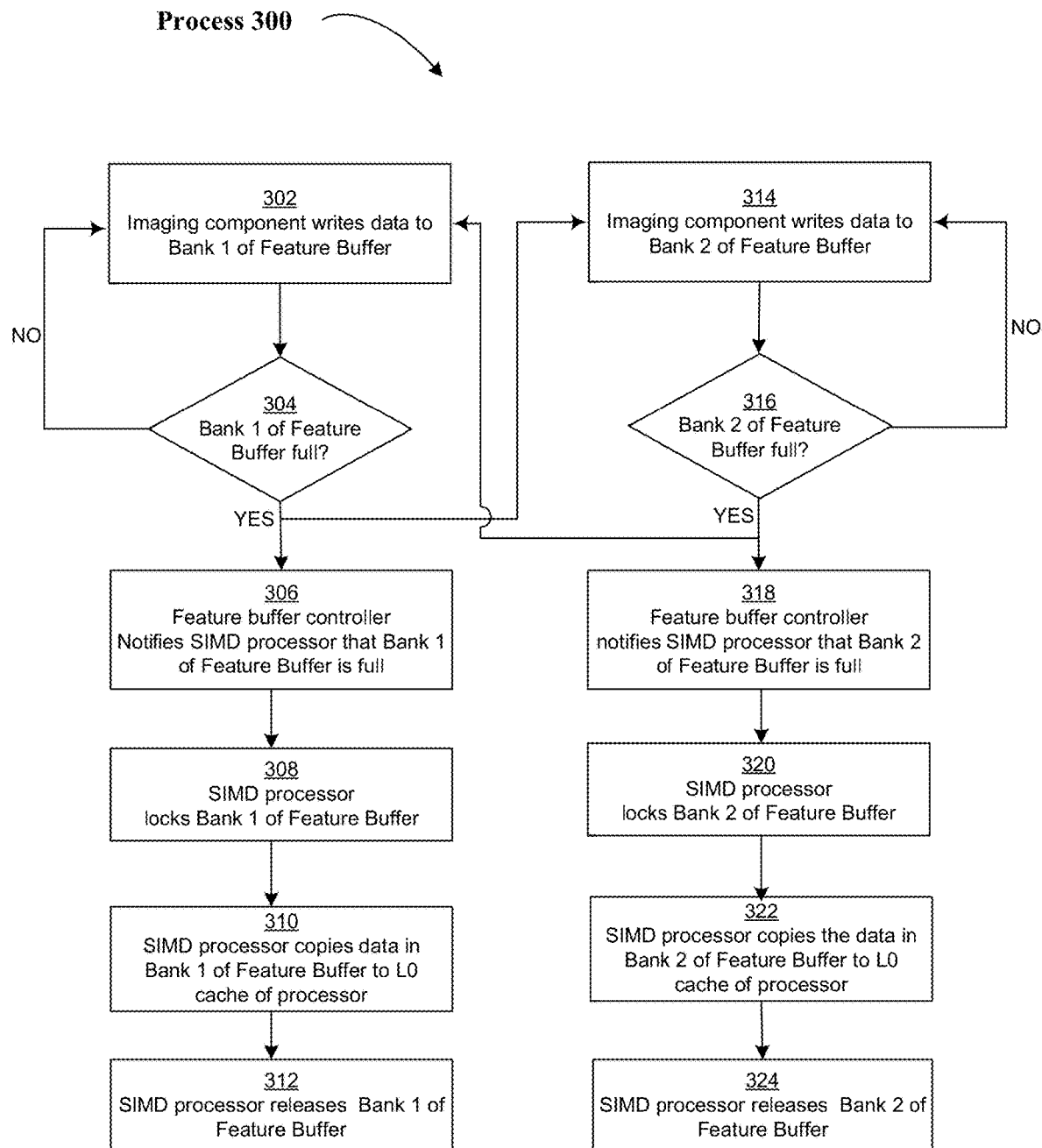
FIG. 3 illustrates a method of operation of the feature buffer in FIG. 1.

After the incoming images are analyzed and key features are extracted by the imaging component 118, a feature buffer 120 stores the extracted features. In some implementations, the feature buffer includes banks to contain 2-5 KB of feature data per image frame. In some implementations, the feature buffer includes banks to contain 1-10 KB of feature data per image frame. The feature buffer 120 comprises of bank 1 122, bank 2 124 and a feature buffer controller 126. FIG. 3 illustrates a method of operation 300 of the feature buffer 120. The imaging component 118 can write data to either bank 1 (step 302) or bank 2 (step 314), but not concurrently. If the imaging component 118 is currently writing data to bank 1 and bank 1 becomes full (step 304), the feature buffer controller 126 notifies the SIMD processor 106 (step 306) that bank 1 is full. Meanwhile, the imaging component 118 starts writing data to bank 2 (step 314). The SIMD processor locks bank 1 (step 308), copies the data in bank 1 to the L0 cache available inside the SIMD processor (step 310), and releases bank 1 (step 312). If bank 2 becomes full (step 316), the feature buffer controller 126 notifies the SIMD processor 106 about the filled bank 2 (step 318), and the imaging component 118 starts writing data to bank 1 (step 302). The SIMD processor locks bank 2 (step 320), copies the data in bank 2 to the L0 cache available inside the SIMD processor (step 322), and releases bank 2 (step 324). Of course other implementations in which additional banks are employed will be readily apparent to those skilled in the art.

Figure 4:
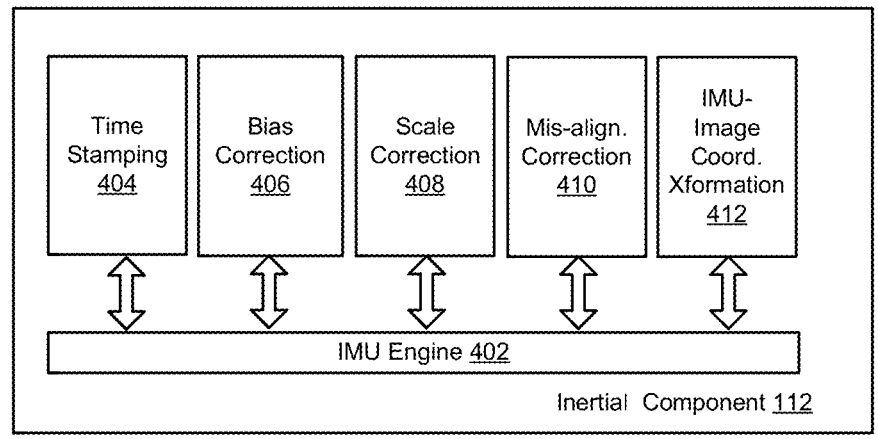
FIG. 4 illustrates an example of an inertial component in FIG. 1.

FIG. 4 illustrates an example of an inertial component 112 in FIG. 1. The Inertial component 112 includes an Inertial Measurement engine 402 that implements a time stamping processor 404 that time stamps sets of inertial data from an inertial sensor (not shown in FIG. 1 for clarity sake), a bias correction processor 406 that corrects data readout from the timestamped inertial data, a scale correction processor 408 that applies stored scale factor information to the corrected inertial data, a mis-alignment correction processor 410 that corrects misalignments of sensory elements of the inertial measurement sensor, and an IMU-Image coordinate transformation processor 412 that computes transformations describing differences between a frame of reference of the inertial data and a frame of reference of the image data.

Figure 5:
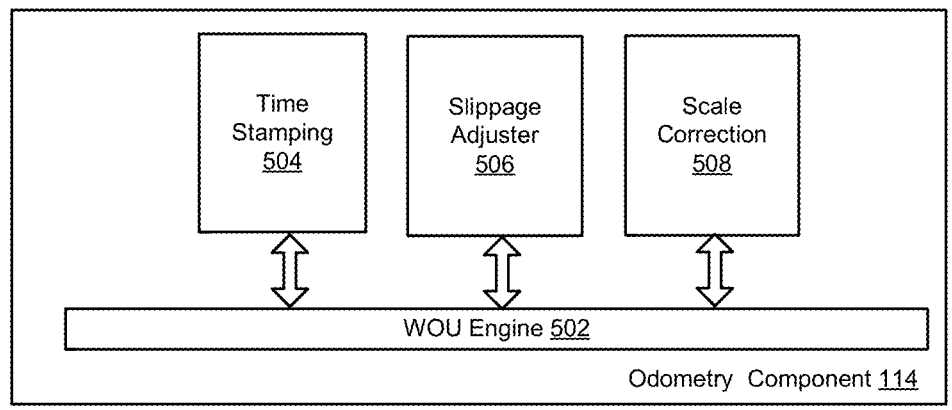
FIG. 5 illustrates an example of an odometry component in FIG. 1.

FIG. 5 illustrates an example of an odometry component 114 in FIG. 1. The Odometry component 114 includes a Wheel Odometry Unit engine 502 that implements a time stamping processor 504 that time stamps sets of odometry data from mobile unit's rotary encoder (not shown in FIG. 1 for clarity sake), a slippage adjuster 506 that corrects data readout from the timestamped odometry data, and a scale correction processor 508 that applies stored scale factor information to the corrected odometry data. Implementations can detect variations in current demand of one or more motors driving a mobile platform and compare with data from the mobile unit's rotary encoder to determine whether a slippage state exists. When a slippage state is detected, the slippage adjuster 506 and the scale correction processor 508 can take action to remedy the slippage. Actions can include marking the odometry data as unreliable, applying a correction factor to the odometry data based upon a duration of slippage state. Other actions can be applied either instead of or in addition to the foregoing as apparent to a person skilled in the art.

Monocular-Auxiliary Sensor

Figure 6:
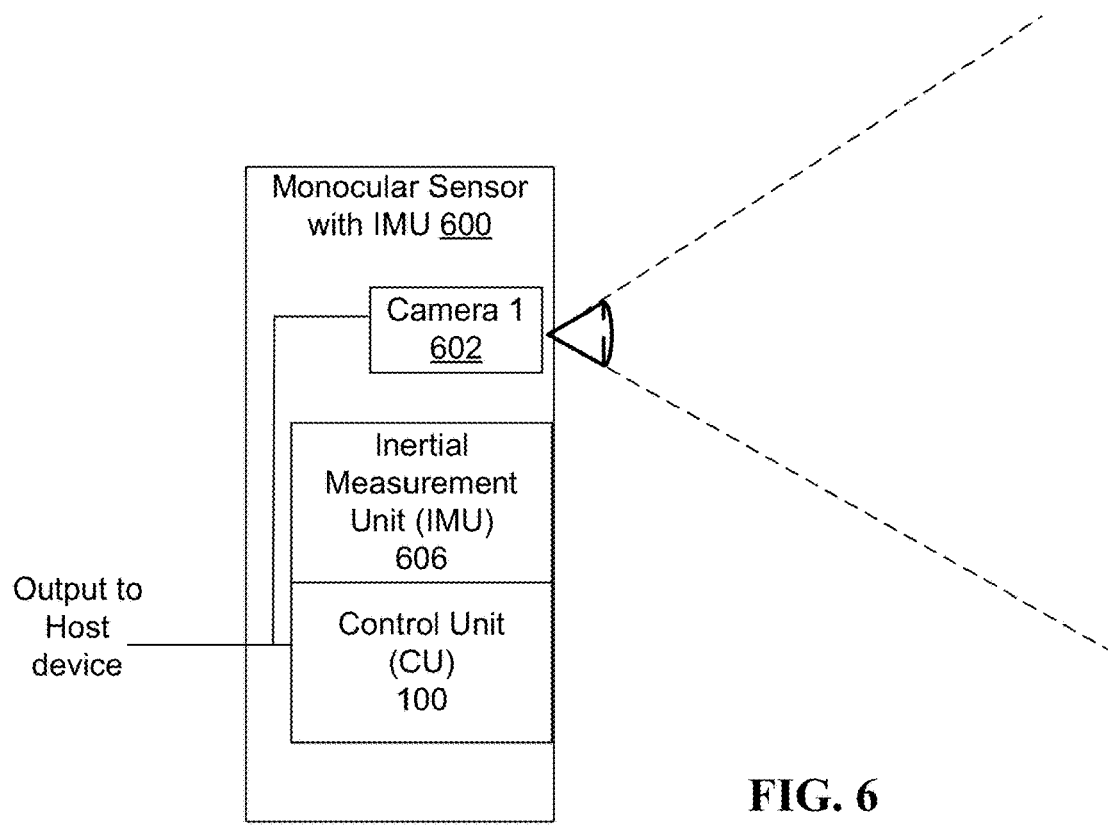
FIG. 6 illustrates an example of a monocular-auxiliary sensor where an inertial measurement unit is used as an auxiliary sensor.

FIG. 6 illustrates an example of a monocular-auxiliary sensor 600 for determining positional information where the auxiliary sensor is an inertial measurement unit. The monocular-auxiliary sensor 600 includes a camera 602, an Inertial Measurement Unit (IMU) 606, and a Control Unit (CU) 100. The Control Unit 100 has a USB interface to provide output to a host. Images from camera 602 are used for agent localization that extracts features from images and to provide raw information for deep learning based tasks, including object recognition, object tracking, image captioning, and the like.

An IMU 606 provides raw sensor data for agent localization pipeline, which consumes IMU data at a high frequency (>200 Hz) to generate agent positional information in real-time. In an implementation, the localization pipeline combines information from IMU 606 which runs at relatively high frequency to provide frequent updates of less accurate information, and camera 602, which run at relatively lower frequency, 30 Hz, to provide more accurate information with less frequency.

The Control Unit 100 performs control of the sensors, IMU 606 and camera 602, time stamping sensor data from the sensors, performs pre-computation in order to accelerate the localization pipeline, and packages raw data for sending over USB 102 to a host.

The USB interface 102 enables the monocular-auxiliary sensor 600 to interact with a host. The host (not shown in FIG. 6 for clarity sake) can be a mobile device or a desktop/laptop computer, specialized machine controller, automobile control module, robot controller or the like, that consumes the data generated by the monocular-auxiliary sensor 600. In various implementations, the host can perform additional computation to achieve agent localization and deep learning tasks. Implementations that perform data pre-processing on low-power CU 100 relieve the host processor (which has a much higher power consumption compared to low-power CU) from performing these tasks. As a result, such implementations achieve increased energy efficiency.

Note that one implementation averages the aligned images. In other implementations, other techniques are used. Also note that in another implementation an image quality measurement sub-step is included. So if the output image is too dark or still not sharp or clear enough, the image will be rejected and not passed to the rest of the pipeline.

Figure 7:
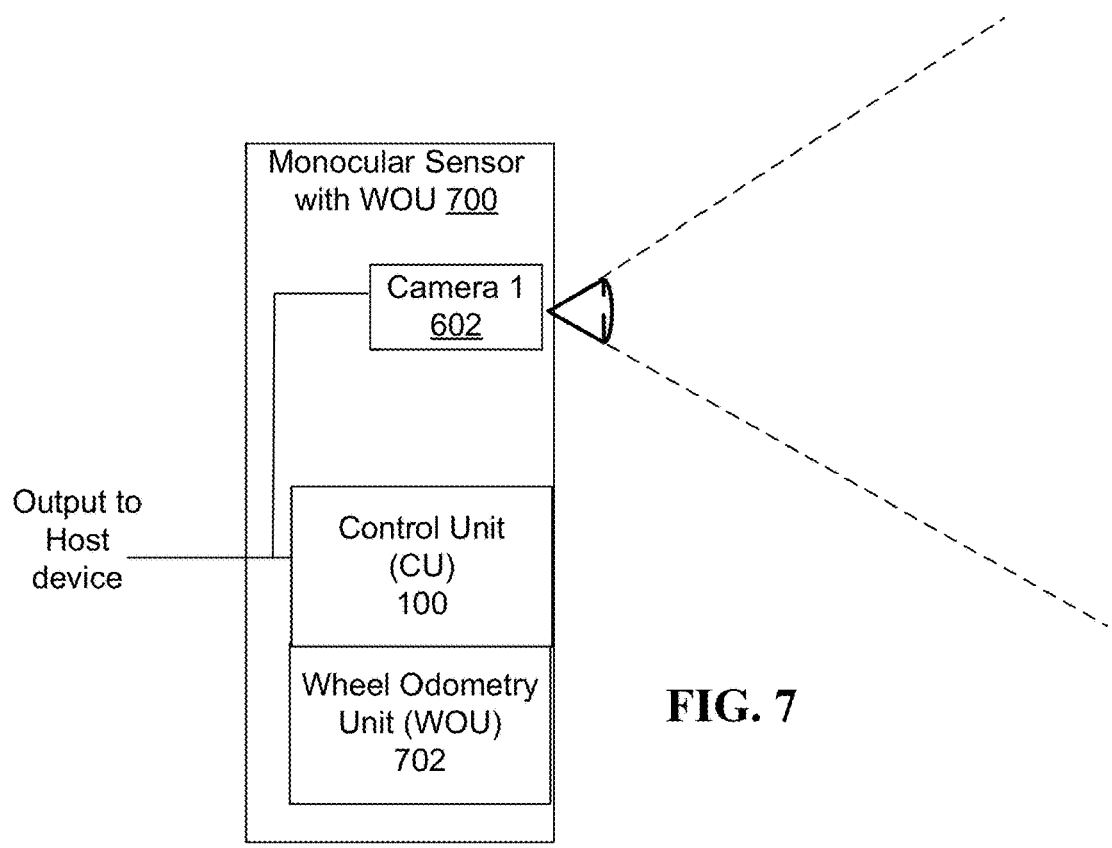
FIG. 7 illustrates an example of a monocular-auxiliary sensor where a wheel odometry unit is used as an auxiliary sensor.

FIG. 7 illustrates an example of a monocular-auxiliary sensor 700 where a wheel odometry unit (WOU) 702 is used for determining positional information instead of an inertial measurement unit. A WOU 702 provides raw sensor data for agent localization pipeline from the mobile unit's wheel rotary encoder to generate agent positional information in real-time.

Figure 8:
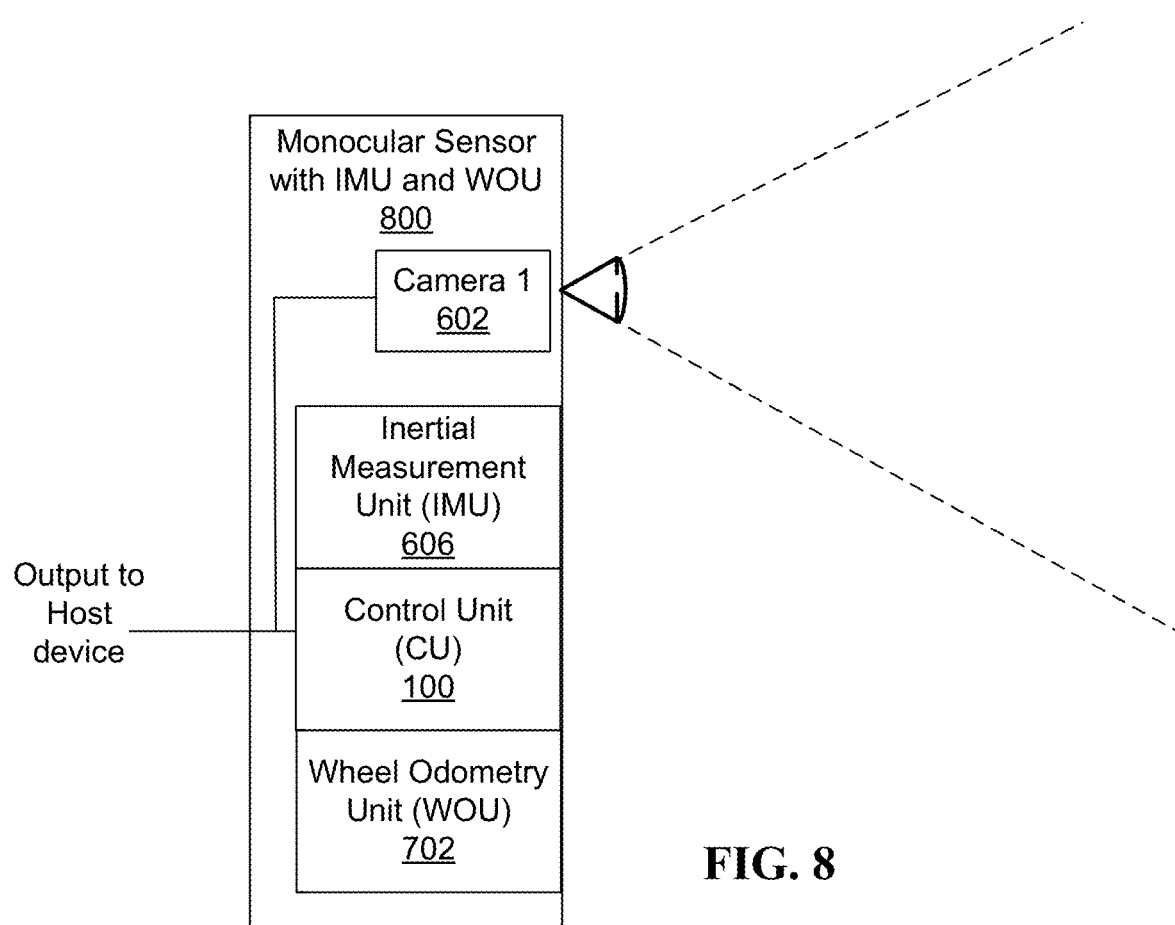
FIG. 8 illustrates an example of a monocular-auxiliary sensor where an inertial measurement unit and a wheel odometry unit are used as auxiliary sensors.

FIG. 8 illustrates an example of a monocular-auxiliary sensor 800 combined with an inertial measurement unit 606 and a wheel odometry unit 702. In this embodiment, sensor data from both the inertial measurement unit 606 and the wheel odometry unit 702 are used to calibrate data from the camera to determine the position of the mobile unit on the global map.

Figure 9:
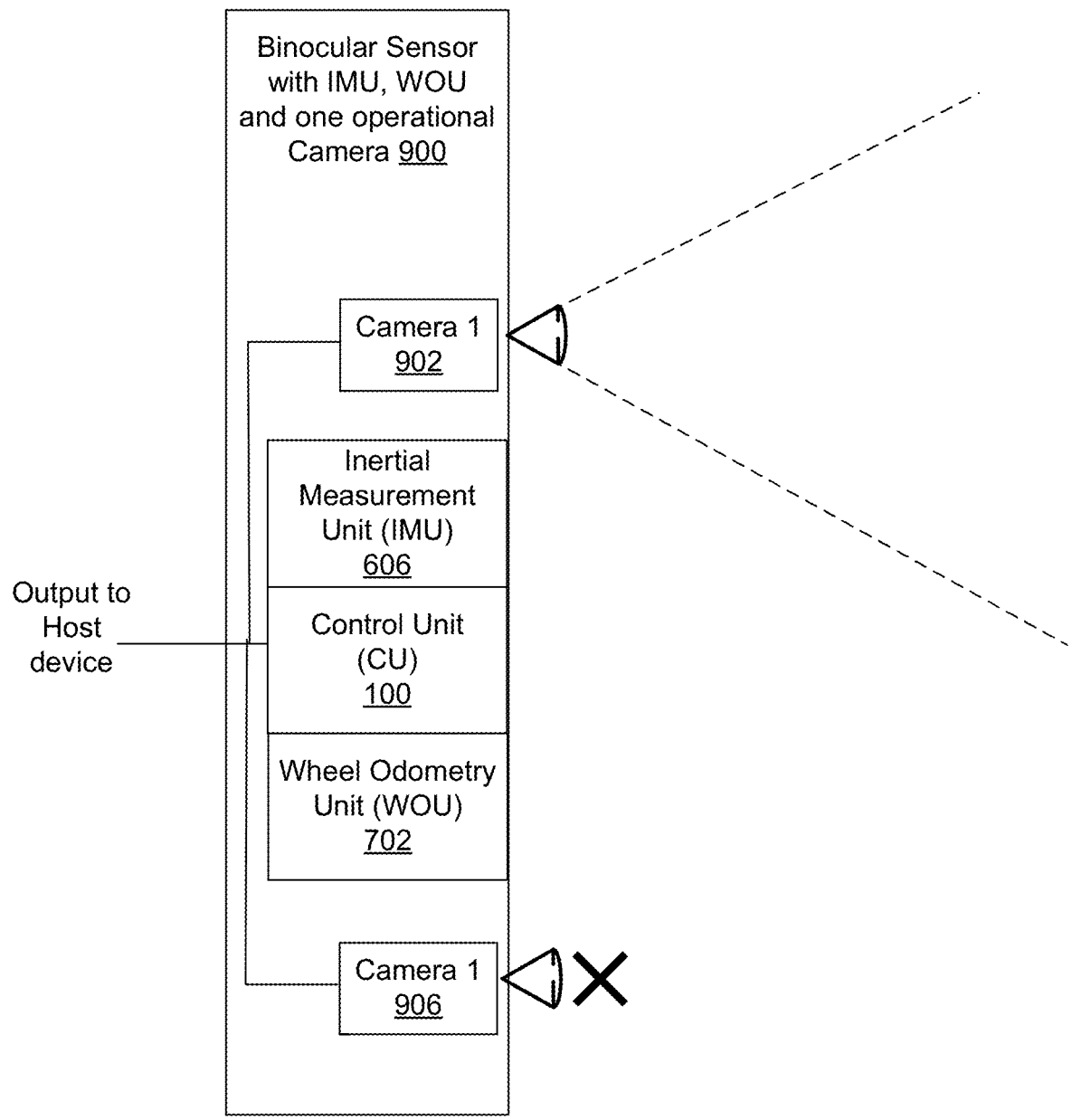
FIG. 9 illustrates an example of a binocular-auxiliary sensor with one operational camera where an inertial measurement unit and a wheel odometry unit are used as auxiliary sensors.

FIG. 9 illustrates an example of a binocular sensor 900 combined with an inertial measurement unit and a wheel odometry unit. The system can be classified as monocular as the binocular sensor has one operational camera 902 and a faulty camera 906. Faulty camera may be experiencing a short term impairment (e.g. change in illumination including reduced intensity, or increased intensity saturating the camera (blooming), dirt or debris or other agent blocking the view of the camera, or the like) or a long term impairment (e.g., hardware failure, persistent signal interference, faulty communications connection, or the like).

In an example of a monocular-auxiliary sensor where the auxiliary sensor is a depth sensor, the auxiliary sensor is usually included with the camera. Therefore, images from camera includes a depth map which is used for agent localization that extracts features from images and to provide raw information for deep learning based tasks, including object recognition, object tracking, image captioning, and the like.

Implementations described herein can be utilized for determining positional information of the mobile unit.

Sensor Data Generation and Processing for the Inertial Measurement Unit

In an embodiment, IMU raw data is corrected on the CU 100, thereby enabling implementations that do not require extra processing from the host processor, therefore accelerating the sensor pre-processing pipeline.

Time Stamping:

The time stamping processor 404 time stamps each set of inertial measurement data that the Control Unit 100 receives from the IMU sensor 606 data, in order to assure that the monocular-auxiliary sensors 600, 800 maintain a temporally accurate stream of sensor data. Such rigorous attention to maintaining the integrity of the sensor data stream enables implementations to provide agent localization that works reliably. Time-stamping raw data by the monocular-auxiliary sensor obviates the need for complex synchronization tasks.

Bias Correction:

The bias correction processor 406 corrects IMU data readout from the timestamped inertial data. Due to manufacturing imperfections, IMU sensors usually have bias problems such that its measurements contain errors. A bias error, if not removed from the measurement, is integrated twice as part of the mechanization process. In this case, a constant bias (error) in acceleration becomes a linear error in velocity and a quadratic error in position. A constant bias in attitude rate (gyro) becomes a quadratic error in velocity and a cubic error in position. The bias can be derived from the offline factory sensor calibration stage. This calibration information in CU 100 to perform bias correction task on CU 100.

Scale Correction:

The scale correction processor 408 applies stored scale factor information to the corrected inertial data. Scale factor error is the relation between input and output. If the input is 100%, the expected output is 100%. The actual output is the result of a linear effect, where the output is proportional to the input but scaled. For example, if the input is 10 m/s2, but there is a 2% scale factor error, the output measurement is 10.2 m/s2. The scale factor can be derived from the offline factory sensor calibration stage. This calibration information in CU 100 to perform scale correction task on CU 100.

Misalignment Correction:

The mis-alignment correction processor 410 corrects mis-alignments of sensory elements of the inertial measurement sensor. There is a 3-axis gyroscope and a 3-axis accelerometer mounted orthogonal to each other. The mountings, however, have errors and so are not perfectly at 90 degrees. This leads to a correlation between sensors. For example, assume one axis is pointed perfectly up and the IMU is level. The accelerometer on this axis is measuring gravity. If the other two axes were perfectly orthogonal, they do not measure any of the effect of gravity. If there is a non-orthogonality, the other axes also measure gravity, leading to a correlation in the measurements. The effect of non-orthogonality occurs within sensor sets (between accelerometers or gyroscopes), between sensor sets or between the sensor sets and the enclosure (package misalignment). Careful manufacturing, as well as factory calibration, can help minimize this error source. Continuous estimation and correction during system operation is also an approach used to minimize this effect. Package misalignment (between the IMU 606 and the enclosure) can be removed by performing a bore-sighting estimation to determine the offset between the IMU 606 measurement frame and the sensor (objective) frame. The misalignment numbers can be derived from the offline factory sensor calibration stage. This calibration information in CU 100 to perform misalignment correction task on CU 100.

IMU-Camera Coordinate Transformation:

In some implementations, the IMU 606 and the camera 602 do not reside at the same physical location; there is a distance between the IMU 606 and the cameras 602. Accordingly, in order to enable later processes in the localization pipeline to treat the IMU 606 and the camera 602 as being co-located, on implementation determines a transformation matrix between the IMU 606 and the cameras 602, which can be achieved from an offline production or post-production calibration stage. In CU 100, this transformation matrix is stored locally, and applied to the IMU data. This technique enables later processes to be able to treat the IMU 606 and the camera 602 to be co-located Sensor Data Generation and Processing for the Wheel Odometry Unit In an embodiment, WOU raw data is corrected on the CU 100, thereby enabling implementations that do not require extra processing from the host processor, therefore accelerating the sensor pre-processing pipeline.

Time Stamping:

The time stamping processor 504 time stamps each set of odometry measurement data that the Control Unit 100 receives from the WOU sensor 702 data, in order to assure that the monocular-auxiliary sensors 600,800 maintain a temporally accurate stream of sensor data. Time-stamping raw data by the monocular-auxiliary sensor obviates the need for complex synchronization tasks.

Slippage Adjuster:

When driving over low-traction terrain, deformable terrain, steep hills, or during collisions with obstacles, the position of monocular-auxiliary sensor with WOU as an auxiliary unit can quickly accumulate large errors due to wheel slippage. With inaccurate odometry data, the mobile unit's final position can be overestimated. The slippage adjuster 506 corrects WOU data readout from the time-stamped odometry data.

Scale Correction:

The scale correction processor 508 applies stored scale factor information to the corrected odometry data. Scale factor error is the relation between input and output. If the input is 100%, the expected output is 100%. The actual output is the result of a linear effect, where the output is proportional to the input but scaled. For example, if the input is 1 cm, but there is a 5% scale factor error, the output measurement is 1.05 cm. The scale factor can be derived from the offline factory sensor calibration stage. This calibration information in CU 100 to perform scale correction task on CU 100.

Sensor Visual Data Generation and Processing

Image Undistortion:

The image undistortion processor 204 corrects distortion in the image data in the captured frames. The image distortion is generally referred to an optical aberration that deforms and bends physically straight lines and makes them appear curvy in images. Optical distortion occurs as a result of optical design. In order to achieve reliable computer vision results, image undistortion processor 204 can un-distort the image before further processing is performed. This can be achieved by using a lookup table of the size of the input image, and performing a remapping operation to undistort the whole image.

Feature Undistortion:

In cases when the remaining portions of the processing pipeline do not require the whole image, but only the feature points within the image, the feature undistortion processor 208 perform a feature undistortion operation on the CU. In detail, this operation runs after the feature extraction stage, and undistorts each feature point.

Feature Detection:

The Shi-Tomasi processor 206 performs feature detection upon image frames. Features are "interesting" parts of an image. The Shi-Tomasi feature detection includes methods that aim at computing abstractions of image information and making local decisions at every image point whether there is an image feature of a given type at that point or not. The resulting features will be subsets of the image domain, often in the form of isolated points. Some implementations perform the feature detection on the CU 100 to relieve the host from performing such tasks, and to accelerate the feature detection process. Accordingly, in an implementation, processing includes:

Action 1: calculate Eigen value for each pixel and determine (i) whether the feature is of interest; and (ii) for features of interest, a type of feature:
two small Eigen values: feature is not interesting
one small, one big value: feature is likely an edge
two big values: feature is likely a corner
other type of features Action 2: refine
Apply non-maximum suppression
Apply spatial binning
Apply heuristics
Apply other types of refinement Feature Description:

The feature description engine 210 performs feature description on detected features. The feature description includes methods to uniquely identify each detected points in an image. Feature description can be used to compare and match feature points between different images. Some implementations perform the feature description on the CU 100 to relieve the host from performing such tasks, and to accelerate the feature description process.

One implementation of feature description engine 210 uses a SIMD-accelerated ORB descriptor to describe features. The description of a feature can be used for matching purposes and describing a feature's uniqueness. The ORB descriptor approach was selected for its relative rotational invariance and immunity to Gaussian image noise. One example of an ORB feature detector and binary descriptor can be found at "ORB feature detector and binary descriptor", //scikit-image.org/docs/dev/auto_examples/plot_orb.html (last accessed Aug. 17, 2016). For further information on ORB Descriptor, reference may be had to Ethan Rublee, et al., "ORB: an efficient alternative to SIFT or SURF", which is incorporated herein by reference for all purposes.

2D Feature Correspondence Generation:

The optical flow feature correspondence processor 212 performs 2D feature correspondence generation for the features. The feature correspondence computation is used to identify the feature points that appear in both the left and the right cameras. Once feature correspondence is identified for any two feature points, triangulation can be applied to the feature points to derive the depth of the point in space. This depth information is employed by processes later in the localization pipeline. Some implementations perform the feature correspondence generation on the CU 100 to relieve the host from performing such tasks, and to accelerate the feature correspondence generation.

One optical flow feature correspondence processor 212 implementation employs optical flow methods to calculate the motion between two image frames, taken at times t and t+Δt at each voxel position. One such method, called a differential method, is based on local Taylor series approximations of the image signal, using partial derivatives with respect to the spatial and temporal coordinates. Accordingly, in an implementation, processing includes:

Input: last image, current image, a list of detected feature locations from the last image,
Output: a list of locations of the last image's detected features' in the current image
Assumption: brightness consistency, image changes by and only by motion
Action 1: predict the output locations by either just assuming there is no motion so the current locations are the same as last frame's feature locations, OR use information retrieved from the auxiliary sensors to predict the locations.
Action 2: refine the pixel coordinate for each feature point by searching around the predicted location, matching patches, and using matching score to determine the refined position. Accordingly, the technology disclosed can provide implementations with the ability to gain increased performance by using information from the auxiliary to narrow the search and save time.

Figure 10:
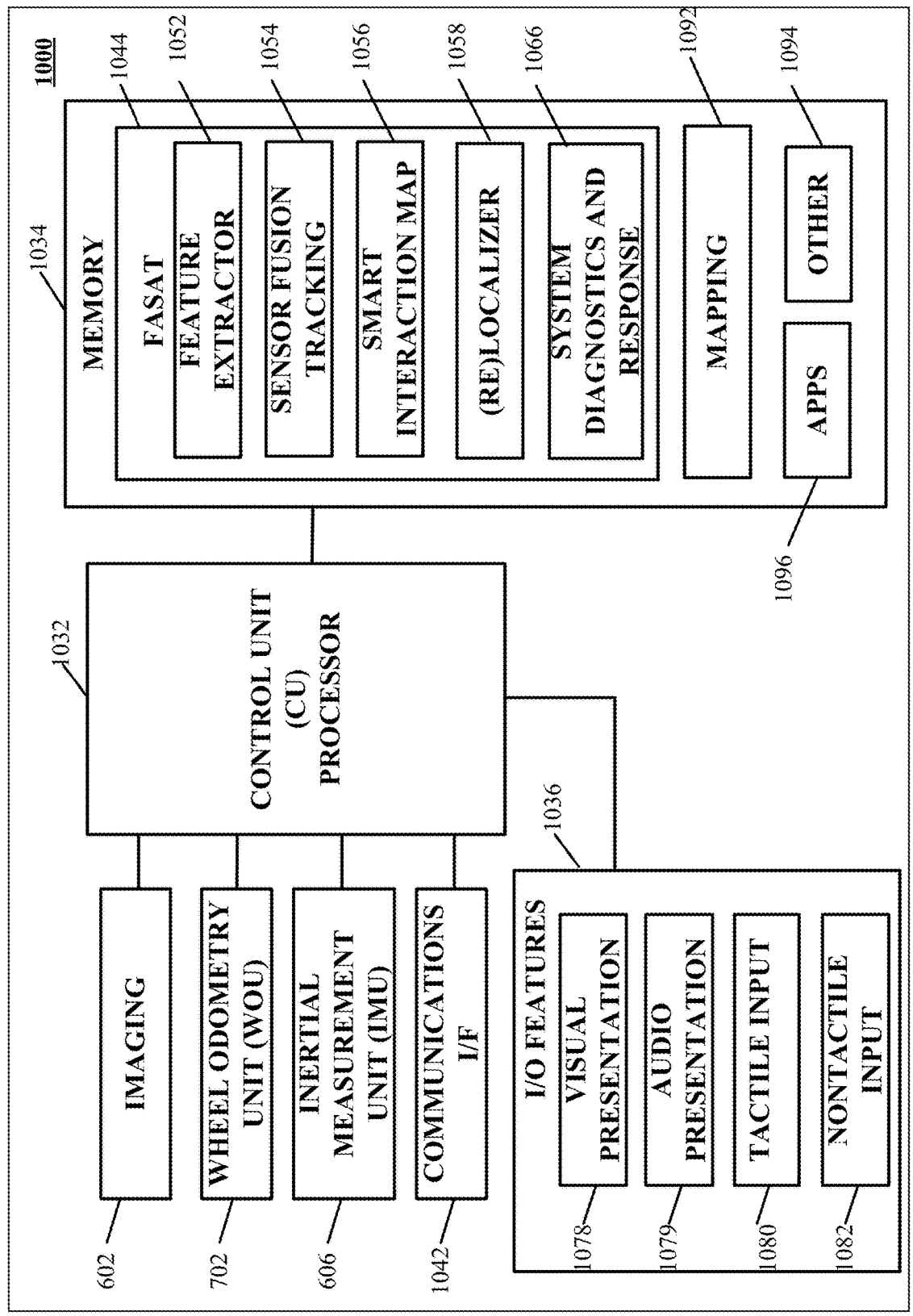
FIG. 10 illustrates an example of a monocular-auxiliary sensory system.

Referring now to FIG. 10, which shows a simplified block diagram of a monocular-auxiliary positioning system 1000 which can be used to implement monocular-auxiliary sensors 600, 700 and 800. Monocular-auxiliary positioning system 1000 includes a processor 1032, a memory 1034, an inertial measurement unit (IMU) 606, a wheel odometry unit (WOU) 702, a camera 602, and a communications interface 1042. One or more additional I/O features 1036 are included to address implementation specific needs, such as a visual presentation interface 1078, an audio presentation interface 1079, sensor(s) for detecting tactile input (e.g., keyboards, keypads, touchpads, mouse, trackball, joystick and the like) 1080, and non-tactile input (e.g., microphone(s), sonar sensors and the like) 1082. Memory 1034 can be used to store instructions to be executed by processor 1032 as well as input and/or output data associated with execution of the instructions. In particular, memory 1034 contains instructions, conceptually illustrated as a group of modules described in greater detail below, that control the operation of processor 1032 and its interaction with the other hardware components. An operating system directs the execution of low-level, basic system functions such as memory allocation, file management and operation of mass storage devices. The operating system may be or include a variety of operating systems such as Microsoft WINDOWS™ operating system, the Unix™ operating system, the Linux™ operating system, the Xenix™ operating system, the IBM AIX™ operating system, the Hewlett Packard UX™ operating system, the Novell NETWARE™ operating system, the Sun Microsystems SOLARIS™ operating system, the OS/2™ operating system, the BeOS™ operating system, the MACINTOSH™ operating system, the APACHE™ operating system, an OPENACTION™ operating system, iOS™, Android or other mobile operating systems, or another operating system of platform.

The computing environment may also include other removable/non-removable, volatile/nonvolatile computer storage media. For example, a hard disk drive may read or write to non-removable, nonvolatile magnetic media. A magnetic disk drive may read from or write to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

In an embodiment, the processor 1032 is a NEON ARM processor implementing a single input-multiple data (SIMD) architecture as a reduced instruction set computer (RISC) architecture. Depending on implementation, however, processor 1032 can alternatively be a realized using a specific purpose microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that are capable of implementing the actions of the processes of the technology disclosed.

Communications interface 1042 can include hardware and/or software that enables communication between monocular-auxiliary positioning system 1000 and other systems controlling or enabling customer hardware and applications (hereinafter, a "host system" or "host") such as for example, a robot or other guided mobile platform, an autonomous vehicle, a virtual reality-augmented reality wearable device (VR/AR headset) or the like (not shown in FIG. 10 for clarity sake). Camera 602, as well as sensors such as IMU 606 and WOU 702, can be coupled to processor 1032 via a variety of communications interfaces and protocols implemented by hardware and software combinations. Thus, for example, positioning system 1000 can include one or more camera data ports and/or motion detector ports (not shown in FIG. 10 for clarity sake) to which the cameras and motion detectors can be connected (via conventional plugs and jacks), as well as hardware and/or software signal processors to modify data signals received from the cameras and motion detectors (e.g., to reduce noise or reformat data) prior to providing the signals as inputs to a fast accurate stable adaptive tracking ("FASAT") process 1044 executing on processor 1032. In some implementations, monocular-auxiliary positioning system 1000 can also transmit signals to the cameras and sensors, e.g., to activate or deactivate them, to control camera settings (frame rate, image quality, sensitivity, etc.), to control sensor settings (calibration, sensitivity levels, etc.), or the like. Such signals can be transmitted, e.g., in response to control signals from processor 1032, which may in turn be generated in response to user input or other detected events.

Instructions defining FASAT process 1044 are stored in memory 1034, and these instructions, when executed, perform analysis on image frames captured by the camera 602, inertial data captured by the IMU 606 and the odometry data captured by the WOU 702 connected to monocular-auxiliary positioning system 1000. In one implementation, FASAT process 1044 includes various logical processes, such as a feature extractor 1052 that receives a raw image and determines a salient points' representation of objects in the image thereby representing the geometry understanding of the objects from a machine's perspective view. In some implementations, feature extractor 1052 analyzes images (e.g., image frames captured via camera 602) to detect edges of an object therein and/or other information about the object's location. A sensor fusion tracking process 1054 uses feature extraction results, inertial data from IMU 606 and the odometry data from the WOU 702 to generate pose accurately and rapidly. A smart interaction map 1056 enables using a known map of obstructions to localize the sensor. The map is built using mapping functionality of mapping process 1092, which is described in further detail herein below. A Re-localizer process 1058 recovers device positional awareness when the device has lost track of device position. A system diagnostic and response (SDAR) 1066 manages of current localizing state of the device and provide response strategy.

A mapping process 1092 generates a hybrid occupancy grid that maps the space and objects recognized by the feature extractor 1052. The hybrid occupancy grid includes (i) a point cloud representation of points in space located in the image frames and (ii) one or more x-y plane occupancy grids arranged at heights to intersect points on the extracted features.

In some implementations, other processing 1094 analyzes audio or ultrasonic signals (e.g., audio signals captured via sonar or audio sensors comprising non-tactile input 1082) to localize objects and obstructions by, for example, time distance of arrival, multilateration or the like ("Multilateration is a navigation technique based on the measurement of the difference in distance to two or more stations at known locations that broadcast signals at known times. See Wikipedia, at <//en.wikipedia.org/w/index.php?title=Multilateration&oldid=523281858>, on Nov. 16, 2012, 06:07 UTC). Audio signals place the object on a known surface, and the strength and variation of the signals can be used to detect object's presence. If both audio and image information is simultaneously available, both types of information can be analyzed and reconciled to produce a more detailed and/or accurate path analysis.

In some implementations, other processing 1094 determines paths to track and predict device movements in space based upon the hybrid occupancy grid generated by mapping process 1092. One or more applications 1096 can be loaded into memory 1034 (or otherwise made available to processor 1032) to augment or customize functioning of the monocular sensors thereby enabling the system 1000 to function as a platform. Successive camera images are analyzed at the pixel level to extract object movements and velocities. In some implementations, presentation interface 1078 includes a video feed integrator provides integration of live video feed from the camera 602 and one or more virtual objects. Video feed integrator governs processing of video information from disparate types of camera 602. For example, information received from pixels that provide monochromatic imaging and from pixels that provide color imaging (e.g., RGB) can be separated by integrator and processed differently. Information from one type of sensor can be used to enhance, correct, and/or corroborate information from another type of sensor. Information from one type of sensor can be favored in some types of situational or environmental conditions (e.g., low light, fog, bright light, and so forth). The device can select between providing presentation output based upon one or the other types of image information, either automatically or by receiving a selection from the user.

Presentation interface 1078, audio presentation 1079, non-tactile input 1082, and communications interface 1042 can be used to facilitate user interaction via a monocular sensor with monocular-auxiliary positioning system 1000. These components can be of highly customized design, generally conventional design or combinations thereof as desired to provide any type of user interaction. In some implementations, results of analyzing captured images using inertial measuring unit 606, wheel odometry unit 702 and camera 602 and FASAT program 1044 can be interpreted as representing objects and obstacles in 3D space. For example, a robot equipped with monocular-auxiliary sensor can perform path planning and/or obstacle avoidance across a surface that has been analyzed using FASAT program 1044, and the results of this analysis can be interpreted as an occupancy map by some other program executing on processor 1032 (e.g., a motion planner, localization and tracking process, or other application). Thus, by way of illustration, a robot might use sweeping of camera 602 across a room in order to "map" a space currently imaged to a hybrid point grid that can be used by a host device such as a monitor, VR headset or the like via presentation interface 1078, to provide visual input of the area that the robot is "seeing". Smart interaction map 1056 may use the representation of space built by mapping 1092 to plan a path for a robot or mobile platform through the space, e.g., to improve localization and tracking of the robot or platform through the space.

It will be appreciated that the monocular-auxiliary positioning system 1000 is illustrative and that variations and modifications are possible. monocular-auxiliary positioning systems can be implemented in a variety of form factors, including "cloud" computing systems of servers and networks, desktop systems, laptop systems, tablets, smart phones or personal digital assistants, and so on. A particular implementation may include other functionality not described herein for clarity sake. In some implementations, one or more cameras and two or more microphones may be built into the monocular-auxiliary system 1000 or may be supplied as separate components. Further, an image or audio analyzer can be implemented using only a subset of monocular-auxiliary positioning system 1000 components (e.g., as a processor executing program code, an ASIC, or a fixed-function digital signal processor, with suitable I/O interfaces to receive image data and output analysis results).

While monocular-auxiliary positioning system 1000 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired. Thus, for example, execution of feature extractor 1052 by processor 1032 can cause processor 1032 to operate inertial measurement unit 606 and camera 602 to capture images and/or audio signals of an object traveling across and in contact with a surface to detect its entrance by analyzing the image and/or audio data.

Tracking

Tracking refers to capabilities rendered by system hardware and functional processes that enable a controlled device (robot, mobile platform, or VR/AR headset, goggles, or other hardware) to continuously localize itself and have positional awareness e.g., the sensor system can determine where it is in the real world.

Architecture for Tracking System

Figure 11:
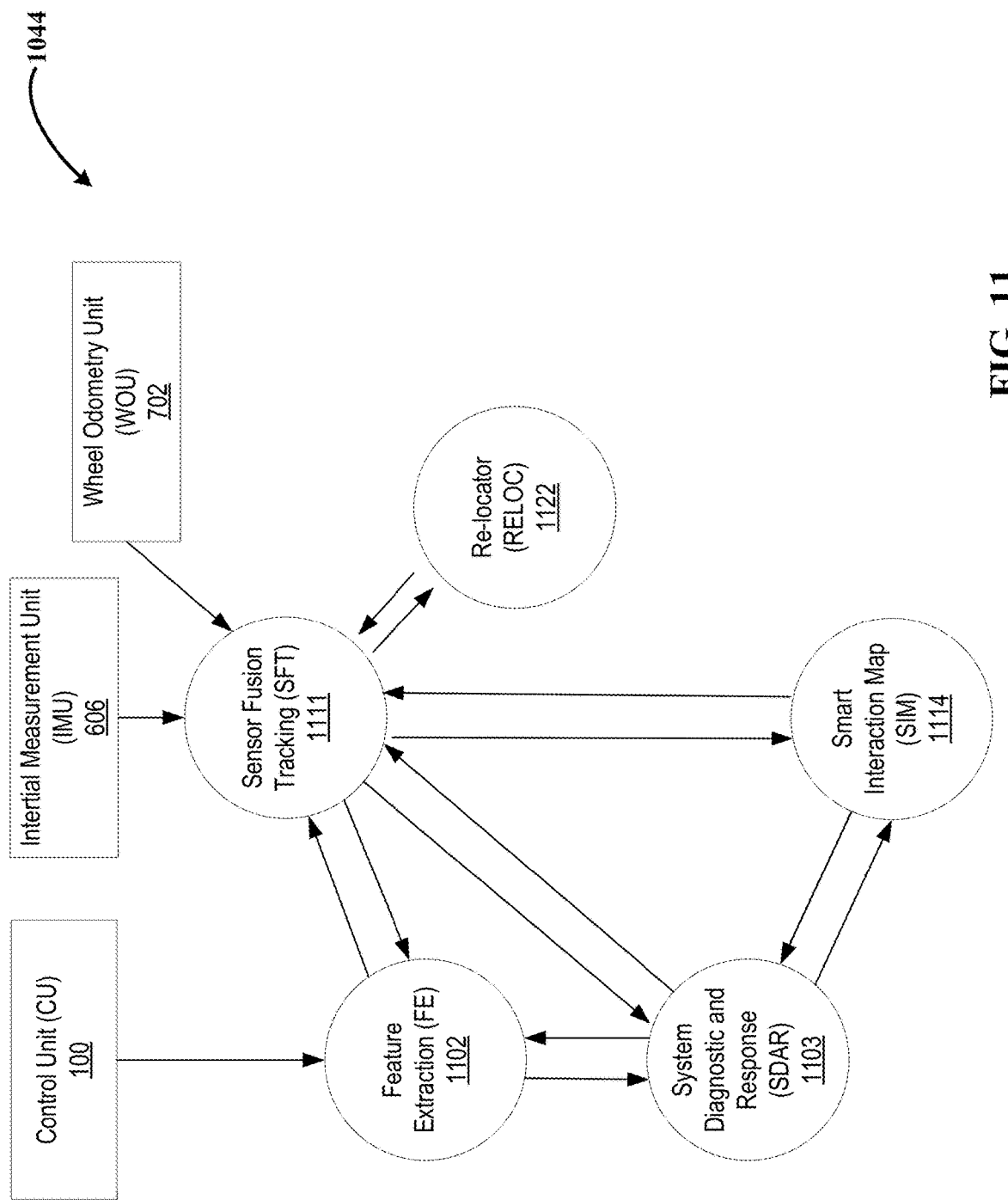
FIG. 11 illustrates an example tracking system implementing the tracking process.

FIG. 11 illustrates example architecture for a tracking system implementation. As shown in FIG. 11, components and information flows between components of an example fast accurate stable adaptive tracking ("FASAT") process 1044 of FIG. 11 are illustrated by feature extractor (FE) 1102, sensor fusion based tracker (SFT) 1111, smart interaction with map (SIM) processor 1114, a system diagnostics and response (SDAR) processor 1103 and a Re-locator (RELOC) 1122. The data flows and operation of one example implementation of these components will next be described.

Feature Extraction

A feature extractor (FE) 1102 represents the geometric understanding of a space from a machine's perspective view. Feature extractor 1102 receives raw image information from Control Unit 100 and provides a salient points' representation hybrid point cloud map to a sensor fusion tracker (SFT) 1111. One implementation of a feature extractor 1102 performs a variety of actions including image preprocessing, feature detection, and feature descriptor preparation.

Image processing tasks include performing Gaussian blur and gamma correction on raw image data.

Feature Detection: Optical Flow

Optical flow gives 2D-2D correspondence between previous image and a current image. Feature extractor 1102 generates a hierarchy of levels; each level generation is aligned with optical flow needs, and therefore need only be computed once.

Processed images are stored in a multiple hierarchical patch and/or undistorted patch. In an example implementation, as levels in the hierarchy increase, the more blur exists in the image. At each level in the hierarchy, the size of the image is reduced to ¼ of the size of the image from which it is derived, e.g. the size of the image in the previous level. For example, if an image on the first ("zero level") has a size 640×480, then the size of the corresponding image on the next higher level ("first level") has a size 320×240, and a next corresponding image at the next higher level ("second level") has a size 160×120. If the same feature point appears at more than one level, then that feature point is determined by the system to be a strong feature point. In the foregoing example, a scale factor of 2 is used, however, any scale factor can be selected, e.g., a scale factor of 1.6 provides the original 640×480 image with a next level image having a resolution of 400×300.

One feature extractor 1102 implementation employs optical flow methods to calculate the motion between two image frames, taken at times t and t+Δt at each voxel position. One such method, called a differential method, is based on local Taylor series approximations of the image signal, using partial derivatives with respect to the spatial and temporal coordinates. Accordingly, in an implementation, processing includes:

Input: last image, current image, a list of detected feature locations from the last image, Output: a list of locations of the last image's detected features' in the current image Assumption: brightness consistency, image changes by and only by motion Action 1: predict the output locations by either just assuming there is no motion so the current locations are the same as last frame's feature locations, OR use information retrieved from one or more auxiliary sensors to predict the locations.

Action 2: refine the pixel coordinate for each feature point by searching around the predicted location, matching patches, and using matching score to determine the refined position. Accordingly, the technology disclosed can provide implementations with the ability to gain increased performance by using information from one or more auxiliary sensors to narrow the search and save time.

Feature Detection: Shi-Tomasi

One implementation of feature extraction processor 1102 uses NEON-accelerated Shi-Tomasi feature detection with spatial binning in order to obtain features from regions to cover as much as possible for the full image. The feature extractor 1102 uses data from one or more auxiliary sensors and the pose information received from sensor fusion tracker 1111 in order to dynamically decide the regions to track and the parameters to use. Features are "interesting" parts of an image. Accordingly, in an implementation, processing includes:

Action 1: calculate Eigen value of the intensity value of each pixel and its surrounding pixels; and determine (i) whether the feature is of interest; and (ii) for features of interest, a type of feature
        two small Eigen values: feature is not interesting
        one small, one big value: feature is likely an edge
        two big values: feature is likely a corner
        other type of features
    Action 2: refine
        Apply non-maximum suppression
        Apply spatial binning
        Apply heuristics
        Apply other types of refinement Feature Descriptor: ORB Descriptor One implementation of feature extractor 1102 uses a SIMD-accelerated ORB descriptor to describe features. The description of a feature can be used for matching purposes and describing a feature's uniqueness. The ORB descriptor approach was selected for its relative rotational invariance and immunity to Gaussian image noise. One example of an ORB feature detector and binary descriptor can be found at "ORB feature detector and binary descriptor", //scikit-image.org/docs/dev/auto_examples/plot_orb.html (last accessed Aug. 17, 2016). For further information on ORB Descriptor, reference may be had to Ethan Rublee, et al., "ORB: an efficient alternative to SIFT or SURF", which is incorporated herein by reference for all purposes.

Bag-of-Words

One implementation of feature extractor 1102 performs bag-of-words extraction, determining from one image a byte array, sparse histogram over vocabulary. Accordingly, in an implementation, Bag-of-words processing includes using a list of feature descriptors in one image to extract Bag-of-words feature for one image. For example, in an image having 400 features with 400 corresponding descriptors, and a bag-of-word feature with the size of 256 bits. The resulting Bag-of-words is a 256 bit array, and one image only needs/has one 256 bit array. Bag-of-words is useful in performing relocalization as described herein below in further detail. Bag-of-words can indicate among A, B, C images, an image D has a matching score individually D-A, D-B, D-C. Say for example that D-B has the highest score, then the camera taking image D is closest to the camera pose used when taking image B, not A or C.

One implementation of feature extractor 1102 adaptively adjusts a threshold that is applied to a number of features needed in order for the system to keep track of a moving object. Such intelligent thresholds include a threshold that is adaptively adjusted based upon device movement, sensor readings, situational or environmental variables (e.g., low light, fog, bright light, and so forth) or combinations thereof. Once sufficient number of features (e.g., above the threshold) are identified, the system will continue to track an object. Otherwise, the system does not track the object. Feature extractor 1102 will adaptively adjust the threshold based on device movement and other sensor levels.

SFT: Generating Pose Information from Feature Extraction Results and Data from Auxiliary Sensors Sensor fusion based tracker (SFT) 1111 determines how to smartly use feature extraction results and data from one or more auxiliary sensors (IMU 606, WOU 702, depth sensor) to generate pose accurately and rapidly. Sensor fusion based tracker 1111 performs initialization for the system state, feature extractor initial state, interaction with map state, and other states. Sensor fusion based tracker 1111 has logic to decide how to initialize the state including use how many images to skip, and any other initialization steps for specific hardware.

In an implementation, sensor fusion based tracker 1111 performs buffer management for the auxiliary sensors. Timestamps of the data from the auxiliary sensors are corrected and aligned. Additionally, data information from the auxiliary sensors that has not been processed yet is maintained in a buffer.

Generating Pose Information for a Monocular-Auxiliary Sensor where an IMU is Used as the Auxiliary Sensor:

Propagation: Implementations can employ extended Kalman filtering (EKF), shown in a general nonlinear model form by equations (1), to extrapolate an initial pose using inertial data from the multi-axis IMU, to generate a propagated pose:

$$\dot{x} = f(x) + w$$

$$z = h(x) + n \qquad (1)$$

where x denotes a state vector, f denotes a nonlinear function, h denotes observation nonlinear function, n denotes measurement noise, z denotes an observation vector, and w denotes a noise vector.

A linearized version of the discrete-time model of equation (1) is useful for covariance propagation and update, as well as gain computation is illustrated by equations (2):

$$\tilde{X}_{l+1} \approx \varphi_l \tilde{X}_l + w_l$$

$$\tilde{r}_l \approx H_l \tilde{X}_l + n_l \qquad (2)$$

In an implementation, IMU data alone is used to perform propagation of the EKF. This enables certain implementations to provide fast results and at relatively low computation costs. An update process described below is employed to correct for "drifting" that occurs when only inertial information is used in the EKF to determine pose. Propagation can be performed in a number of ways: (i) the propagation happens right after an inertial measurement taken by the IMU arrives; or (ii) delayed propagation happens in a batch right after an image taken by the visual sensors arrives but before the update procedure described below is performed.

In some implementations, a motion sensor keeps a window of readings from the accelerometer of the IMU. The motion sensor computes the variance of the accelerations in the window of accelerator readings and determines whether the mobile unit is moving or static, based on the calculated variance. A variance greater than a predetermined threshold variance indicates the mobile unit is moving, and propagation is performed by using the EKF method. A variance smaller than a predetermined threshold variance indicates the mobile unit is static and propagation is performed by using the EKF method assuming zero velocity. The predetermined threshold variance can be estimated by various techniques as readily apparent to those skilled in the art.

Update: In an implementation, an update process is performed using image information together with IMU buffer samples, which can correct the pose which may be drifted from propagation. In a single observation implementation, based on the current image observation, the information needed for propagation, e.g., features, poses, map points, etc. is prepared. Then 2D-3D correspondence information for the optical flow tracked 2D features is obtained by directly using 2D-2D correspondences from optical flow tracking results. For the remaining 3D map points, smartly search over 3D with adaptive parameters by: (i) if the remaining number of points is small, e.g., below a threshold, perform a linear search, otherwise, (ii) if the remaining number of points is fairly big, e.g., above a threshold, perform a log(n) search with the use of a kd-tree or octree. During search, use previous time period velocity/acceleration to predict a pose so as to narrow the search region. Next, perform update, and generate pose for the current frame using only "good outstanding" points. Alternatively, perform the update twice: first only with high weights "good outstanding" points, then with all the map points. As used herein, the term "good outstanding" points denotes high quality points, e.g., those points having smaller reprojection error and/or being tracked many times in a good state, which can be selected by application of some heuristics.

Figure 12:
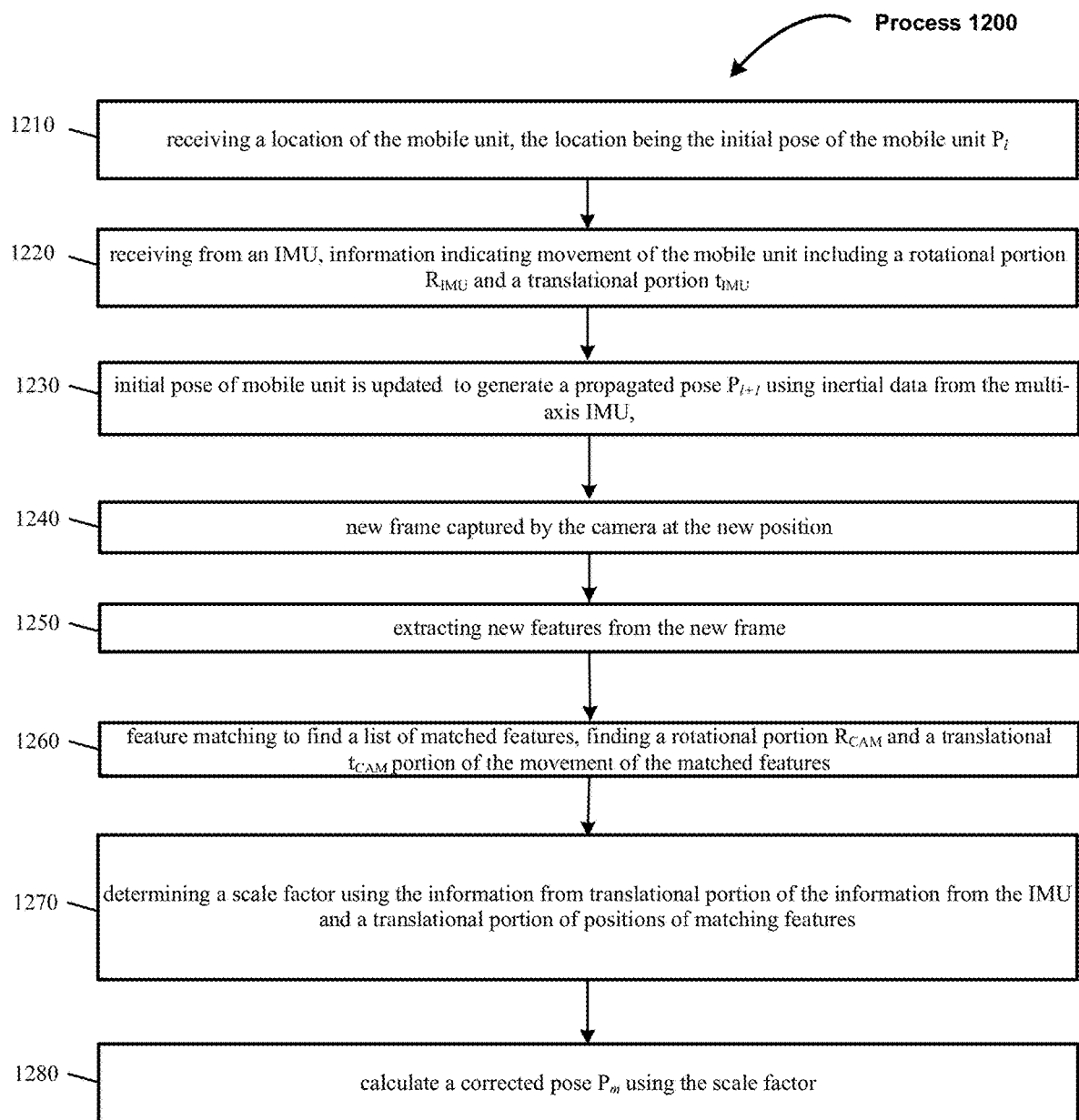
FIG. 12 is a representative method of updating a position of a mobile unit that includes a camera and a multi-axis inertial measuring unit.

FIG. 12 is a representative method 1200 of updating a position of a mobile unit that includes a camera and a multi-axis inertial measuring unit. Flowchart 1200 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 12. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, VR/AR implementation, etc.

At step 1210, a location of a mobile unit is received. Let $P_I$ be the initial pose of the mobile unit.

At step 1220, information is received from the IMU that the mobile unit has moved to a new position. The movement of the mobile unit can be described by a rotational portion of the movement $R_{IMU}$ and a translational portion of the movement $t_{IMU}$.

At step 1230, while waiting for a new frame from the camera from the new position, the initial pose is updated using inertial data from the multi-axis IMU, to generate a propagated pose $P_{l+1}$ at the new location, as shown in equation (3).

$$R_{IMU}[P_l]+t_{IMU}=P_{l+1} \qquad (3)$$

At step 1240, a new frame is captured by the camera at the new location. Features are extracted from the new frame at step 1250. At step 1260, the extracted new features are matched with features from the previous frame and reprojected feature positions from the 3D map onto a 2D view from a perspective of the propagated pose, producing a list of matching features. A rotational portion of the movement $R_{CAM}$ and a translational portion of the movement $R_{CAM}$ as depicted by the movement of the matching features between the successive frames are estimated, as shown in equation (4).

$$R_{CAM}[P_l]+t_{CAM}=P_{l+1} \qquad (4)$$

While the rotational portion of the movement depicted by the camera is accurate, the scale of the translational portion is ambiguous. At step 1270, a scale factor is determined using the information from translational portion of the information from the IMU and a translational portion of positions of matching features, as shown in equation (5).

$$\text{scale factor}=t_{CAM}/t_{IMU} \qquad (5)$$

At step 1280, a corrected pose $P_m$ at the new location is calculated using the scale factor in step 1270, as shown in equation (6).

$$P_m = R_{CAM}[P_l] + \frac{t_{CAM}}{\text{scale factor}} \qquad (6)$$

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

In some implementations, the image update from the camera in the mobile unit with one operational camera can fail due to a blurred image captured due to fast motion of the mobile unit, poor illumination in the surrounding environment, camera's viewpoint is being blocked by an object, etc. Also, there can be a significant number of IMU propagations between two successful image update. After N image consecutive update failures, propagation is performed by using the EKF method on the gyroscope reading of the IMU. Propagation based on the on the gyroscope reading of the IMU predicts a propagated pose by assuming the mobile unit is rotating in place.

Generating Pose Information for a Monocular-Auxiliary Sensor where a WOU is Used as the Auxiliary Sensor:

Propagation: The mobile unit has two wheels which are positioned parallel to each other and equidistant from the center of the mobile unit. The wheels can move forward or backward. The wheels are attached to a rotary encoder, which determines if either wheel has traveled one "unit" forward or reverse along the surface. This unit is the ratio of the circumference of the wheel to the resolution of the encoder. The distance traveled by the mobile unit can be computed from the number of units traveled and the circumference of its wheels. In the case where one wheel is allowed to rotate, while the other remains stationary, the magnitude of the change of position of the center of the robot can be determined using the law of sines. If the left wheel were to move forward one unit while the right wheel remained stationary, then the right wheel acts as a pivot, and the left wheel traces a circular arc in the clockwise direction. If the right wheel were to move forward one unit while the left wheel remained stationary, then the left wheel acts as a pivot, and the right wheel traces a circular arc in the anti-clockwise direction.

The wheel odometry unit supplies the Control Unit 100 the rotation portion of the movement of the mobile unit and translational portion of the movement of the mobile unit.

The lack of depth scale accuracy of a single camera can be greatly improved by using data from the wheel odometry unit. Even if the only operational camera in the monocular system fails (e.g., low light, fog, bright light, hardware or software failures, view obstruction, and so forth), wheel odometry data can be used for propagation. Propagation by the WOU can be performed in a number of ways: (i) the propagation happens right after an odometry measurement taken by the WOU arrives; or (ii) delayed propagation happens in a batch right after an image taken by the visual sensors arrives but before the update procedure described below is performed.

Update: In an implementation, an update process is performed using image information together with WOU buffer samples. In a single observation implementation, based on the current image observation, the information needed for propagation, e.g., features, poses, map points, etc. is prepared. Then 2D-3D correspondence information for the optical flow tracked 2D features is obtained by directly using 2D-2D correspondences from optical flow tracking results. For the remaining 3D map points, smartly search over 3D with adaptive parameters by: (i) if the remaining number of points is small, e.g., below a threshold, perform a linear search, otherwise, (ii) if the remaining number of points is fairly big, e.g., above a threshold, perform a log(n) search with the use of a kd-tree or octree. Next, perform update, and generate pose for the current frame using only "good outstanding" points. Alternatively, perform the update twice: first only with high weights "good outstanding" points, then with all the map points. As used herein, the term "good outstanding" points denotes high quality points, e.g., those points having smaller reprojection error and/or being tracked many times in a good state, which can be selected by application of some heuristics.

Figure 13:
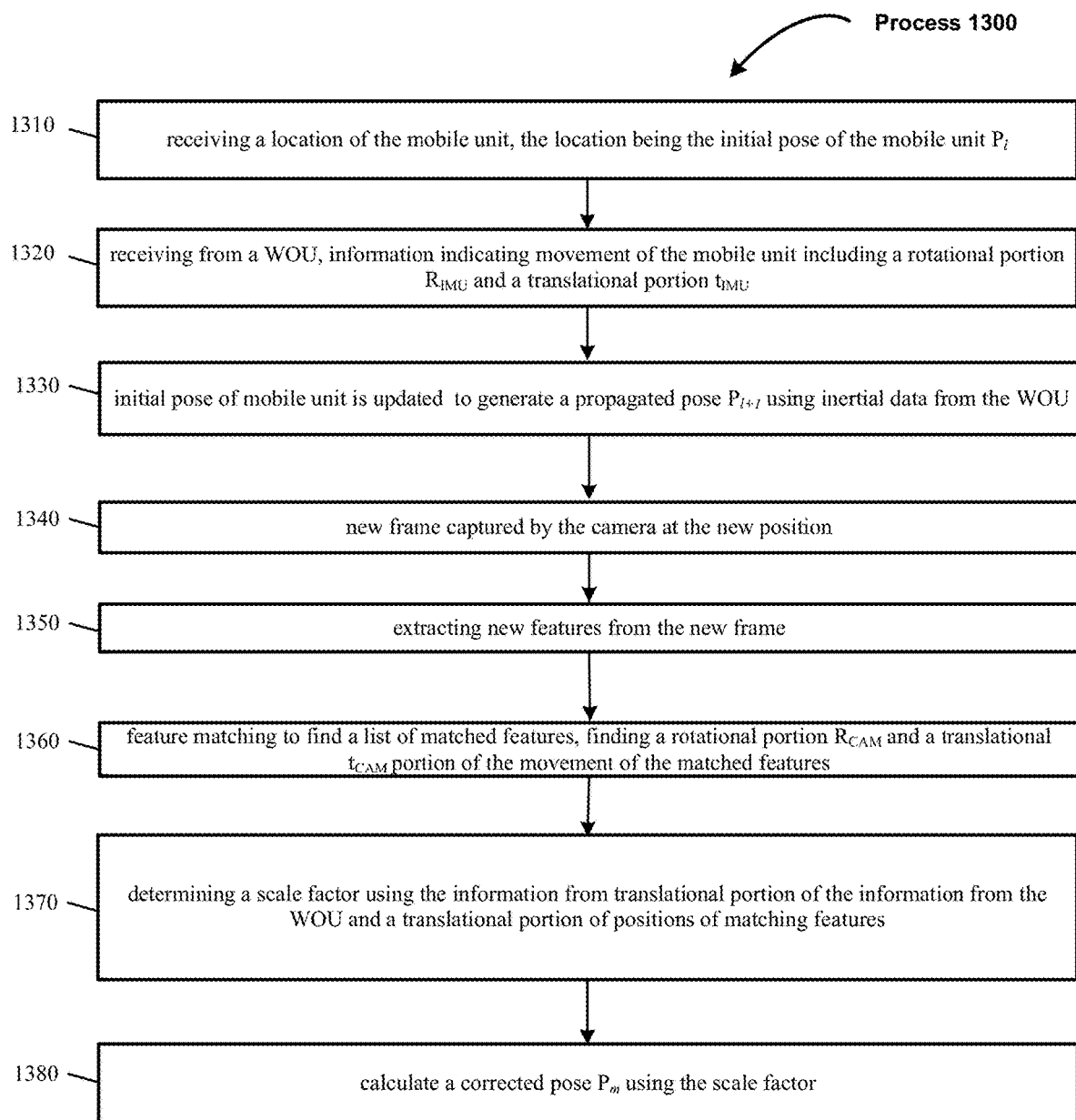
FIG. 13 is a representative method of updating a position of a mobile unit that includes a camera and a wheel odometry unit.

FIG. 13 is a representative method 1300 of updating a position of a mobile unit that includes a camera and a wheel odometry unit. Flowchart 1300 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 13. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, VR/AR implementation, etc.

At step 1310, a location of a mobile unit is received. Let $P_I$ be the initial pose of the mobile unit.

At step 1320, information is received from the WOU that the mobile unit has moved to a new position. The movement of the mobile unit can be described by a rotational portion of the movement $R_{WHEEL}$ and a translational portion of the movement $t_{WHEEL}$.

At step 1330, while waiting for a new frame from the camera from the new position, the initial pose is updated using odometry data from the WOU, to generate a propagated pose $P_{I+1}$ at the new location, as shown in equation (7).

$$R_{WHEEL}[P_I] + t_{WHEEL} = P_{I+1} \quad (7)$$

At step 1340, a new frame is captured by the camera at the new location. Features are extracted from the new frame at step 1350. At step 1360, the extracted new features are matched with features from the previous frame and reprojected feature positions from the 3D map onto a 2D view from a perspective of the propagated pose, producing a list of matching features. A rotational portion of the movement $R_{CAM}$ and a translational portion of the movement $R_{CAM}$ as depicted by the movement of the matching features between the successive frames are estimated, as shown in equation (8).

$$R_{CAM}[P_I] + t_{CAM} = P_{I+1} \quad (8)$$

While the rotational portion of the movement depicted by the camera is accurate, the scale of the translational portion is ambiguous. At step 1370, a scale factor is determined using the information from translational portion of the information from the WOU and a translational portion of positions of matching features, as shown in equation (9).

$$\text{scale factor} = t_{CAM}/t_{IMU} \quad (9)$$

At step 1380, a corrected pose $P_m$ is calculated using the scale factor in step 1370, as shown in equation (10).

$$P_m = R_{CAM}[P_I] + \frac{t_{CAM}}{\text{scale factor}} \quad (10)$$

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above. Generating Pose Information for a Monocular-Auxiliary Sensor where an IMU and a WOU are Used as the Auxiliary Sensors:

Propagation: In a monocular-auxiliary sensor with two auxiliary sensors, a first propagated pose is estimated using image information together with data from one auxiliary sensor. A second propagated pose is estimated from the second auxiliary sensor. A corrected pose is estimated from the first propagated pose and the second propagated pose. Those of ordinary skill in the art will recognize a variety of equivalent variations. In an implementation, an IMU can be the first auxiliary sensor while a WOU can be a secondary auxiliary sensor.

Implementations can employ extended Kalman filtering (EKF), to extrapolate an initial pose using inertial data from the multi-axis IMU, to generate a propagated pose. Propagation by the IMU can be performed in a number of ways: (i) the propagation happens right after an inertial measurement taken by the IMU arrives; or (ii) delayed propagation happens in batch right after an image taken by the visual sensors arrives but before the update procedure described below is performed.

In some implementations, a motion sensor keeps a window of readings from the accelerometer of the IMU. The motion sensor computes the variance of the accelerations in the window of accelerator readings and determines whether the mobile unit is moving or static, based on the calculated variance. A variance greater than a predetermined threshold variance indicates the mobile unit is moving, and propagation is performed by using the EKF method. A variance smaller than a predetermined threshold variance indicates the mobile unit is static and propagation is performed by using the EKF method assuming zero velocity. The predetermined threshold variance can be estimated by various techniques as readily apparent to those skilled in the art.

The wheel odometry unit supplies the Control Unit 100 the rotation portion of the movement of the mobile unit and translational portion of the movement of the mobile unit. Propagation by the WOU can be performed after a first propagated pose from the camera and IMU is received.

Update: In an implementation, an update process is performed using image information together with IMU and WOU buffer samples. In a single observation implementation, based on the current image observation, the information needed for propagation, e.g., features, poses, map points, etc. is prepared. Then 2D-3D correspondence information for the optical flow tracked 2D features is obtained by directly using 2D-2D correspondences from optical flow tracking results. For the remaining 3D map points, smartly search over 3D with adaptive parameters by: (i) if the remaining number of points is small, e.g., below a threshold, perform a linear search, otherwise, (ii) if the remaining number of points is fairly big, e.g., above a threshold, perform a log(n) search with the use of a kd-tree or octree. Next, perform update, and generate pose for the current frame using only "good outstanding" points. Alternatively, perform the update twice: first only with high weights "good outstanding" points, then with all the map points. As used herein, the term "good outstanding" points denotes high quality points, e.g., those points having smaller reprojection error and/or being tracked many times in a good state, which can be selected by application of some heuristics.

Figure 14:
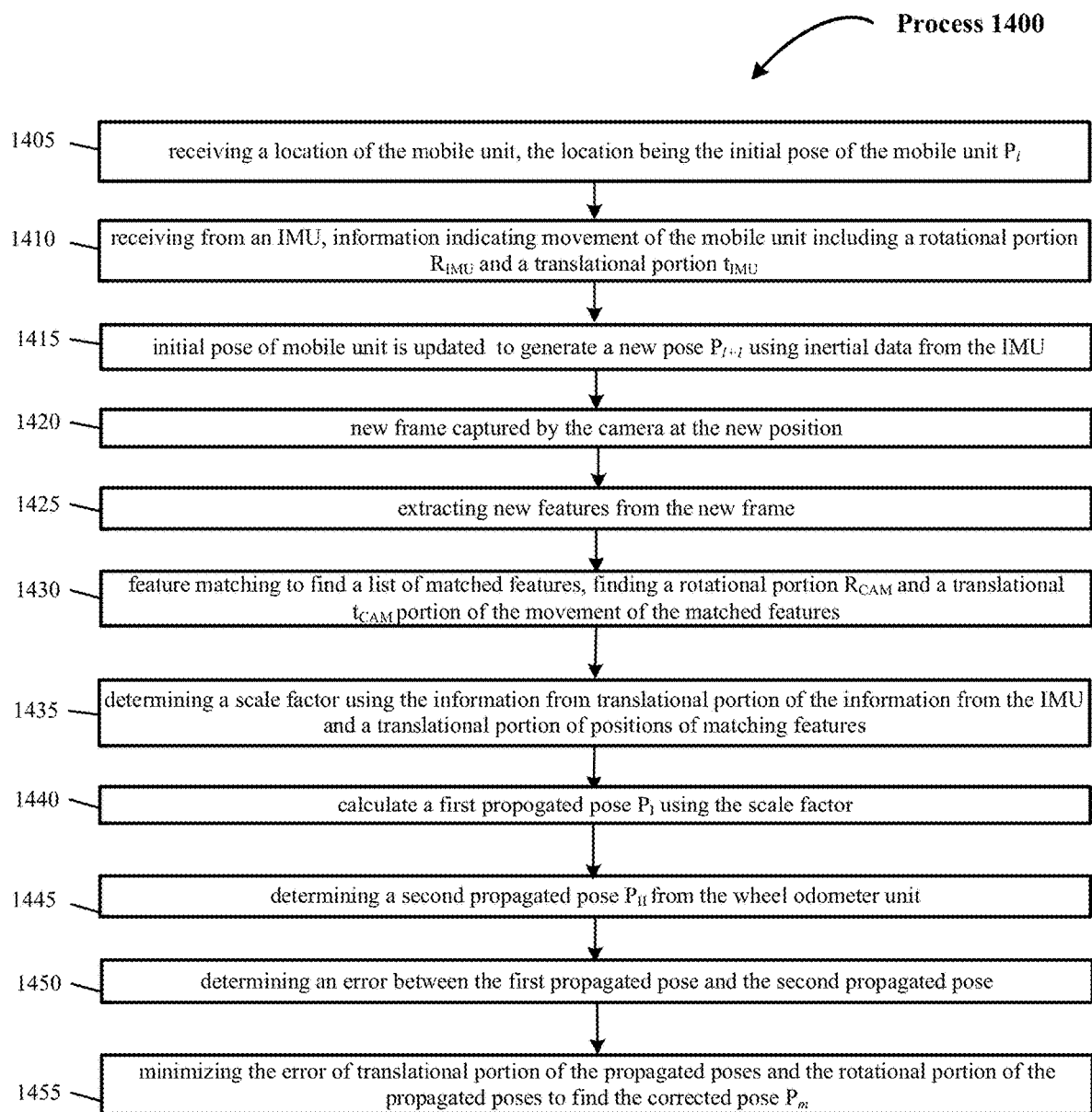
FIG. 14 is a representative method of updating a position of a mobile unit that includes a camera, an inertial measuring unit and a wheel odometry unit.

FIG. 14 is a representative method 1400 of updating a position of a mobile unit that includes a camera, a multi-axis inertial measuring unit, and a wheel odometry unit. Flowchart 1400 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 14. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, VR/AR implementation, etc.

At step 1405, a location of a mobile unit is received. Let $P_I$ be the initial pose of the mobile unit.

At step 1410, information is received from the IMU that the mobile unit has moved to a new position. The movement of the mobile unit can be described by a rotational portion of the movement $R_{IMU}$ and a translational portion of the movement $t_{IMU}$.

At step 1415, while waiting for a new frame from the camera from a new position, the initial pose is updated using inertial data from the multi-axis IMU, to generate a new pose $P_{i+1}$ at the new location, as shown in equation (11).

$$R_{IMU}[P_i]+t_{IMU}=P_{i+1} \tag{11}$$

At step 1420, a new frame is captured by the camera at the new location. Features are extracted from the new frame at step 1425. At step 1430, the extracted new features are matched with features from the previous frame and reprojected feature positions from the 3D map onto a 2D view from a perspective of the propagated pose, producing a list of matching features. A rotational portion of the movement $R_{CAM}$ and a translational portion of the movement $R_{CAM}$ as depicted by the movement of the matching features between the successive frames are estimated, as shown in equation (12).

$$R_{CAM}[P_i]+t_{CAM}=P_{i+1} \tag{12}$$

While the rotational portion of the movement depicted by the camera is accurate, the scale of the translational portion is ambiguous. At step 1435, a scale factor is determined using the information from translational portion of the information from the IMU and a translational portion of positions of matching features, as shown in equation (13).

$$\text{scale factor}=t_{CAM}/t_{IMU} \tag{13}$$

At step 1440, a first propagated pose $P_I$ is calculated using the scale factor in step 1435, as shown in equation (14).

$$P_m = R_{CAM}[P_i] + \frac{t_{CAM}}{\text{scale factor}} \tag{14}$$

At step 1445, a second propagated pose $P_{II}$ is received from the wheel odometer unit.

At step 1450, an error is determined between the first propagated pose $P_I$ and the second propagated pose $P_{II}$.

At step 1455, error between the first propagated pose $P_I$ and the second propagated pose Pu is minimized using an optimization technique. In one embodiment, the optimization technique can be Newton's method. In another embodiment, the optimization technique can be gradient descent method. Those of ordinary skill in the art will recognize a variety of equivalent variations. After the error between the first propagated pose $P_I$ and the second propagated pose $P_{II}$ is minimized, a corrected pose $P_m$ is reached.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

In some implementations, the image update from the camera in the mobile unit with one operational camera can fail due to a blurred image captured due to fast motion of the mobile unit, poor illumination in the surrounding environment, camera's viewpoint is being blocked by an object, etc. Also, there can be a significant number of IMU propagations between two successful image update. After N image consecutive update failures, propagation is performed by using the EKF method on the gyroscope reading of the IMU. Propagation based on the on the gyroscope reading of the IMU predicts a propagated pose by assuming the mobile unit is rotating in place.

Generating Pose Information for a Monocular-Auxiliary Sensor where a Depth Sensor is Used as the Auxiliary Sensor:

Propagate and Update: A "sparse driven" approach is used to gather depth information for propagation in a monocular-auxiliary sensor where a depth sensor is used as the auxiliary sensor. When a mobile unit travels to a new position with a new camera viewpoint, a table of depth values is populated for some pixel coordinates of the pixelated new frame from the camera from the new position. Based on the current image observation, the information needed for propagation, e.g., features, poses, map points, etc. is prepared. Then 2D-3D correspondence information for the optical flow tracked 2D features is obtained by directly using 2D-2D correspondences from optical flow tracking results. For the remaining 3D map points, smartly search over 3D with adaptive parameters by: (i) if the remaining number of points is small, e.g., below a threshold, perform a linear search, otherwise, (ii) if the remaining number of points is fairly big, e.g., above a threshold, perform a log(n) search with the use of a kd-tree or octree. Next, perform update, and generate pose for the current frame using only "good outstanding" points. Alternatively, perform the update twice: first only with high weights "good outstanding" points, then with all the map points. As used herein, the term "good outstanding" points denotes high quality points, e.g., those points having smaller reprojection error and/or being tracked many times in a good state, which can be selected by application of some heuristics.

From the list of "good outstanding" features, features with no corresponding reading from the depth sensor and unreliable depth information are removed. Depth values for the remaining features on the list of "good outstanding" features are retrieved from the table of depth values, and a weighted average depth value is calculated for each feature with all the available pixel coordinates for that feature. The 2D features with the weighted depth scale are used to populate a 3D map; thereby initializing the 3D map for use.

Figure 15:
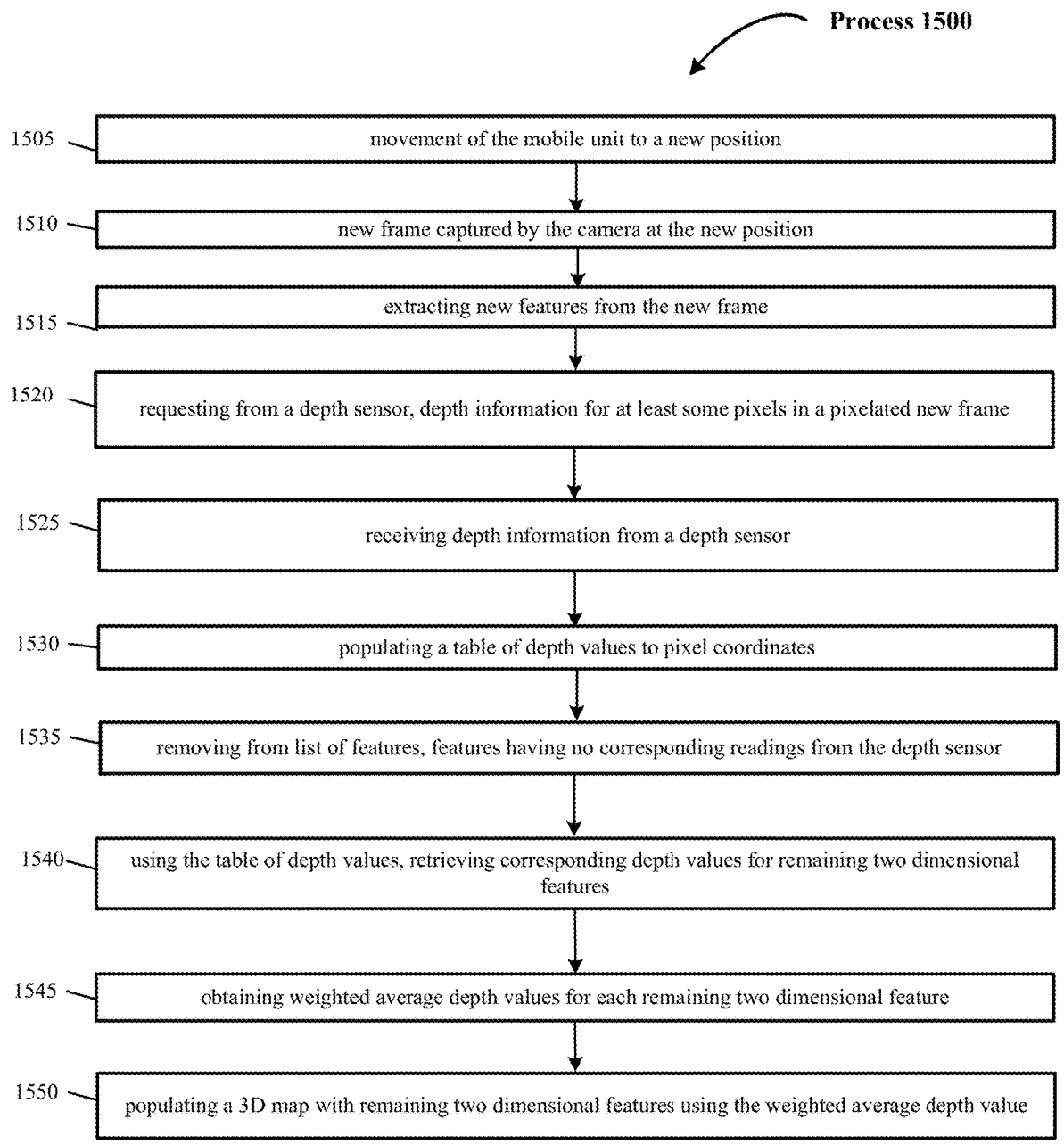
FIG. 15 is a representative method of updating a position of a mobile unit that includes a camera with a depth sensor.

FIG. 15 is a representative method 1500 of updating a position of a mobile unit that includes a camera and a depth sensor. Flowchart 1500 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 15. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, VR/AR implementation, etc.

At step 1505, a mobile unit travels to a new position with a new camera viewpoint. At step 1510, a new frame is captured by the camera at the new location. Features are extracted from the new frame at step 1515 and the extracted features are stored in a list of features. At step 1520, the system requests depth information from some pixels in the new frame from the depth sensor. At step 1525, the system receives depth information for the requested pixels in the new frame from the depth sensor. At step 1530, the system populates a table of depth values to the requested pixel coordinates with the information received from the depth sensor. At step 1535, features on the list of features with no corresponding reading from the depth sensor or unreliable depth information are removed. At step 1540, depth values for the remaining features on the list of features are retrieved from the table of depth values. At step 1545, a weighted average depth value is calculated for each remaining feature in the feature list with the depth values of all the available pixel coordinates for that feature. At step 1550, a 3D map is populated with the remaining list of features on the list of the features with their corresponding depth value.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

SIM: Smart Map Interaction and Localize

Smart interaction with map (SIM) processor 1114 enables smart interaction by a device being guided (i.e., receiving positional awareness information from the monocular-auxiliary sensor system) with a known map in order to localize itself. Accordingly, one implementation of a smart interaction map processor 1114 processing includes:

Perform a query of the map based on a need and a current status. Some query components included by specific implementations are map points (xyz, uncertainty, average reprojection error, etc.), keyrigs' poses, 2D-3D constraint information, and occupancy grid (one layer or multiple layer). As used herein, the term keyrig denotes a set of image data received. In some implementations, the sets of image data include feature points and pose information. The pose information includes a location of the mobile device and view of the camera that captured the image data. The sets of image data are referred to collectively as keyrigs.

If the map as a whole is not big, e.g., meets a particular threshold size, return the entire map.

Otherwise, if the map is big, e.g., meets or exceeds a particular threshold size and covers large areas, e.g., spatial area meets or exceeds a particular threshold, smartly grab a local region of map based on the device's current position.

If some area of the map is known to have bad quality, don't use it.

Adaptively down-sample map based on system performance according to an adaptive parameter. For example: (i) if the 3D feature-based tracking process has been accurate, e.g., below a threshold number of errors or invocations of relocalization processing to relocalize a device that has lost its place, then reduce the sample size to conserve resources, otherwise, (ii) if the device is getting lost frequently, e.g., meets or exceeds a threshold, then increase the sample size to provide better tracking.

SDAR: Manage Localization State and Response Strategy

System diagnostics and response (SDAR) processor 1103 performs system level management of current localizing state of a monocular-auxiliary sensor and provides response strategy. In one implementation, the system diagnostics and response processor 1103 monitors tracked map points and corresponding reprojection error, monitors the longevity of untracked map points, and suggests actions to mapping module, monitors device speed/acceleration/jitter/drift, monitors map "activity" (i.e., is it updated regularly?), performs new added map contribute enough to the overall mapping (i.e., so it's not doing useless hovering?), monitors keyrig topology (i.e., stretch enough or too much?), suggests when and where the device should add keyrig, and monitors feature extractor pipeline Relocalize a Lost Device Re-locator 1122 recovers a device that has lost track of its positional from this state. Once re-locator 1122 returns the lost device back on track, the device can resume normal interacting with smart interaction map processor 1114, and/or can contribute to map building, using the techniques described herein below.

Relocalization

Figure 16A:
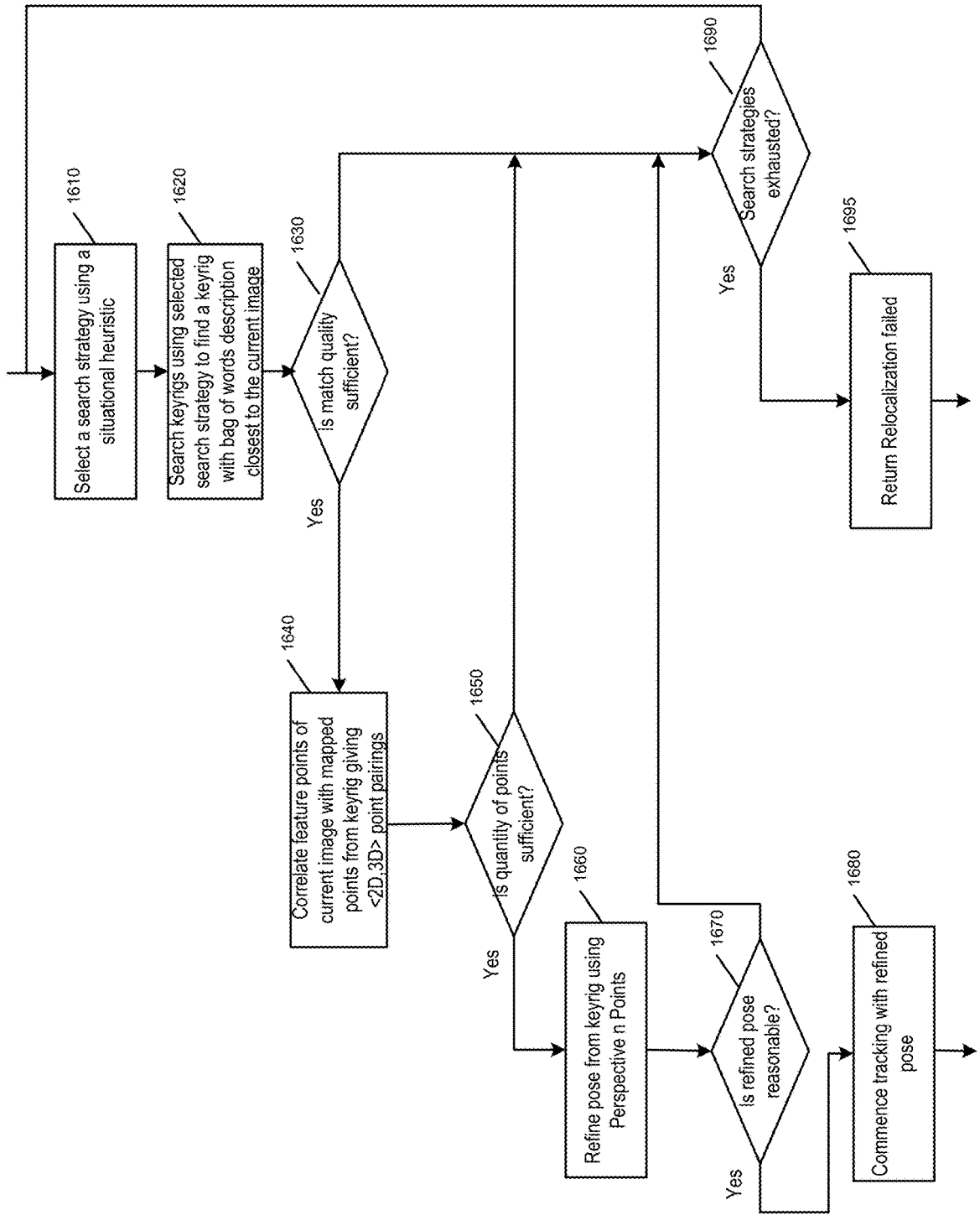
FIG. 16A illustrates an example relocalization process for a tracking system implementing the tracking process.

FIG. 16A illustrates an example of a relocalization process in one implementation. Accordingly, one implementation of relocalization processing 1600A includes:

In action 1610, a search strategy is selected using a situational heuristic. For example, if there are many keyrigs, (e.g., >50) and a fast recovery is needed, and then select a search strategy of performing a best match (on Bag-of-Words features) among the keyrigs, and using the best-matched keyrig's pose as end-result. In another example, if it is determined that the system is well on-track before lost, then select a search over only the local (e.g., most recent x keyrigs) keyrigs for fast recovery. In a further example, if the system needs multiple hypotheses before further refinement, then select a search strategy that includes using the few best matches (on Bag-of-Words features). Other types of search strategies can be triggered using appropriate heuristics indicating a correspondence between the search strategy and one or more environmental variables (e.g., lighting change, visibility change due to fog, steam or mist, etc.) or one or more state variables (e.g., previously was tracking well before getting lost, had just performed a previous attempt to relocalize which has now failed, etc.).

In action 1620, the keyrigs are searched using the selected search strategy in order to find among the keyrigs a keyrig with bag of words description closest to a bag of words description of a current image.

In action 1630, determine whether the match quality is sufficient. This can be determined by applying a threshold to a quality of match indication or by other means. For example, a match quality indicator ranges from 0, denoting complete difference, to 1, denoting an exact match. A corresponding match quality threshold can be 0.85 indicating a minimum passing match quality. If the match quality is sufficient, then continue with action 1640. Otherwise, continue with action 1690 to check whether an alternative search strategy can be employed, or if available applicable search strategies have been exhausted, and continue processing in action 1610 with an alternative search strategy or in action 1695 return an error condition indicating that the relocalization failed.

In an action 1640, correlate feature points of the current image with mapped points from the keyrig selected in action 1620, yielding <2D, 3D> point pairings. The point pairings indicate a relationship between the 2D current image and the 3D map of the selected keyrig.

In an action 1650, determine if the quantity of points is determined to be sufficient. This can be determined by applying a threshold to the quantity of 2D image points having a correspondence with a 3D point in the map of the selected keyrig. For example, in one implementation 6 or more points are sufficient; while in another implementation 20-30 points are required. If the quantity of points is sufficient, then continue with action 1660. Otherwise, continue with action 1690 to check whether an alternative search strategy can be employed, or if available applicable search strategies have been exhausted, and continue processing in action 1610 with an alternative search strategy or in action 1695 return an error condition indicating that the relocalization failed.

In action 1660 refine the pose from the best matched keyrig and perform perspective-n-points (PnP)—or other pose estimation method that computes a pose from 2 sets of 2D image features. While any of a wide variety of PnP implementations can be used to refine pose information, one OpenCV API called solvePn-PRansac has been found to perform acceptably in an example implementation. Further description of the solvePnPRansac API can be obtained with reference to "Camera Calibration and 3D Reconstruction" //docs.opencv.org/master/d9/doc/group_calib3d.html #gsc.tab-0 (last accessed Aug. 22, 2016).

In an action 1670, determine whether the refined pose is reasonable. In one implementation a refined pose is considered reasonable if the refined pose meets criteria: (i) the refined pose is sufficiently similar (e.g., within a tolerance or below a threshold) in position and perspective from the pose of the identified keyrig selected based upon the matching in action 1620; and (ii) reprojection of 3D points in the <2D, 3D> point pairings identified in action 1640 yields a new 2D point on the 2D image plane, where the new 2D point has coordinates sufficiently similar (e.g., within a tolerance or below a threshold) to the original 2D point of the <2D, 3D> point pairing. If the defined pose is reasonable, then continue with action 1680. Otherwise, continue with action 1690 to check whether an alternative search strategy can be employed, or if available applicable search strategies have been exhausted, and continue processing in action 1610 with an alternative search strategy or in action 1695 return an error condition indicating that the relocalization failed.

Figure 16B:
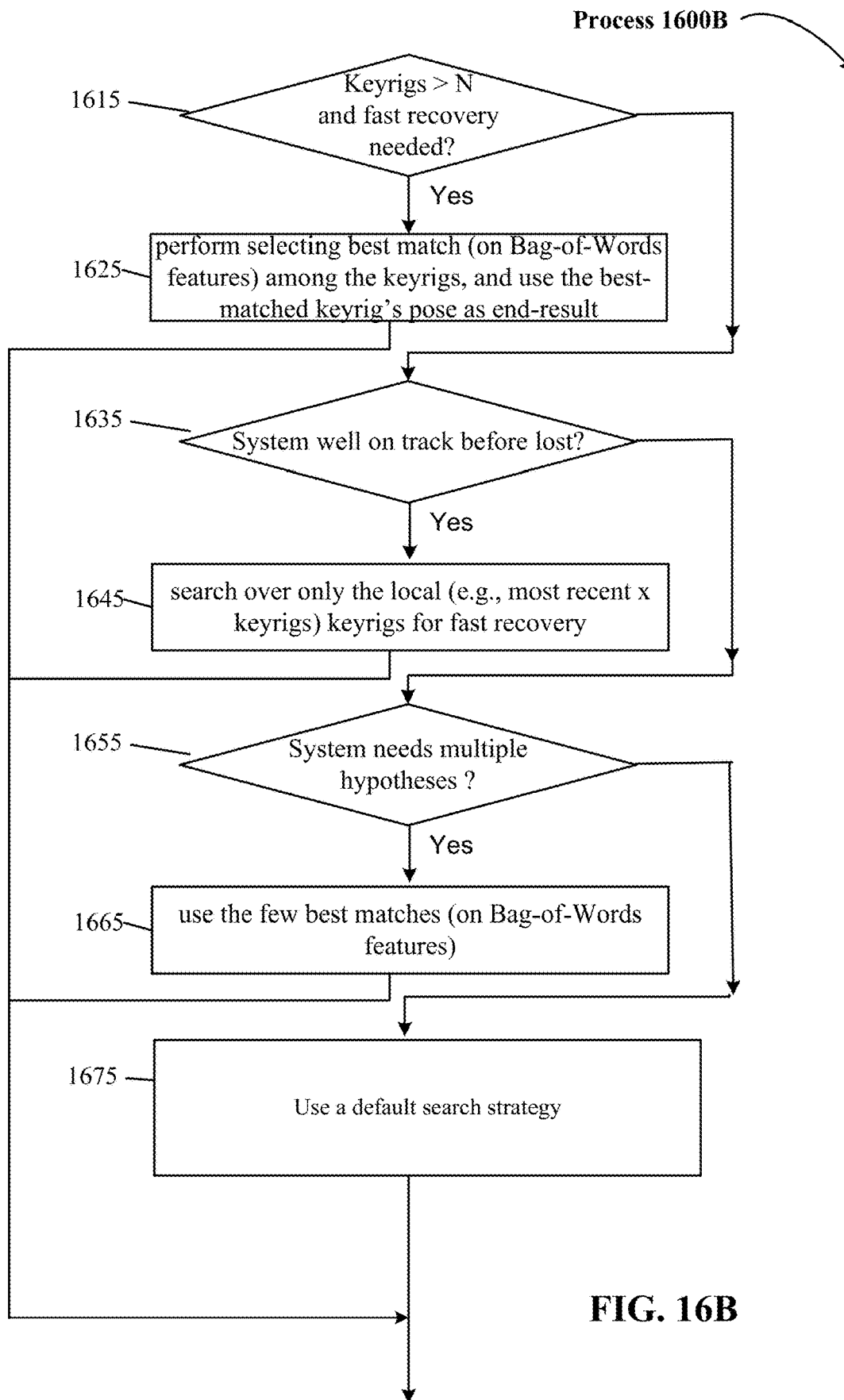
FIG. 16B illustrates an example of a relocalization search strategy selection process in one implementation.

In an action 1680, commence tracking with the refined pose. Also, record the whole recovery information, and:
  update machine state with the refined pose information as the current pose
  put the device back on track with some uncertainty FIG. 16B illustrates an example of a relocalization search strategy selection process in one implementation. Accordingly, one implementation of the processing 1600B provides selecting a search strategy using a situational heuristic that includes:

In action 1615, determine whether there are many keyrigs, (e.g., >N, where N in an positive integer) and whether a fast recovery is needed. If this is the case, then in an action 1625, select a search strategy of performing a best match (on Bag-of-Words features) among the keyrigs, and using the best-matched keyrig's pose as end-result.

In an action 1635, it is determined whether the system was well on-track before lost. If this is the case, then in an action 1645, select a search over limited to the local keyrigs (e.g., most recent X keyrigs) for fast recovery.

In an action 1655, determine whether the system needs multiple hypotheses before further refinement. If this is the case, then in action 1665, select a search strategy that includes using the few best matches (on Bag-of-Words features).

In an action 1675 a default search strategy is selected in the event that a situation is encountered that does not meet criterion specified by at least one of the heuristics. Other types of search strategies can be triggered using appropriate heuristics indicating a correspondence between the search strategy and one or more environmental variables (e.g., lighting change, visibility change due to fog, steam or mist, etc.) or one or more state variables (e.g., previously was tracking well before getting lost, had just performed a previous attempt to relocalize which has now failed, etc.).

Geometric information obtained by 3D feature-based tracking is used to construct a hybrid grid that represents the features in a map useful in guiding a mobile device. The process of performing this task is described next with reference to examples depicted by FIG. 19.

Mapping

In implementations, geometric information obtained by a 3D feature-based tracking process is represented using a descriptive point cloud representation. The descriptive point cloud is a set of sparse 3D points, where each point encodes a 3D geometric location, an uncertainty of the geometric location, and a set of 2D location plus appearance-based descriptors, each observed by a keyrig. A keyrig contains (i) a Timestamp where the images in the keyrig is captured; (ii) a pose (i.e. the transformation from the monocular-auxiliary sensor's coordinate to the map coordinate at the current time) and its uncertainty; and (iii) a sequence of readings from the auxiliary sensors starting from a first temporal point before the timestamp to a second temporal point after the timestamp. Some implementations further include a flag to specify whether the monocular-auxiliary sensor is moving or static. This flag can be set from information obtained from the IMU readings.

Hybrid Representation

Implementations represent the spatial information perceived by a 3D feature-based mapping system and optionally an active ranging sensor (placed in parallel to the ground plane) using a hybrid point grid representation. One example implementation of a hybrid point grid representation combines a descriptive point cloud and a multi-layer 2D occupancy grid map.

The occupancy grid map can be a plane oriented substantially perpendicular to the direction of gravity. Each layer has a specific height. (The layer on the floor is typically 0 according to one convention). FIG. 17 illustrates an example of an occupancy grid map in one implementation. Occupancy grid 1700 of FIG. 17 indicates a single layer, such as a floor layer 1702, mapped by an implementation of the monocular-auxiliary sensor. The white portions of occupancy grid 1700 indicate empty space—in other words space that has been determined by the monocular-auxiliary sensor to be unoccupied. For example, when the monocular-auxiliary sensor is able to look through the room door and window to note space beyond the walls of the room that is unoccupied, these regions are marked accordingly in occupancy grid 1700. Portions in solid black indicate space that is occupied by an object or obstacle. The gray portions indicate space that the monocular-auxiliary sensor has not yet determined whether these spaces are occupied or empty.

A 3 degrees of freedom transform that relates the descriptive point cloud coordinates to the gravity-based coordinates. For example, if the normal vector of the ground plane (i.e., gravity) is known, first rotate the point cloud so that the z-axis of the point cloud is parallel to the gravity, using a 3-by-3 rotation matrix R=R_pitch*R_roll. Then, (optionally) translate the point by [0, 0. T_z] so that the z=0 is on the ground plane. Note, a normal 3-by-3 rotation matrix has 3 degrees of freedom (R_yaw, *R_pitch*R_roll), however in this case are only 2 degrees. A normal 3-by-1 translation has 3 degrees of freedom ([t_x, t_y, t_z]), but here there is only 1 degree.

Creating a Point Cloud for Features Representation

Implementations incrementally create a descriptive point cloud from the results of 3D feature-based tracking by adding keyrigs according to a criterion, such as in a following example. Result of 3D feature based tracking is received in sets of image data that include feature points and pose information. The pose information includes a location of the mobile device and view of the camera that captured the image data. These sets are referred to collectively as keyrigs. Accordingly, an implementation builds a descriptive point cloud by selecting keyrigs using one or more criteria such as for example the following:

- The first image frame is selected as a keyrig, and the device coordinate frame at that timestamp become the coordinates of the descriptive point cloud. This establishes a frame of reference.
- The latest keyrig's timestamp is less than current timestamp for a time threshold (typically 2 sec).
- The distance between the current tracked pose to the latest keyrig's location is larger than a threshold (e.g., x meters).
- The distance between the current tracked pose to the latest keyrig's pointing angle is larger than a threshold (e.g., y degrees)
- The current image contains a percentage of features not included in the current descriptive point cloud.
- The device is currently static. This information can be obtained from information from the auxiliary sensors.

If the keyrig being considered for addition contains features not included in the current descriptive point cloud, triangulate the new features from images captured from the device at this timestamp to obtain the points in the device's coordinate frame. Add the new points to the map by transforming the points from the device's coordinate frame to the map's coordinate frame. Noteworthy is that some implementations include one or more of (i) triangulating new feature points across images from a current/same keyrig (e.g. between left and right cameras), (ii) triangulating new feature points across images from two different keyrigs, wherein the two different keyrigs are not necessarily in sequence (e.g. left camera from keyrig 1 to left camera from keyrig 10), and (iii) triangulating new feature points from images in keyrigs chosen based upon a criterion (e.g., smart selection of an "optimal" keyrig). The transform is determined using feature-based tracking or other methods.

Refining a Point Cloud

In one implementation, a descriptive point cloud from the 3D feature-based tracking is refined by obtaining an "optimal" (i) pose of each keyrig and (ii) 3D locations of all the points that minimizes weighted sum of re-projection errors of all the points projected to their observed keyrigs, and (iii) optionally, the accelerometer readings from keyrigs with static flag must be [0, 0, 1] to force the z-axis of the map coordinate to be closer to gravity direction, while fulfilling the following constraint (if applicable): the pose moves along a plane (if the device is mounted on a vehicle with planar motion).

In one implementation, refining a descriptive point cloud from the 3D feature-based tracking is performed with limited computation resources by the following processing:

Randomly sample N number of keyrigs from the entire set of keyrigs.

Accurately refine the pose of the sample set of keyrigs and the 3D points observed in these keyrigs by minimizing the weighted sum of the (i) re-projection errors of all the points projected to their observed keyrigs, and (ii) optionally, the accelerometer readings from keyrigs with static flag must be [0, 0, 1] to force the z-axis of the map coordinate to be closer to gravity direction, while fulfilling the following constraints (if applicable): the pose moves along a plane (if the device is mounted on a vehicle with planar motion).

Repeat the sampling and minimizing except fixing the 3D points and the poses that have already been optimized from the previous iteration.

Iterate until a desired percentage of keyrigs and points are optimized.

Creating a Hybrid Point Grid

In one implementation, an initial hybrid point grid representation is created from a descriptive point cloud using the following processing:

Transform the descriptive point cloud from its original coordinate frame to a coordinate frame where z-axis is along the gravity direction. This transformation has 2 degrees of freedom (in rotation).

Initialize a 2D occupancy grid map for layers that cover the x-y points in the descriptive point cloud.

Each layer of the occupancy grid map is filled in by points (in the descriptive point cloud) within a height range using ray tracing process.

Refining a Hybrid Point Grid

In one implementation, the hybrid point grid representation is refined using information from active sensors using the following processing:

Obtain the pose, (transform from the device coordinate to the map's coordinate) where each active sensor's signal is captured, from the trajectory of the device in the map's coordinate frame.

Use ray tracing process to update the 2D occupancy grid map.

In one implementation, the refining hybrid point grid representation from an updated descriptive point cloud is performed using the following processing:

Transform the descriptive point cloud's coordinate frame to the gravity-based coordinate frame.

Use ray tracing process to determine which cells to update from each point in the descriptive point cloud.

Estimating a Trajectory for a Guided Device

In one implementation, an offline trajectory of a device between two consecutive keyrigs (i.e. from keyrig k to keyrig k+1) in a descriptive point cloud is estimated using the following processing:

Initialize the image frame that creates keyrig k to be at its pose stored in the descriptive point cloud.

Use the "3D feature-based tracking process" as described herein under section heading "Tracking" to track the image frames between the two keyrigs. Each image frame has 6-degrees of freedom pose, and a set of correspondences of 3D map point to 2D image observed location.

Force the image frame that creates keyrig k+1 to be at its pose stored in the descriptive point cloud.

Figure 18:
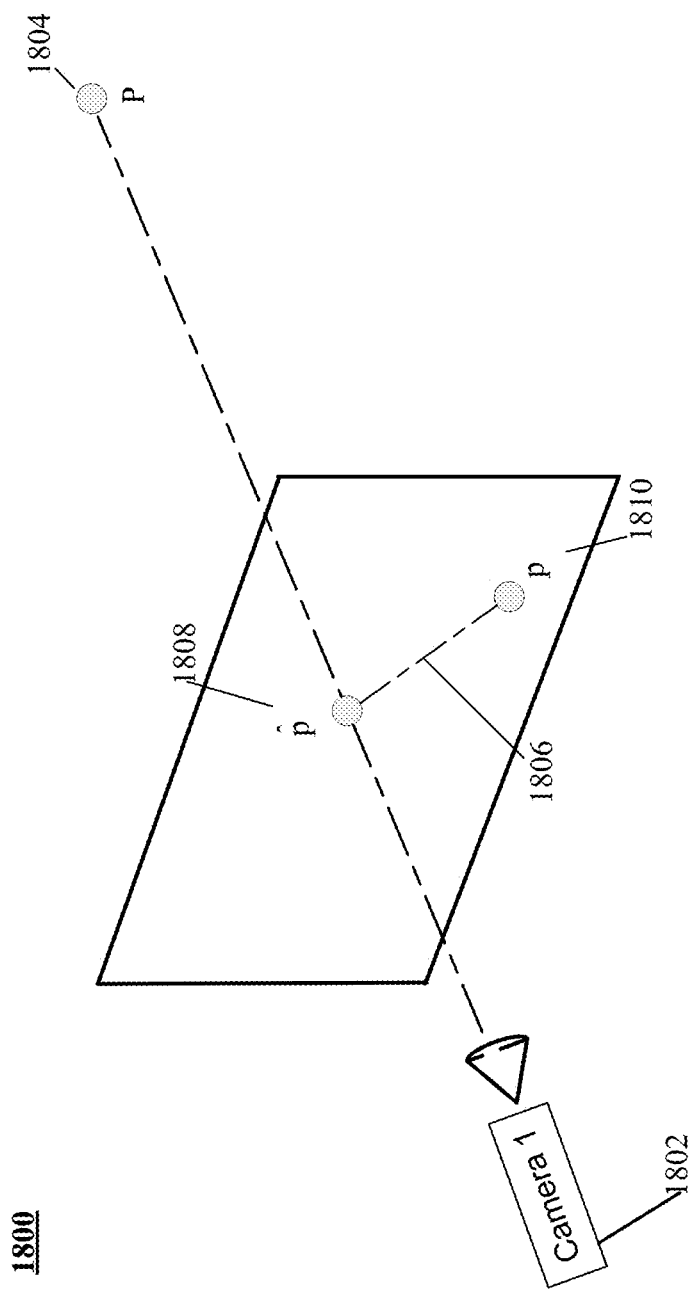
FIG. 18 illustrates an example of reprojection error.

Refine all the poses by minimizing the sum of reprojection errors of all observed locations. The reprojection error is the error between a reprojected point in the camera coordinate frame and the original point. FIG. 18 illustrates an example of reprojection 1800. In FIG. 18, some points in the reference frame of camera 1802 are used to triangulate one or more new 3D points P 1804 in the world coordinate frame. Due to errors in the calibration of the camera(s) 1802, the spatial position of point P 1804 will not be completely accurate. The reprojection error 1806 can be determined from the resulting 3D point P 1804 re-projected into the coordinates of the camera 1802 (using the calibration data for the camera), obtaining a new point p 1808 near the originally projected p 1810. The reprojection error 1806 is the straight line distance between the original point p 1810 and the reprojected point p̂ 1808.

Estimating a Transform for a Descriptive Point Cloud and Gravity Based Frame

In one implementation, the 2 degrees of freedom coordinate transform between the descriptive point cloud to a coordinate where z-axis is along the gravity direction is estimated using any of the following methods:

Measuring the gravity direction from the auxiliary sensors while it is static, and find a rotation matrix that transforms the gravity direction to [0, 0, 1].

Obtain at least 3 points on the ground-plane from the descriptive point cloud to estimate the ground-plane's normal in the original coordinate. Find a rotation matrix that transforms the ground-plane's normal to [0, 0, 1] or [0, 0, −1].

Offline calibrate the relation between the monocular-auxiliary sensors to the ground by placing a known planar pattern on the ground to determine the rotation matrix.

Robot Implementation

Figure 19:
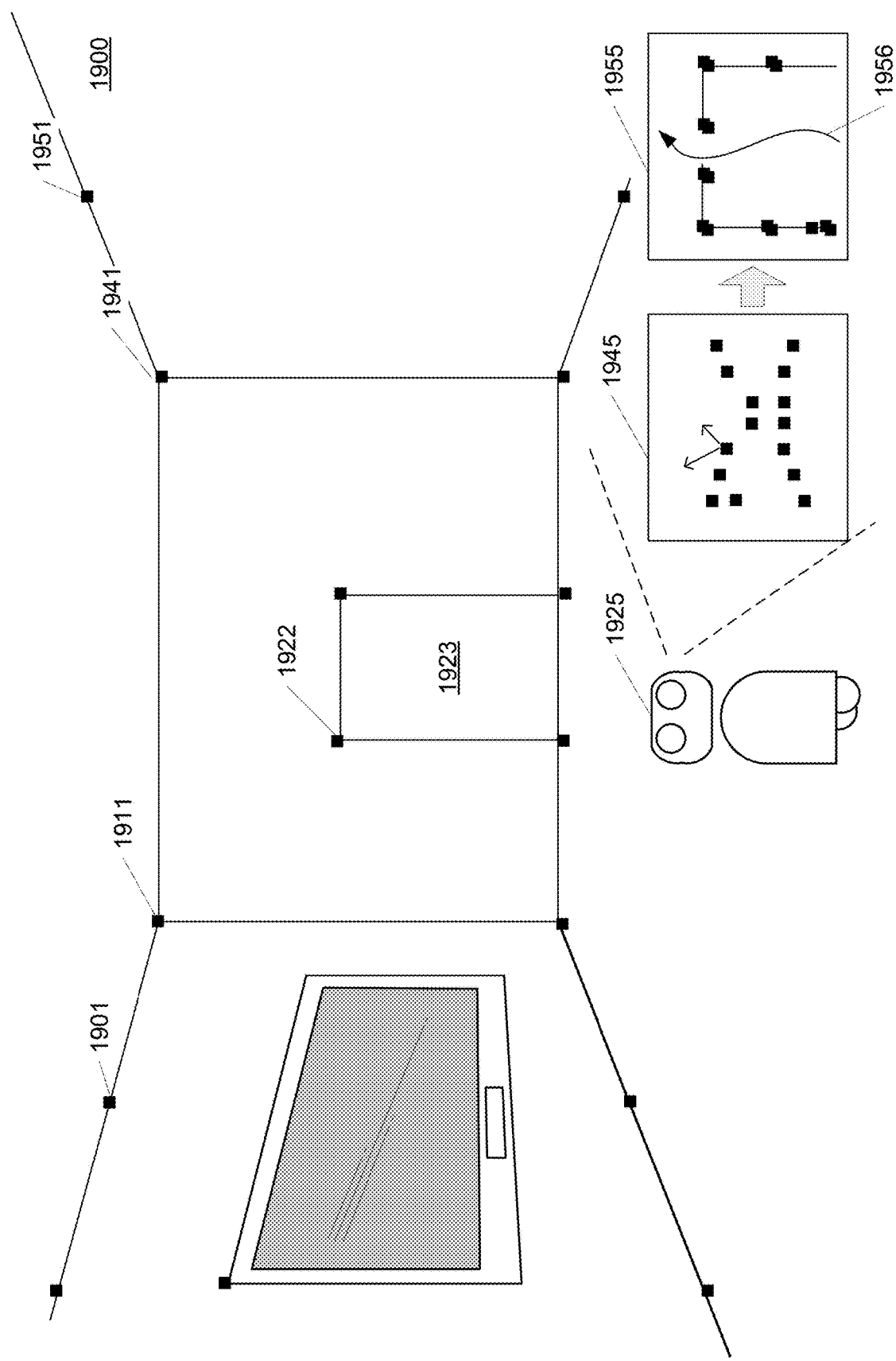
FIG. 19 illustrates an example robot guidance application in which one implementation can be embodied.

FIG. 19 illustrates an example model of robot guidance using image and auxiliary sensor information techniques described herein. Examples of robot applications that benefit from employing positional awareness techniques such as described herein include:

Caregiver and Service robots (traveling on a ground plane)

A robot vacuuming/mopping/cleaning the floor.

A robot being commanded to carry objects around the environment.

A telepresence robot moving around a remote environment automatically.

A robot butler that follows a person around.

In each of the scenarios listed above, the robot utilizes the technology disclosed herein in order to track its own location and to recognize the objects that it encounters. Also, since the robot performs many complex tasks, each with real-time constraints, it is beneficial that the sensing be done rapidly to accelerate the perception pipeline. In implementations, this can be achieved by offloading some computation from the main processor to the monocular-auxiliary sensor. In addition, since it is a mobile robot, which carries limited storage capacity battery, energy consumption is a design point. In implementations, some computational tasks are off loaded from the main processor to the monocular-auxiliary sensor to reduce power consumption, thereby enabling implementations to achieve overall energy efficiency. Cost is an issue in mobile robots, since lowering the cost of the robot makes the robot affordable to more customers. Hence cost can be another factor for sensor and guidance system design. In implementations, one low-cost grayscale sensor is used for localization tasks, and one colored sensor for recognition tasks. This design point enables these implementations to significantly reduce the cost over a stereo colored sensor designs without sacrificing performance.

In FIG. 19, the walls, corners and door 1923 of room 1900 as well as the travels of service robot 1925 on the floor of room 1900 are reflected in the hybrid point grid, comprised of descriptive point cloud 1945 and occupancy grid 1955, developed by the monocular-auxiliary sensor using the technology described herein above in the Mapping section. The occupancy grid 1955 is a part of the hybrid point grid that is a layer of the multi-layer 2D occupancy grid map described in the Mapping section. To build a map of an unknown (newly exposed) environment, the monocular-auxiliary sensor equipped robot 1925 keeps track of its pose using the technology described herein above in the Tracking section while incrementally building an initial descriptive point cloud using the technology described herein above in the Mapping section. Then, the robot 1925 builds an occupancy grid 1955 to complete the hybrid point grid from the initial descriptive point cloud 1945 using the technology described herein above in the Mapping section.

Obtain Real Time Image and Information from Auxiliary Sensors

In order to track its location, the robot senses its own movement through monocular-auxiliary sensor. The monocular-auxiliary sensor generates reliable data from auxiliary sensors so that the tracking and mapping pipeline that follows can accurately infer the robot's location. FIG. 19 illustrates an example robot guidance application in which one implementation can be embodied. As illustrated by FIG. 19, robot 1925 implements monocular-auxiliary sensor to self-localize within a room 1900. The robot 1925 in FIG. 19 employs the camera 602 of a monocular-auxiliary sensor in order to capture image frames of the surrounding environment of room 1900. The images are processed according to the technology disclosed herein above under the Sensor Visual Data Generation and Processing section as follows:

Detect and Describe Features in Captured Images

Monocular-auxiliary sensor determines feature points 1901, 1911, 1941, 1951, 1922, and so forth for the walls, corners and door 1923 of room 1900 from the information in the captured image frames. In some implementations, Shi-Tomasi feature detection is employed to determine the feature points 1901, 1911, 1941, 1951, 1922 from the image frames. Features are assigned descriptors using ORB feature description. Optical flow techniques are used to determine 2D correspondences in the images, enabling matching together features in different images.

Map Feature Descriptors to a Hybrid Point Grid

The monocular-auxiliary sensor equipped robot 1925 can build a descriptive point cloud 1945 of the obstacles in room 1900 enabling the robot 1925 to circumnavigate obstacles and self-localize within room 1900. Monocular-auxiliary sensor creates, updates, and refines descriptive point cloud 1945 using feature descriptors determined for room features indicated by points 1901, 1911, 1941, 1951, 1922 using the technology disclosed herein above under the Mapping sections. As depicted schematically in FIG. 19, descriptive point cloud 1945 includes coordinates and feature descriptors corresponding to the feature points 1901, 1911, 1941, 1951, 1922 of room 1900. Monocular-auxiliary sensor prepares an occupancy map 1955 by reprojecting feature points 1901, 1911, 1941, 1951, 1922 onto a 2D layer corresponding to the floor of the room 1900. In some implementations, second and possibly greater occupancy maps are created at differing heights of the robot 1925, enabling the robot 1925 to navigate about the room 1900 without bumping its head into door soffits, or other obstacles above the floor.

Now with renewed reference to FIG. 17, which illustrates an example of an occupancy grid 1700, the white portions indicate empty space—in other words space that has been determined by monocular-auxiliary sensor to be unoccupied. Portions in solid black indicate space that is occupied by an object or obstacle. The gray portions indicate space that the monocular-auxiliary sensor of robot 1925 has not yet determined whether these spaces are occupied or empty.

The descriptive point cloud 1945 and occupancy grid 1955 comprise a hybrid point grid that enables the robot 1925 to plan paths of travel through room 1900, using the occupancy grid 1955 and self-localize relative to features in the room 1900 using the descriptive point cloud 1945.

Using the Occupancy Grid and Path Planning

When the robot is activated in a previously mapped environment, the robot uses the technology described herein above in the Tracking sections to self-locate within the descriptive point cloud 1945. In cases where the robot finds itself in an unmapped environment, the occupancy grid and path planning can be used without a previously built map by using the SLAM system described herein above to build a map in real-time, thereby enabling the robot to localize itself in the unmapped environment. The descriptive point cloud 1945 and occupancy grid 1955 comprise a hybrid point grid representation that is key to enabling robot action (i.e. moving on the floor) using passive sensors because the robot uses the occupancy grid 1955 in order to plan a trajectory 1956 from its current location to another location in the map using the technology described herein above in the Mapping sections. A person or entity can also command the robot to go to a specific point in the occupancy grid 1955. While traveling, the robot uses the descriptive point cloud 1945 to localize itself within the map as described herein above in the Tracking sections. The robot can update the map using the techniques described herein above in the Mapping sections. Further, some implementations equipped with active sensors (e.g. sonar, LIDAR) can update the map using information from these sensors as well.

Using the Robot Architecture to Conduct Indoor Applications

Figure 28A:
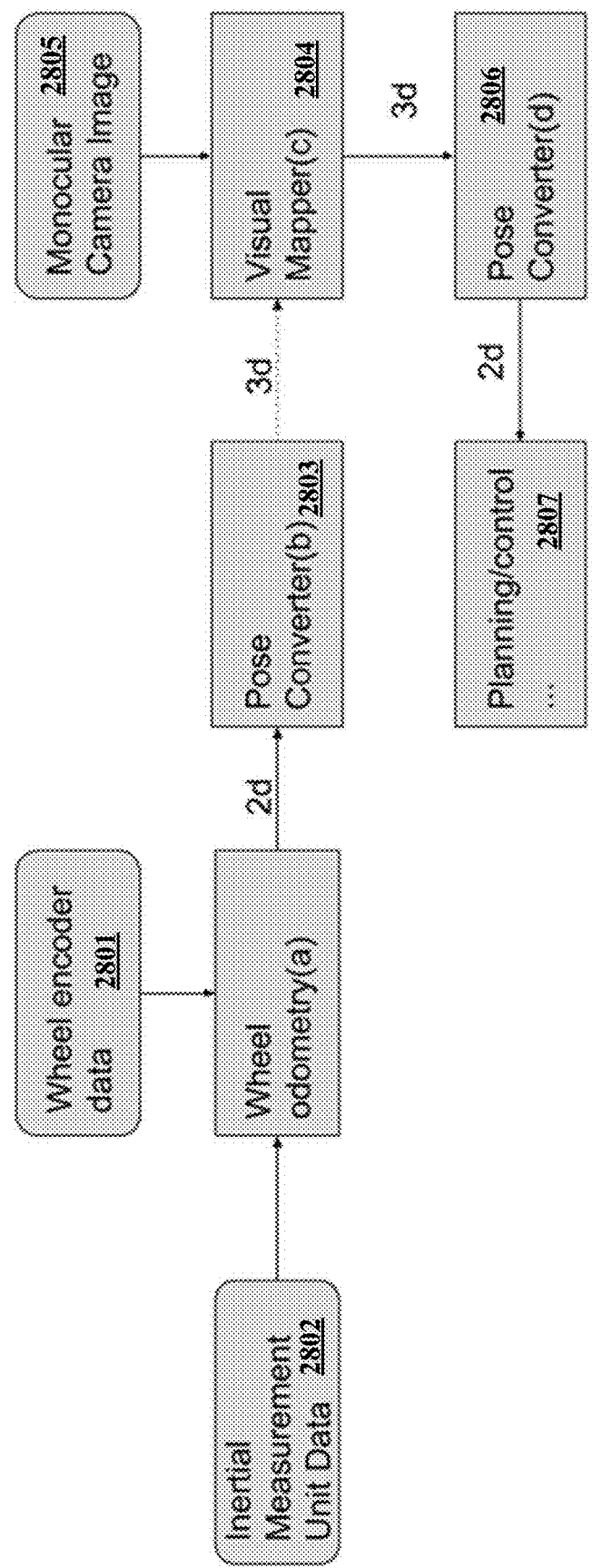
FIG. 28A illustrates an example system overview for a robot suited for indoor task implementations.

FIG. 28A illustrates an example system overview for a robot suited for indoor task implementations. Such robots can include without limitation caregiver and service robots (traveling on a ground plane), robots suited for performing floor coverage applications, robots commanded to carry objects around the environment, telepresence robots moving around a remote environment automatically, robot butlers that follow a person around and so forth. Briefly, with reference to FIG. 28A, robot 2800A includes:

Wheel Odometry

Robot architecture 2800A employs wheel encoder information 2801 (e.g., left and right wheel rotation measurement) and inertial measurement unit (imu) information 2802 (e.g., angular velocity) to estimate the robot position in a two dimensional (2D) global coordinate system.

Pose Converter

Robot architecture 2800A employs a pose converter 2803 to convert 2d robot pose for the robot to a 3d camera pose, since there is translation and rotation between robot coordinate system and camera coordinate system. In an embodiment, pose converter 2803 implements a 3d coordinate transform.

Visual Mapper

Robot architecture 2800A employs a visual mapper 2804 to implement a novel and heretofore unmade simultaneous location and mapping (slam) system. Implementations use 3d pose information calculated by the pose converter 2803 from wheel odometry sensed by wheel encoder 2801 and image information 2805 sensed by monocular camera to build a 3d map of the indoor environment. This map is used to correct the accumulated measurement error from 2d dead reckoning wheel odometry and is discussed in further detail herein below. The dashed arrow in FIG. 28A indicates that we can use exclusively image information to localize robot once a 3d map is built. This is useful when robot is hijacked and wheel odometry is unavailable.

Pose Converter

Robot architecture 2800A employs a pose converter 2806 to convert the corrected 3d pose in camera coordinate to 2d pose in a global coordinate system.

Planning Control

Robot architecture 2800A employs a planning and control process 2807 that uses 2d pose information from the pose converter 2806 to plan and control the robot.

The foregoing is illustrative of the many variations of robot architecture 2800A implemented in various embodiments. Application specific details will vary, necessitating changes such as additional items and processing. Alternatives exist and can be substituted for one or more of the processes and hardware depicted by FIG. 28A.

Visual Mapper

Figure 28B:
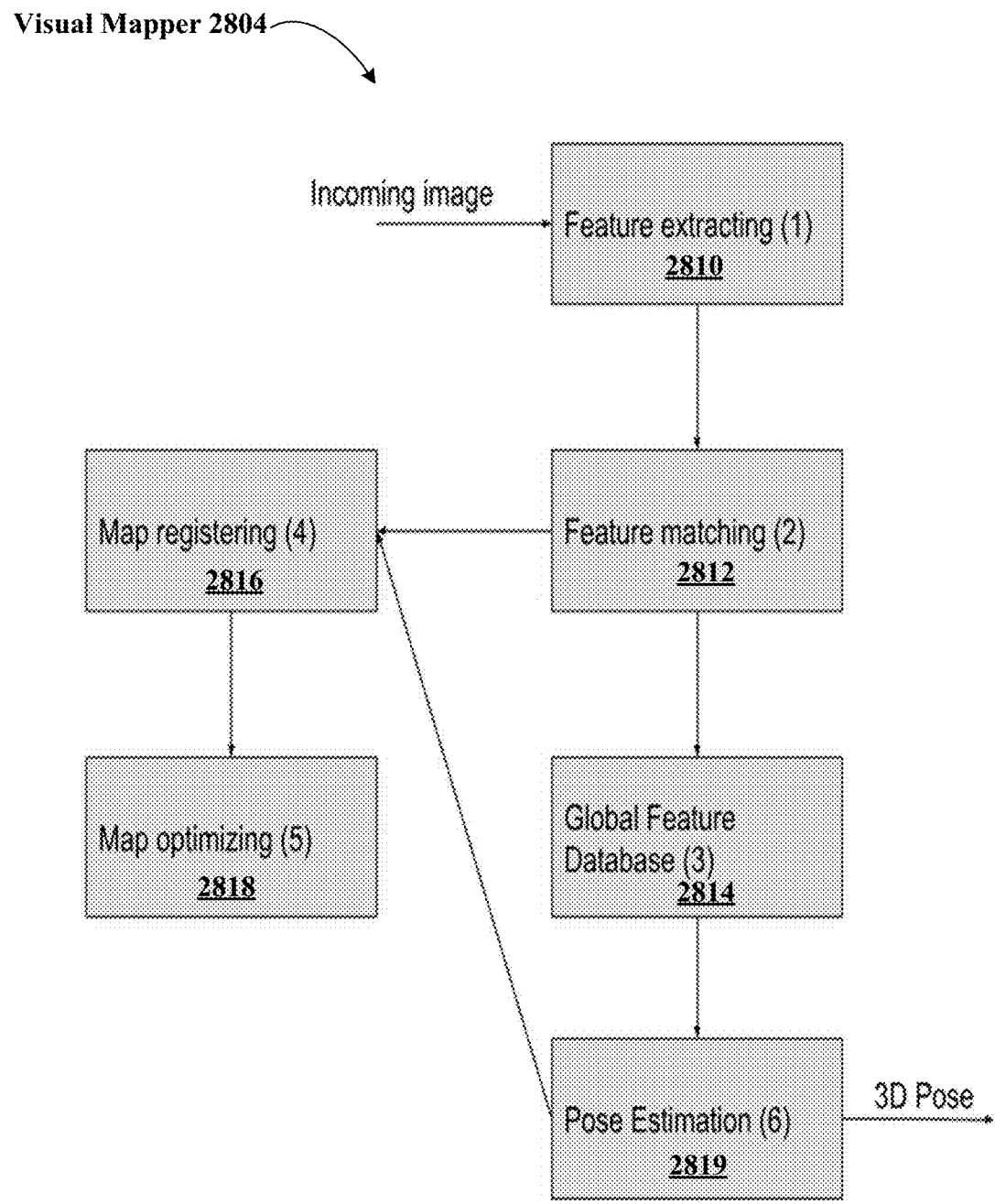
FIG. 28B illustrates an example implementation of visual mapper in one embodiment.

FIG. 28B illustrates an example implementation 2800B of visual mapper in one embodiment. In FIG. 28B, visual mapper 2804 of FIG. 28A is implemented by a plurality of connected and related processes:

Feature Extracting:

Feature extracting 2810 extracts specific features such as corners or lines from image and convert those features into descriptors; wherein the descriptors are unique in same image and the same in different images.

Feature Matching

Feature matching 2812 match descriptors of features extract in current image with descriptors in previous images.

Global Feature Database

A global feature database 2814 is used to convert all the descriptors of image into certain index. A database manager is used to add current image features and its index into the global feature database.

Map Registering

Map registering 2816 uses the matching relationship from feature matching 2812 and the related image pose to obtain the 3d position of the matched features. A map builder builds the map with these 3d points and descriptors.

Map Optimizing

Map optimizing 2818 minimizes the error of map points and each camera pose subject to a minimization function.

$$\frac{1}{j}\sum_{n=1}^{j}|q_{j_{image}} - P(R, T)p_{j_{map}}| + \alpha\sum_{n=1}^{k}|\delta x_{wheel_k} - \delta x_{RT_k}| +$$
$$\beta\sum_{n=1}^{k}|\delta y_{wheel_k} - \delta y_{RT_k}| + \gamma\sum_{n=1}^{k}|\delta\theta_{wheel_k} - \delta\theta_{RT_k}|$$

Wherein, q is the pixel location(x,y) in image coordinates, P(R,T) is a 3D coordinate transform matrix which transforms pjmap (3D map points in map coordinates) to 2D image coordinate. R stands for rotation, T stands for translation. In an implementation, the pose is calculated based on 2D constraint. The recovered pose is 2d format. (x, y, theta).

Pose Estimation

Pose estimation 2819 uses the matching relationship from feature matching 2812 and the map built by map registering 2816 to obtain correspondence of features in current image and 3d points in the map. This correspondence is then used to estimate the pose of the camera.

Map Registration

Figure 28C:
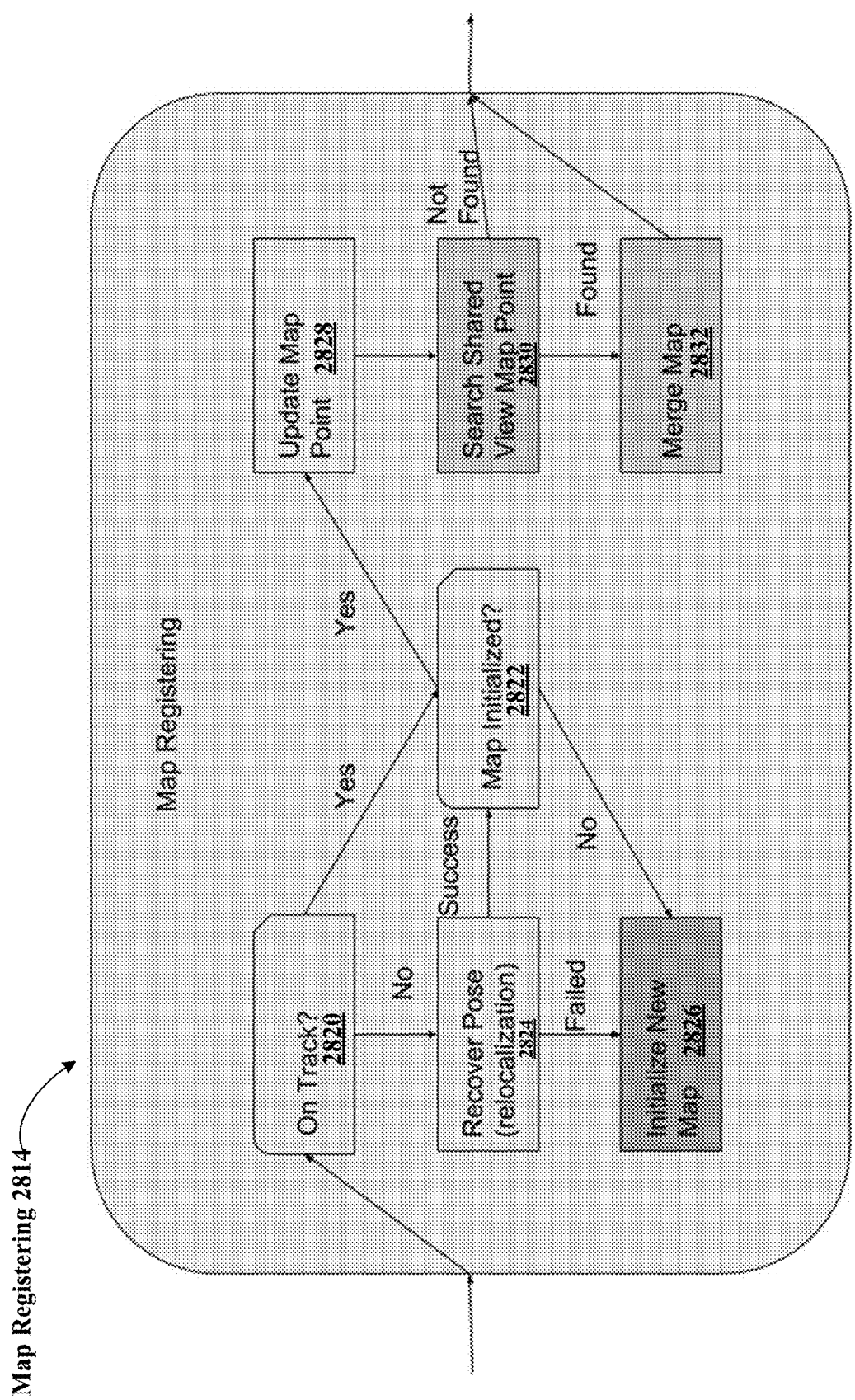
FIG. 28C illustrates an example map registering process for a multi-map tracking system implementing one embodiment of the tracking process.

FIG. 28C illustrates an example map registering process 2800C for a multi-map tracking system implementing one embodiment of the tracking process. In FIG. 28C, map registering 2814 of FIG. 28B is implemented by a plurality of connected and related processes:

In an action 2820, the robot determines whether it is "On track". In one implementation, determining whether a robot is on track includes determining whether there is sufficient feature match correspondence. Implementations can apply a threshold to a quantity of matched features in images matched with a stored map. Some implementations will compare a quantity of matched features with unmatched features. Still other implementations will compute a statistical window of confidence based upon the quantity of matched features.

If the robot determines that it is on track, processing continues with action 2822. In an action 2822, in which the robot determines whether the map is initialized. In one implementation, determining whether the map is initialized includes determining whether a map with 3d points exists (e.g., has already been created by/for the robot). If no map is initialized, processing continues with action 2826 in which a new map is initialized.

Otherwise, if the robot determines in action 2820 that it is not on track, processing continues with action 2824 in which the pose is recovered. In action 2824, a recover pose process uses extract features process 2810 (FIG. 28B) in which a search is conducted to find a potential close candidate to features extracted from the image in the global feature database. Candidate(s) are located and a set of candidates is built. Then, the feature matching is again performed, between the candidates in the set and current images. Next, 2d-3d correspondences between matched feature(s) from the candidates and the map are found. The correspondences are used to calculate and recover the pose of current image.

In an action 2826, the system initializes a new map using the correspondences. In action 2826, a new map is created based on the current image frame (keyrig). Using features matched between a current image and a previous image, calculate a set of 3d points for the features. These points are used to construct a new 3d map.

In an action 2828, the system updates map points by using feature matches between the current image and a previous image to calculate 3d points for the features. Then, a check whether these points are already in map is made; and if the calculated points do not already exist in the map, insert the calculated points into the map. Otherwise, if one or more calculated points already exist in the map, then extra observation is added for optimization purposes.

Figure 29:
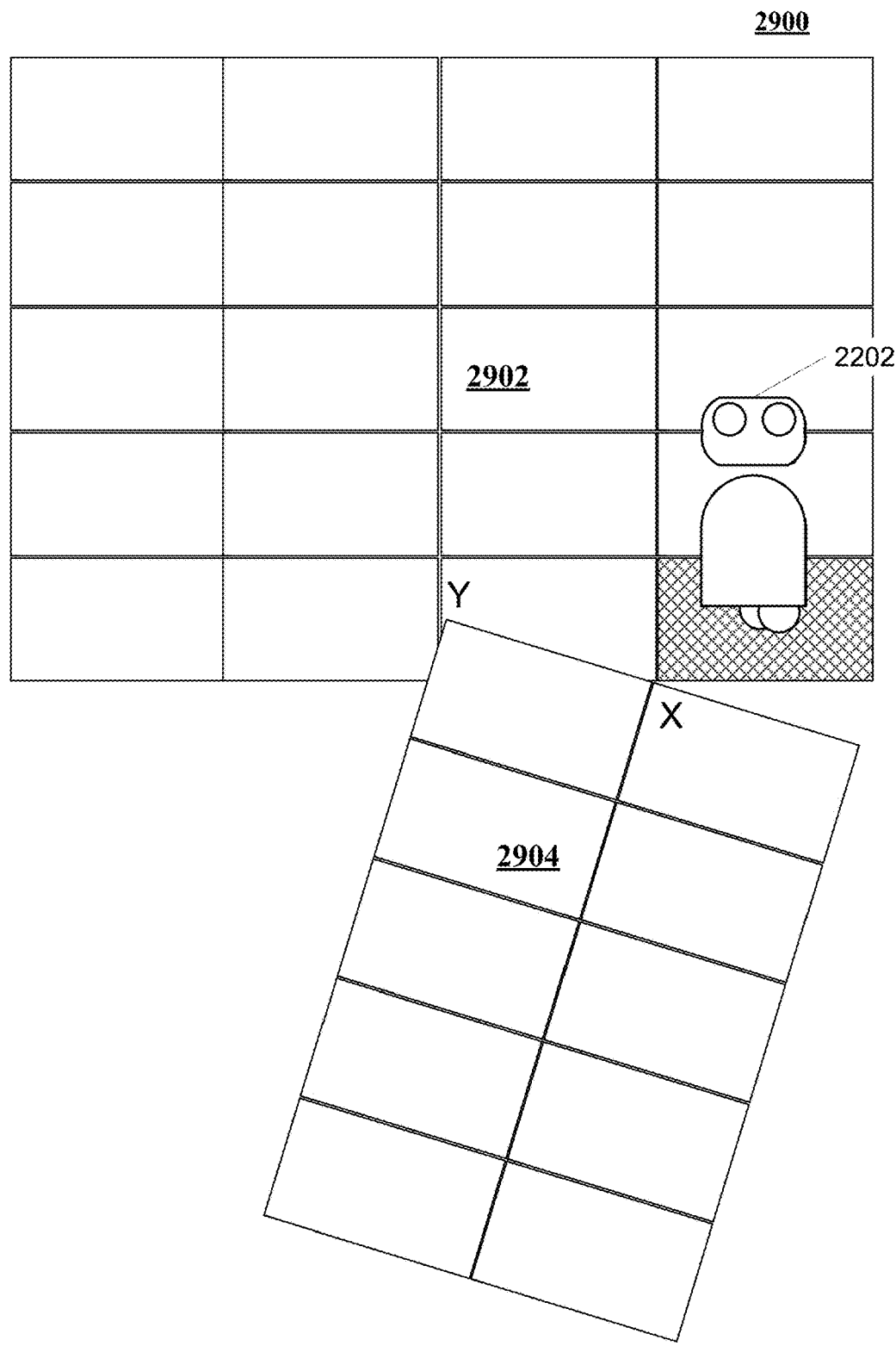
FIG. 29 illustrates an example of a robot in one mapped area detecting a feature and determining from matching the detected feature to stored features a new mapping for an unmapped area in one implementation.

In an action 2828, a search for a shared view map point is conducted when multiple maps exist. Using the current image frame, find close images from global feature database. Closeness can be determined by number of matching features, or other metric. If a candidate is not the same map of the current image, match the feature of current image and this candidate. Otherwise, in action 2830, use the feature match to find a 3d-3d correspondence between two maps. Then, using the 3d-3d correspondence, determine difference in orientation/coverage (i.e., "geometry") between the maps. Use this difference (e.g., expressed as a transformation) to the current map so that points of the current map are expressed in coordinates of the previous map, and merge the current map into the previous map. FIG. 29 illustrates an example of a robot 2202 in one mapped area 2902 detecting a feature X and determining from matching feature X to stored features a new mapping for an unmapped area 2904 in one implementation.

Using the Occupancy Grid to Control Behavior and Perform Path Planning

In one implementation, planning is implemented using a plurality of state machines. A representative architecture includes three layers, comprising a Motion commander level, a Robot commander level and a Planner level. These state machines are configured to issue a command (s) once the state is changed. In our example, the Motion commander is the low-level robot motion controller. It controls the robot go forward, rotate and wall-follow. The Robot Commander is the mid-level robot commander. It controls the robot do some modular motions including zigzag moves, waypoint moves, enter unknown space, etc. The Planner is the highest level robot planner. It describes the planning how robot will conduct an area coverage application (e.g, inspecting a factory floor, i.e. locating stray parts, imperfections, lack of level, etc., cleaning a floor, surveying a surface area, etc.). As the robot moves, a process gathers sensory information from the camera(s), tactile and non-tactile sensors of the robot platform and wheel odometry information from one or more wheel sensors, from which the robot's position in its environment and the positions and locations of obstacles are updated in an occupancy grid map (OGM). When a sensed position for the robot differs from a mapped, computed position for the robot by a predefined threshold, a re-localization process is triggered. Certain implementations use thresholds between 1 cm. and 1m. One embodiment employs a 0.5 m. threshold.

Figure 22:
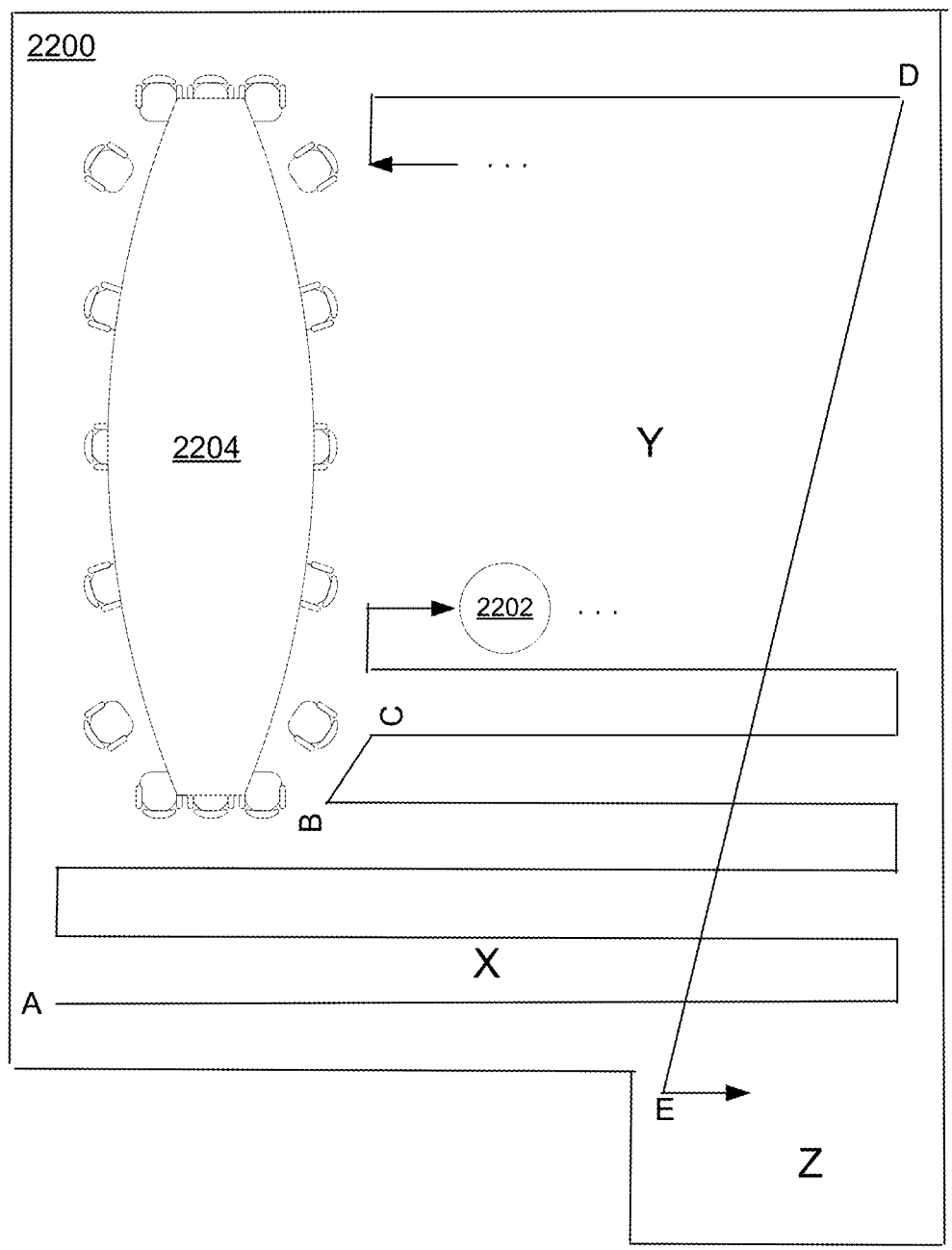
FIG. 22 illustrates an example area coverage application enabled by a planner process implementation.
Figure 23:
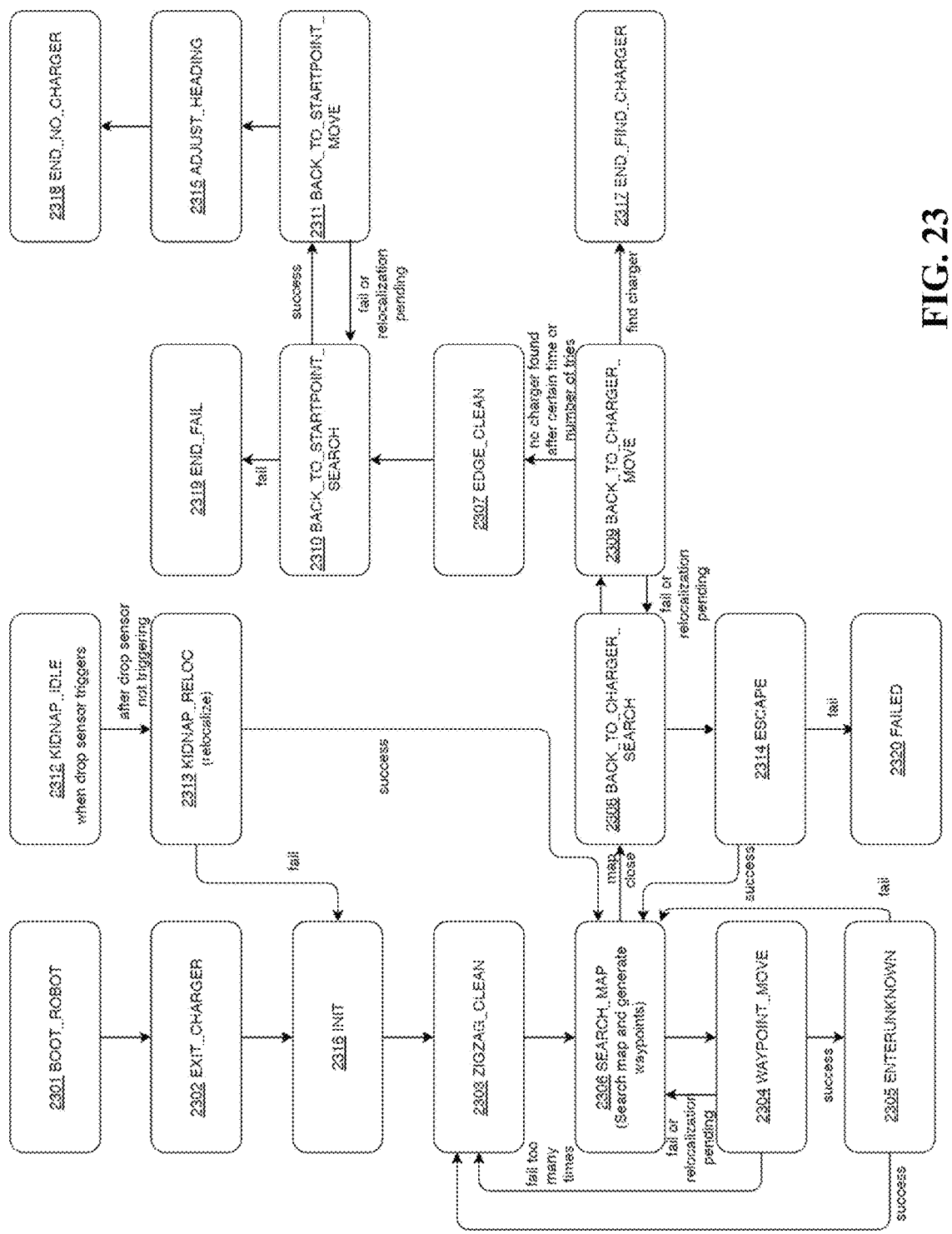
FIG. 23 illustrates an example robot guidance planner for an area coverage application in one implementation.

FIG. 22 illustrates an example area coverage application enabled by a planner 2300 of FIG. 23. In FIG. 22, robot 2202 has been tasked with conducting an area coverage application on area 2200. One or more obstacles 2204 exist within area 2200. Further, area 2200 has a complex shape that is not perfectly rectangular. In FIG. 22, robot 2202 begins at point A and cleans sub-area X according to an area coverage path dictated by a planner state. While embodiments can implement different area coverage paths, a zigzag or back and forth path is depicted by FIG. 22 for illustrative purposes. In order to obtain improved performance, adjacent tracks made by the robot can include an overlap factor. Different applications call for different amounts of overlap, such as for example an overlap of 7% or greater. In another application the overlap is 12% or greater. In a yet further application, the overlap is 15%.

The robot 2202 receives sensory input information about its environment as the robot moves about the area coverage path. The sensory input is used to update an internal 3D map that is used to update an occupancy grid. When the robot 2202 detects an obstacle 2204 based upon updated sensory input received at point B, the robot will refer to the occupancy grid to find one or more sub-areas of area 2200 that have not been covered. In the scenario illustrated by FIG. 22, the robot 2202 will find a sub-area Y and a sub-area Z. When multiple sub-areas exist, such as in the scenario illustrated, the robot is able to choose which one to pursue first based upon an opportunity size determination. Information from the robot's sensors is continuously updated and reflected in the 3D map and occupancy grid that enable the robot to determine an approximate size for each of the sub-areas.

Figure 27A:
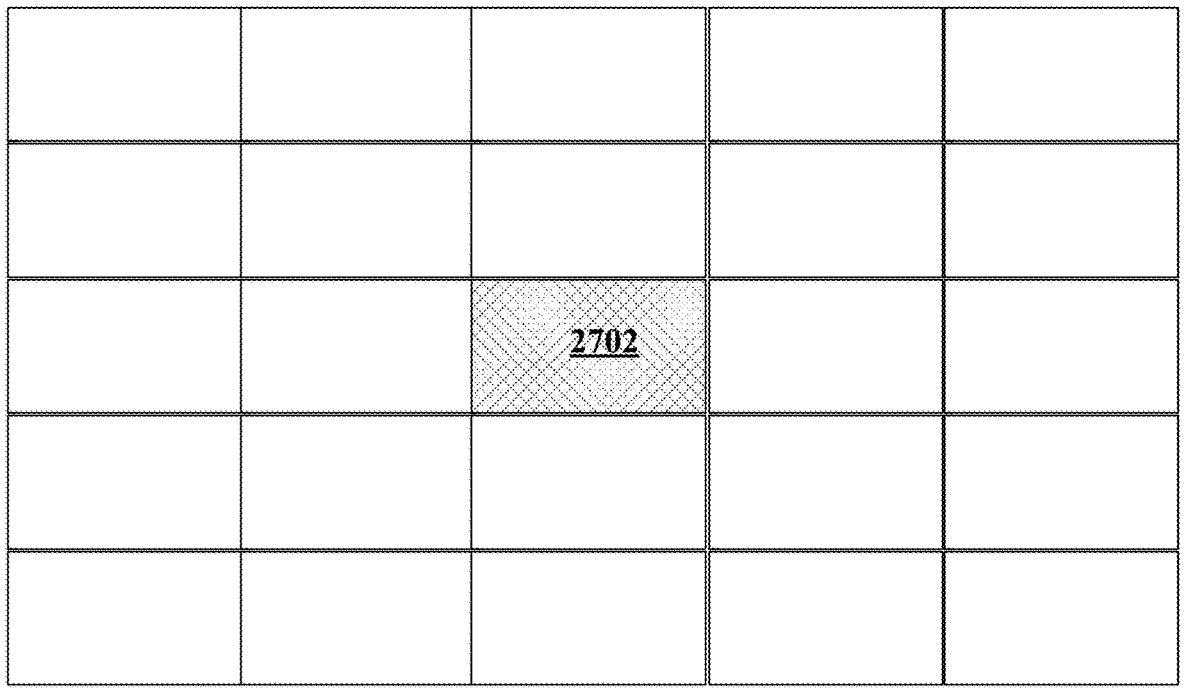
FIG. 27A illustrates an example collision map for an area coverage application in one implementation.
Figure 27B:
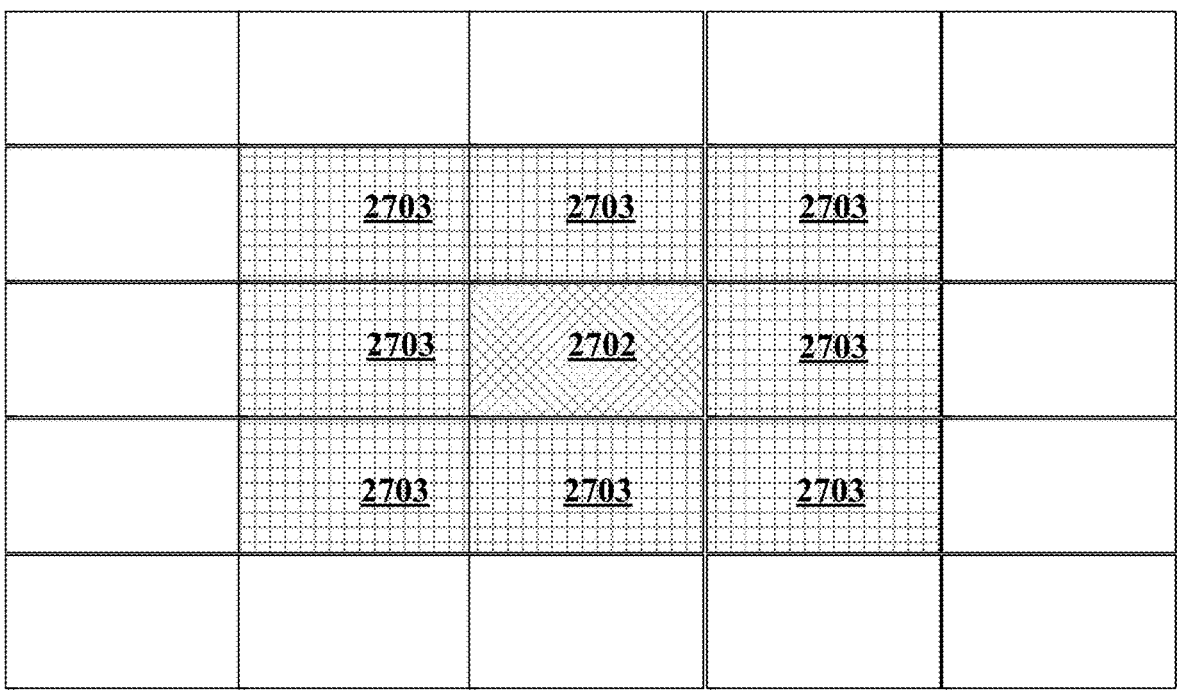
FIG. 27B illustrates another example collision map for an area coverage application in one implementation.

Selecting an Unknown Area to Process Next:

The planner can choose from among the sub-areas by for example using the approximate size of the sub-area to select which opportunity to pursue next. When two or more unknown space candidates are found in the occupancy grid map, the planner can select a preferred candidate using an optimized greedy selection. A planner can determine for each unknown space candidate that the unknown space candidate is accessible via an entrance having a size large enough to permit the robot to pass through. For example, one criterion is whether an entrance has a size larger than four times a cell size for cells in an occupancy grid map. Taking an example robot implementation having a 33 cm. lengthwise dimension and a cell size of 10 cm., four times the cell size (40 cm.) for cells in the occupancy grid map provides entrance that is at least 40 cm. and at least 50 cm. for a larger cell size. Candidate unknown spaces having entrances too small to accommodate the robot can be marked inaccessible. The planner can further determine for two or greater unknown space candidates, which unknown space is closer to the robot, and weight the closer one more favorably. Further, the planner can determine for at least one unknown space candidate that the robot can find a way to the at least one unknown space candidate using a collision map. The planner initiates generating the collision map based upon the occupancy grid map with an adjustable collision radius. Preferably, the adjustable collision radius is set large enough to permit the robot to bypass obstacles in the occupancy grid without colliding, as will be described in further detail herein below with reference to FIGS. 27A and 27B. FIG. 27A illustrates an example collision map 2700 for an area coverage application in one implementation. Collision map 2700 is generated by planner to determine a "safe" path around an obstacle 2702 that lies at the center cell of the collision map 2700. When finding a path about an obstacle, the planner can build the collision map 2700 with cells representing the cell size in the occupancy grid and plot known obstacles in the collision map. Now with reference to FIG. 27B, illustrating again collision map 2700 and obstacle 2702 at the center cell. Here, the planner has set an adjustable collision radius to 1 cell and marked all cells 2703 that fall within the collision radius (1 cell) and surround obstacle 2702 as obstacles as well. The planner can now determine waypoints to move the robot through the collision map and that do not fall within any of cells 2703, thereby avoiding collision with obstacle 2702 in one implementation.

With renewed reference to FIG. 22, robot 2202 selects sub-area Y to pursue next. Accordingly, the planner 2300 executes a planner waypoint move (line B-C) to move the robot to point C. Next the planner 2300 executes a planner zigzag pattern in order to initiate covering sub-area Y. When the robot 2202 detects that it has completed an operation for sub-area Y based upon updated sensory input received at point D, the robot will refer to the occupancy grid to find one or more sub-areas of area 2200 that have not been covered. If another sub-area z is present, the planner 2300 will select sub-area Z by making an opportunity size determination whether it is the opportunity to pursue next. If robot 2202 selects sub-area Z to pursue next, the planner 2300 executes a planner waypoint move (line D-E) to move the robot to point E. Then the planner 2300 executes a planner zigzag pattern in order to initiate covering sub-area Z.

Entering an Unknown Area to Process Next:

In the illustrated example, the robot 2202 has determined that unknown area Z is the next one to travel to and the planner moves the robot to the first waypoint E by moving the robot along the set of waypoints to the unknown space candidate Z. The planner initiates a process that updating the occupancy grid map with sensory input captured upon relocating to the unknown space candidate Z. When moving forward to enter the unknown space Z, when no collision occurs the robot will initiate processing the unknown space according to the area coverage application for which it was tasked. Otherwise, when a collision occurs, the planner commands the robot to move following a wall until the robot enters the unknown space. When the robot cannot enter the unknown space within a specified certain distance, searching for another unknown space candidate.

When robot 2202 sets out to process a new unknown space it will determine the coverage pattern for an unknown space. This coverage path can be oriented in the same directions as the coverage paths of areas already processed or it can be oriented in a different direction than a coverage pattern used by the robot while performing the area coverage task. When determining the coverage pattern to use for a new unknown space, one planner implementation triggers a zigzag or back-and-forth pattern in at most 2 directions. A direction for the zigzag or back-and-forth pattern is determined that causes the robot to move towards an unexplored space. When both sides of an area are unexplored space, the robot 2202 will randomly choose one side. When a current coverage pattern lies inside an area that has already been processed, and known obstacles are present, the planner directs the robot to exit the current coverage pattern and search another unknown area.

In one implementation, the coverage pattern for the robot is aligned to a room using a zigzag or back-and-forth pattern selected to maintain a parallel path to a wall of the room. Such a path can thereby reduce a likelihood of the robot colliding with the wall. In one implementation, the camera is used for room alignment. The implementation projects the image from the camera into a plane parallel to the ground, finds the majority of lines' orientation from the projected image and rotates the robot to make it orthogonal to the lines.

One implementation achieves guiding the robot parallel to a wall by commanding the robot according to a path to the charging station along an edge (e.g., wall, edge of a level of the floor, etc.) by determining from the occupancy grid mapping an edge leading to the charging station. A set of waypoints is generated along the path parallel to the edge leading to the charging station and initiating motion to move the robot to the waypoints in the set.

In one implementation, the robot initiates motion to a charging station when no unknown space candidates can be located in the occupancy grid mapping.

State Machine Architecture to Control Behavior and Perform Path Planning

FIG. 23 illustrates an example robot guidance planner for an area coverage application in one implementation. In FIG. 23, planner 2300 can be implemented in a variety of special purpose or general purpose robot platforms to perform planning and control of area coverage applications such as cleaning, safety inspection, measurement and the like. In one embodiment, planner 2300 is comprised of a plurality of states. States are entered from prior states upon detection of appropriate entry trigger conditions. States can initiate various processes to acquire information (sensory inputs, visual inputs, audible inputs, receive information from signals conducted using wired or wireless links, IR links, combinations thereof, etc.), perform tasks, and/or provide other outputs (notifications, audible signals, transmit information signals conducted using wired or wireless links, IR links, speech generators, etc.). Behaviors triggered by planner 2300 can include for example and without limitation, a back and forth (or "zigzag") path for cleaning, a search map, a waypoint move, exploration of a new area, handling of entry into an unknown or previously unexplored area and others in order to target cleaning, inspecting or measuring the entire workspace.

The robot guidance planner is one of the highest level robot planners. A class called robot_status is maintained during the planning. The robot_status class includes all robot running status. It includes pose, tactile sensor readings, IR sensor readings, charge level readings, battery level, current running state, Occupancy grid map (OGM), camera settings information, etc. An OGM is created based on sensor readings, including IR, tactile, camera, wheel, IMU. Different sensors will have different contributions to the OGM; which are used for robot planning. In one implementation, three search map modules, a Search_map (zigzag) (FIG. 23, block 2306), back_to_charger_search (FIG. 23, block 2308), back_to_startpoint search (FIG. 23, block 2310). These searching modules use A* algorithm to generate a path to the target position. The distance to the wall is weighted and added into A* algorithm, which enables the robot to remain far from the wall during way point movement. For further detail about A* algorithm, reference can be had to "A * search algorithm", Wikipedia, last access 6 Nov. 2018, which is incorporated by reference herein in its entirety for all purposes.

The clean robot planner will generate a robot_command, which will be sent to robot_commander for further processing.

A work flow figure and state machine description of a representative implementation are next described using pseudo-code and with reference to FIG. 23.

A. States:
1. BOOT_ROBOT (FIG. 23; block 2301)
    a) Description: Boot the robot, and start from charger.
    b) In State:
        (1) Jump to Exit_Charger
2. EXIT_CHARGER (FIG. 23; block 2302)
    a) Description: Exit charger, go backward for a certain distance.
    b) In State:
        (1) If command completed, jump to PLANNER_INIT
3. PLANNER_ZIGZAG_CLEAN (FIG. 23; block 2303)
    a) Description: Perform zigzag cleaning or other operation.
    b) In State:
        (1) If command completed, jump to PLANNER_SEARCH_MAP
4. PLANNER_WAYPOINT_MOVE (FIG. 23; block 2304)
    a) Description: Perform waypoint move after searching map.
    b) In State:
        (1) If command completed, jump to PLANNER_ENTERUNKNOWN.
        (2) If command failed, jump to PLANNER_SEARCH_MAP.

(3) If command failed time>n(n=2), jump to PLANNER_ZIGZAG_CLEAN
(4) If command pending (triggered relocalization), jump to PLANNER_SEARCH_MAP 5. PLANNER_ENTERUNKNOWN (FIG. 23; block 2305)
   a) Description: Perform enter unknown space.
   b) In State:
   (1) If command completed, jump to PLANNER_ZIGZAG_CLEAN.
   (2) If command failed, jump to PLANNER_SEARCH_MAP.

6. PLANNER_SEARCH_MAP (FIG. 23; block 2306)
   a) Description: Search unknown space from the map, generate waypoints.
   b) In State:
   (1) Filter out noise of the Occupancy Grid Map
   (2) Search map and generate waypoints.
   (3) If find unknown space to clean, jump to PLANNER_WAYPOINT_MOVE, otherwise, jump to PLANNER_BACK_TO_CHARGER_SEARCH 7. PLANNER_EDGE_CLEAN (FIG. 23; block 2307)
   a) Description: Perform edge clean
   b) In State:
   (1) If detected charger, jump to PLANNER_END_FIND_CHARGER
   (2) If timer>edge_clean_max_time_, or command completed jump to PLANNER_BACK_TO_STARTPOINT_SEARCH 8. PLANNER_BACK_TO_CHARGER_SEARCH (FIG. 23; block 2308)
   a) Description: Search map and generate waypoints to charger
   b) In State:
   (1) Filter out noise of the Occupancy Grid Map
   (2) Search map and generate waypoints.
   (3) If find way back, jump to PLANNER_BACK_TO_CHARGER_MOVE, otherwise, jump to PLANNER_ESCAPE 9. PLANNER_BACK_TO_CHARGER_MOVE (FIG. 23; block 2309)
   a) Description: Waypoint move to charger
   b) In State:
   (1) If detected charger, jump to PLANNER_END_FIND_CHARGER
   (2) If command completed, jump to PLANNER_EDGE_CLEAN
   (3) If command failed, jump to PLANNER_BACK_TO_CHARGER_SEARCH
   (4) If command failed timer>n(n=4), jump to PLANNER_EDGE_CLEAN
   (5) If command pending (triggered relocalization), jump to PLANNER_BACK_TO_CHARGER_SEARCH 10. PLANNER_BACK_TO_STARTPOINT_SEARCH (FIG. 23; block 2310)
    a) Description: Search map and generate waypoints to start point
    b) In State:
    (1) Filter out noise of the Occupancy Grid Map
    (2) Search_map and generate waypoints.
    (3) If find way back to start point, jump to PLANNER_BACK_TO_STARTPOINT_MOVE, otherwise, jump to PLANNER_FAILED 11. PLANNER_BACK_TO_STARTPOINT_MOVE (FIG. 23; block 2311)
    a) Description: Waypoint move to start point
    b) In State:
    (1) If command completed, jump to PLANNER_ADJUST_HEADING
    (2) If command failed, jump to PLANNER_BACK_TO_STARTPOINT_SEARCH
    (3) If command failed timer>n(n=4), jump to PLANNER_ADJUST_HEADING
    (4) If command pending (triggered relocalization), jump to PLANNER_BACK_TO_STARTPOINT_SEARCH 12. PLANNER_KIDNAP_IDLE (FIG. 23; block 2312)
    a) Description: Stop when robot is kidnapped.
    b) In State:
    (1) If robot is not kidnapped, jump to PLANNER_KIDNAP_RELOC 13. PLANNER_KIDNAP_RELOC (FIG. 23; block 2313)
    a) Description: rotate and call relocalization,
    b) In State:
    (1) If relocalize successfully, jump to PLANNER_SEARCH_MAP
    (2) If relocalize failed, jump to PLANNER_INIT 14. PLANNER_ESCAPE (FIG. 23; block 2314)
    a) Description: escape from a space surrounded by obstacles.
    b) In State:
    (1) If command completed, jump to PLANNER_SEARCH_MAP
    (2) If command failed, jump to PLANNER_FAILED 15. PLANNER_ADJUST_HEADING (FIG. 23; block 2315)
    a) Description: adjust heading to 0
    (1) If command completed, jump to PLANNER_END_NO_CHARGER 16. PLANNER_INIT (FIG. 23; block 2316)
    a) Description: Initialize clean robot planner.
    b) In State:
    (1) Jump to PLANNER_ZIGZAG_CLEAN 17. PLANNER_END_FIND_CHARGER (FIG. 23; block 2317)
    a) Description: Generate back_to_charger command 18. PLANNER_END_NO_CHARGER (FIG. 23; block 2318)
    a) Description: Planning done without finding charger 19. PLANNER_END_FAIL (FIG. 23; block 2319)
    a) Description: Planning failed and cannot go back to start point or charger 20. PLANNER_FAILED (FIG. 23; block 2320)
    a) Description: Return planner failed.

B. Tunable Params:
1. Kidnap_window_: time window that drop sensor is triggered should be treated as kidnapped.
2. blob_size_: Occupancy Grid Map noise filter, size<blob_size_is marked as noise.
3. Edge_clean_max_time_: max time of edge clean.

Figure 24:
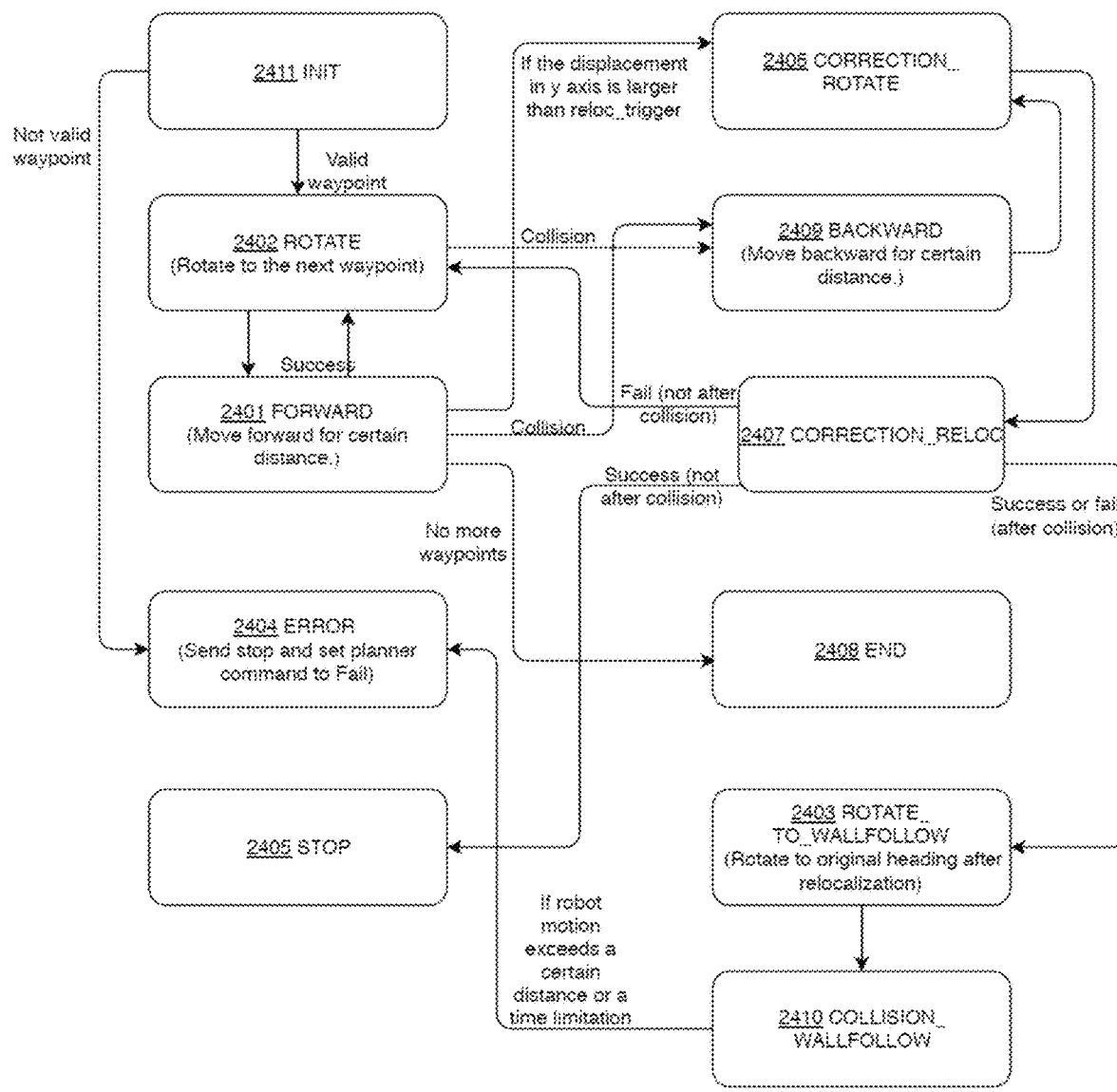
FIG. 24 illustrates an example waypoint commander for an area coverage application in one implementation.

FIG. 24 illustrates an example waypoint commander for an area coverage application in one implementation. In FIG. 24, commander 2400 can be implemented in a variety of special purpose or general purpose robot platforms to perform waypoint planning and control for area coverage applications such as cleaning, safety inspection, measurement and the like. In one embodiment, commander 2400 is comprised of a plurality of states. States are entered from prior states upon detection of appropriate entry trigger conditions. States can initiate various processes to acquire information (sensory inputs, visual inputs, audible inputs, receive information from signals conducted using wired or wireless links, IR links, combinations thereof, etc.), perform tasks, and/or provide other outputs (notifications, audible signals, transmit information signals conducted using wired or wireless links, IR links, speech generators, etc.). Behaviors triggered by planner 2400 can include for example and without limitation, planning and implementing moves between waypoints in order to target cleaning, inspecting or measuring the entire workspace.

The waypoint commander is one of a plurality of mid-level motion commanders. If planner 2300 generates a waypoint follow command with a set of waypoints, the waypoint commander 2400 will receive the command and commence performing movement to the waypoint. During the waypoint movement, if robot's displacement is larger than a predefined threshold, it will trigger relocalization to relocate robot's location in order to improve the pose accuracy. However, waypoint following can fail (e.g., collision) due to pose drift, or change of the environment and map. In such cases, the waypoint commander 2400 will cause the robot to maintain wall following for a certain distance in the event of such failures is detected.

A work flow figure and state machine description of a representative implementation are next described using pseudo-code and with reference to FIG. 24.

Figure 25:
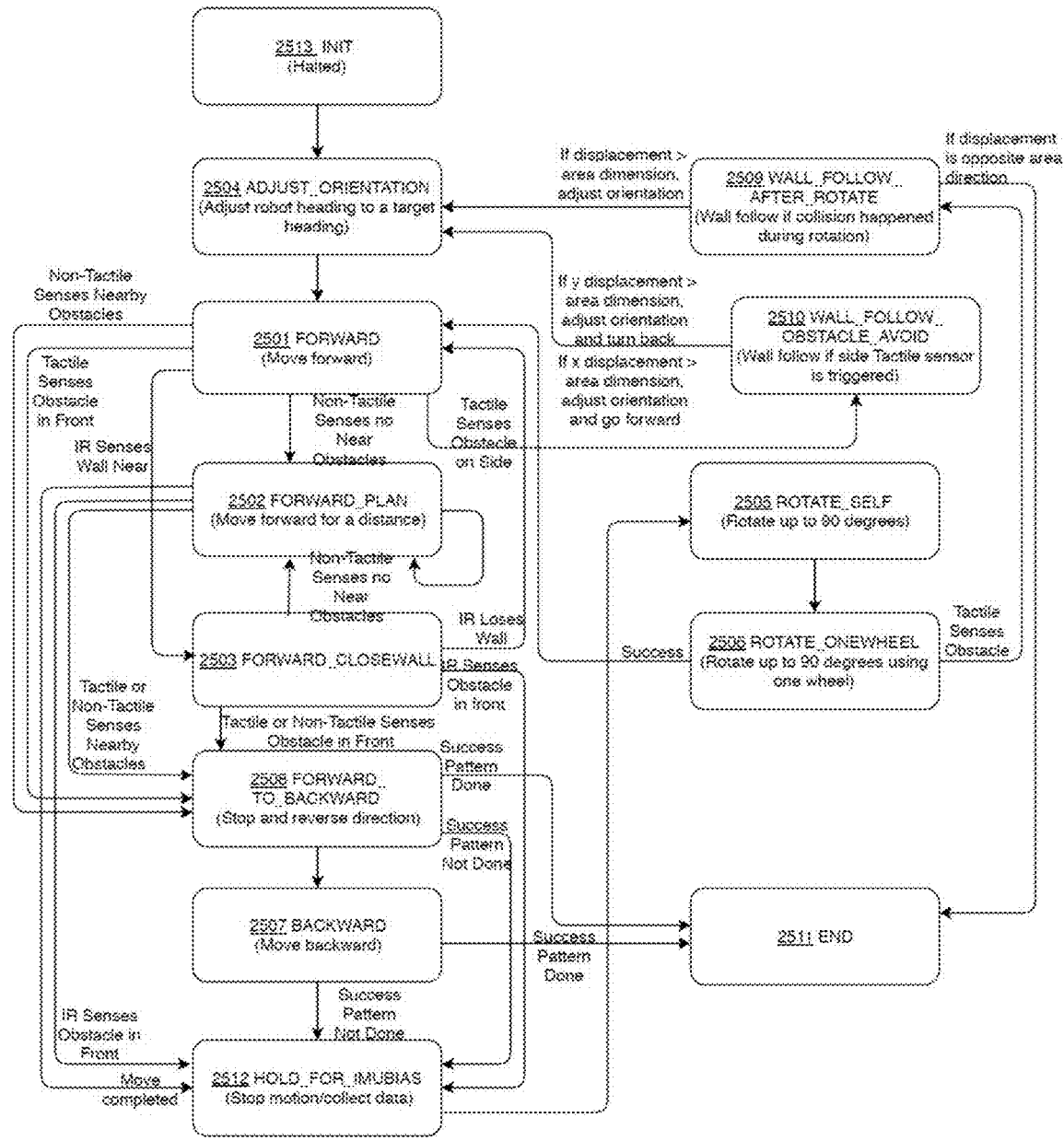
FIG. 25 illustrates an example explore commander for an area coverage application in one implementation.

A. States:
1. WAYPOINT_FORWARD (FIG. 24; block 2401)
   a) Description: Move forward for certain distance.
   b) In State:
      (1) If collision, jump to WAYPOINT_BACKWARD
      (2) If command completed: if finish all the waypoints, jump to WAYPOINT_END, otherwise jump to WAYPOINT_ROTATE
      (3) If the displacement in y axis is larger than reloc_trigger_, jump to WAYPOINT_CORRECTION_ROTATE
2. WAYPOINT_ROTATE (FIG. 24; block 2402)
   a) Description: Rotate to the next waypoint
   b) In State:
      (1) If collision, jump to WAYPOINT_BACKWARD
      (2) If command completed, jump to WAYPOINT_FORWARD
3. WAYPOINT_ROTATE_TO_WALLFOLLOW (FIG. 24; block 2403)
   a) Description: Rotate to original heading after relocalization
   b) In State:
      (1) If command completed, jump to WAYPOINT_COLLISION_WALLFOLLOW
4. WAYPOINT_ERROR (FIG. 24; block 2404)
   a) Description: Waypoint error, send stop and set planner command to Fail.
5. WAYPOINT_STOP (FIG. 24; block 2405)
   a) Description: Waypoint update, relocalization successfully, send stop and set planner command to Pending.
6. WAYPOINT_CORRECTION_ROTATE (FIG. 24; block 2406)
   a) Description: Rotate to certain heading (0, 360 degrees) to get better relocalization performance.
   b) In State:
      (1) If command completed, jump to WAYPOINT_CORRECTION_RELOC
7. WAYPOINT_CORRECTION_RELOC (FIG. 24; block 2407)
   a) Description: Stop and call relocalization
   b) In State:
      (1) If relocalization successfully: if this reloc is called because of collision, perform heuristic correction and jump to WAYPOINT_ROTATE_TO_WALLFOLLOW. Otherwise jump to WAYPOINT_STOP
      (2) If relocalization failed (exceed time limitation): if this reloc is called because of collision, jump to WAYPOINT_ROTATE_TO_WALLFOLLOW. Otherwise jump to WAYPOINT_ROTATE
8. WAYPOINT_END (FIG. 24; block 2408)
   a) Description: Stop and Set planner command to completed
9. WAYPOINT_BACKWARD (FIG. 24; block 2409)
   a) Description: Go backward for certain distance.
   b) In State:
      (1) If command completed, jump to WAYPOINT_CORRECTION_ROTATE
10. WAYPOINT_COLLISION_WALLFOLLOW (FIG. 24; block 2410)
    a) Description: Since collision is not expected during waypoint follow, after collision, wall follow is called to avoid the robot getting trapped somewhere.
    b) In State:
       (1) If robot moves a certain distance or exceed time limitation, jump to WAYPOINT_ERROR
11. INIT (FIG. 24; block 2411)
    a) Description: Init waypoint_follow_reloc_commander
    b) In State:
       (1) If waypoint is invalid, jump to WAYPOINT_ERROR
       (2) Jump to WAYPOINT_ROTATE B. Tunable Params:
1. reloc_trigger_(m): distance in y axis to trigger reloc.
2. time_waited_(m): time limitation for relocalization.
3. wheel_velocity
4. back_distance (m): backward distance after collision FIG. 25 illustrates an example explore commander for an area coverage application in one implementation. In FIG. 25, commander 2500 can be implemented in a variety of special purpose or general purpose robot platforms to perform exploration planning and control for area coverage applications such as cleaning, safety inspection, measurement and the like. In one embodiment, commander 2500 is comprised of a plurality of states. States are entered from prior states upon detection of appropriate entry trigger conditions. States can initiate various processes to acquire information (sensory inputs, visual inputs, audible inputs, receive information from signals conducted using wired or wireless links, IR links, combinations thereof, etc.), perform tasks, and/or provide other outputs (notifications, audible signals, transmit information signals conducted using wired or wireless links, IR links, speech generators, etc.). Behaviors triggered by planner 2500 can include for example and without limitation, exploration of a new area and others in order to target cleaning, inspecting or measuring the entire workspace.

The explore commander is one of a plurality of mid-level motion commanders. If planner 2300 generates a command to perform an area coverage operation using an overlapping rows or "zigzag" pattern, ("zigzag command"), the explore commander 2500 will receive the command and commence performing movement to perform the area coverage operation commanded (e.g., a "zigzag" pattern clean, inspection, survey, etc.).

During the zigzag operation, if the robot detects an obstacle in front via depth sensor/IR, it will trigger a local plan and stop before the obstacle, then turn back. If only one tactile collision sensor (in a typical embodiment there are at least two bumper-like tactile collision sensors) is triggered, the planner will trigger wall follow to go around the obstacle.

A work flow figure and state machine description of a representative implementation are next described using pseudo-code and with reference to FIG. 25. In general, robot will explore the map with zigzag movement. If robot stays in a cleaned area for more than ~10 seconds, it will trigger zigzag end.

A. States:
1. ZIGZAG_FORWARD (FIG. 25; block 2501)
   b) Description: Move Forward.
   c) In State:
      (1) Trigger mapper after moving certain distance.
      (2) If mid bumper or drop sensor is triggered, jump to ZIGZAG_FORWARD_TO_BACKWARD.
      (3) If exploration done (stay in cleaned area for more than ~10 seconds), zigzag_end=true;
      (4) If one side bumper is triggered, jump to ZIGZAG_WALLFOLLOW_OBSTACLE_AVOID.
      (5) If get obstacle from depth camera and the distance is smaller than a threshold, jump to ZIGZAG_FORWARD_TO_BACKWARD.
      (6) If get obstacle from depth camera and the distance is larger than a threshold, jump to ZIGZAG_FORWARD_PLAN.
      (7) If IR is triggered, jump to ZIGZAG_FORWARD_CLOSEWALL.
2. ZIGZAG_FORWARD_PLAN (FIG. 25; block 2502)
   a) Description: Move Forward for a certain distance.
   b) In State:
      (1) If command completed, jump to ZIGZAG_HOLD_FOR_IMUBIAS.
      (2) If mid bumper or drop sensor is triggered, jump to ZIGZAG_FORWARD_TO_BACKWARD.
      (3) If exploration done (stay in cleaned area for more than ~10 seconds), zigzag_end=true;
      (4) If IR the front obstacle, jump to ZIGZAG_HOLD_FOR_IMUBIAS.
      (5) If get obstacle from depth camera and the distance is smaller than a threshold, jump to ZIGZAG_FORWARD_TO_BACKWARD.
      (6) If get obstacle from depth camera and the distance is larger than a threshold, jump to ZIGZAG_FORWARD_PLAN.
3. ZIGZAG_FORWARD_CLOSEWALL (FIG. 25; block 2503)
   a) Description: Move Forward in a lower speed when close to the wall.
   b) In State:
      (1) If mid bumper or drop sensor is triggered, jump to ZIGZAG_FORWARD_TO_BACKWARD.
      (2) If exploration done (stay in cleaned area for more than ~10 seconds), zigzag_end=true;
      (3) If IR detects the front obstacle, jump to ZIGZAG_HOLD_FOR_IMUBIAS.
      (4) If get obstacle from depth camera and the distance is smaller than a threshold, jump to ZIGZAG_FORWARD_TO_BACKWARD.
      (5) If get obstacle from depth camera and the distance is larger than a threshold, jump to ZIGZAG_FORWARD_PLAN.
      (6) If IR detects nothing, jump to ZIGZAG_FORWARD.
4. ZIGZAG_ADJUST_ORIENTATION (FIG. 25; block 2504)
   a) Description: Adjust robot heading to a target heading.
   b) In State:
      (1) If command completed, jump to ZIGZAG_FORWARD.
5. ZIGZAG_ROTATE_SELF (FIG. 25; block 2505)
   a) Description: Rotate up to 90 degrees.
   b) In State:
      (1) If command completed or collision, jump to ZIGZAG_ROTATE_ONEWHEEL.
6. ZIGZAG_ROTATE_ONEWHEEL (FIG. 25; block 2506)
   a) Description: Rotate up to 90 degrees by one wheel.
   b) In State:
      (1) If command completed, jump to ZIGZAG_FORWARD.
      (2) If collision, jump to ZIGZAG_WALLFOLLOW_AFTER_ROTATE.
7. ZIGZAG BACKWARD (FIG. 25; block 2507)
   a) Description: Move backward for a certain distance.
   b) In State:
      (1) If command completed and zigzag_end flag is true, jump to ZIGZAG_END.
      (2) if command completed and zigzag_end flag is false, jump to ZIGZAG_HOLD_FOR_IMUBIAS
8. ZIGZAG_FORWARD_TO_BACKWARD (FIG. 25; block 2508)
   a) Description: A stop between forward and backward.
   b) In State:
      (1) If command completed and zigzag_end flag is true, jump to ZIGZAG_END.
      (2) if command completed and zigzag_end flag is false, jump to ZIGZAG_HOLD_FOR_IMUBIAS 9. ZIGZAG_WALLFOLLOW_AFTER_ROTATE (FIG. 25; block 2509)
   a) Description: Wall follow if collision happened during rotation.
   b) In State:
      (1) If displacement in y axis is larger than clean_size_, jump to ZIGZAG_ADJUST_ORIENTATION.
      (2) If the displacement is opposite with zigzag direction, zigzag_end=true;
10. ZIGZAG_WALLFOLLOW_OBSTACLE_AVOID (FIG. 25; block 2510)
    a) Description: Wall follow if one side bumper is triggered during forward movement.
    b) In State:
       (1) If displacement in y axis is larger than clean_size_, jump to ZIGZAG_ADJUST_ORIENTATION and turn back.
       (2) If displacement in x axis is larger than clean_size_with the same heading, jump to ZIGZAG_ADJUST_ORIENTATION and keep moving forward.
11. ZIGZAG_END (FIG. 25; block 2511)
    a) Description: Stop and generate planner command completed
12. ZIGZAG_HOLD_FOR_IMUBIAS (FIG. 25; block 2512)
    a) Description: Stop the robot for imu to collect data.
    b) In State:
       (1) If stop time>imu_pause_, jump to ZIGZAG_ROTATE_SELF.
13. INIT (FIG. 25; block 2513)
    a) Description: Initialize Zigzag Explore Commander.
    b) In State:
       (1) Jump to ZIGZAG_ADJUST_ORIENTATION.

B. Tunable Params:
1. mapper_trigger_distance_(m): distance to trigger mapping.
2. distance_to_obstacle_(m): minimal distance to front obstacle. If the distance is smaller than it, the robot should stop and turn back. (Used for stereo camera with depth obstacle avoidance)
3. Clean_size_(m): horizontal move distance for each zigzag.
4. Imu_pause_(ms): imu pause time. (For IMU estimating static bias)
5. wheel_velocity (rad/s): rotational velocity of the wheel.
6. back_distance (m): backward distance after collision.

Figure 26:
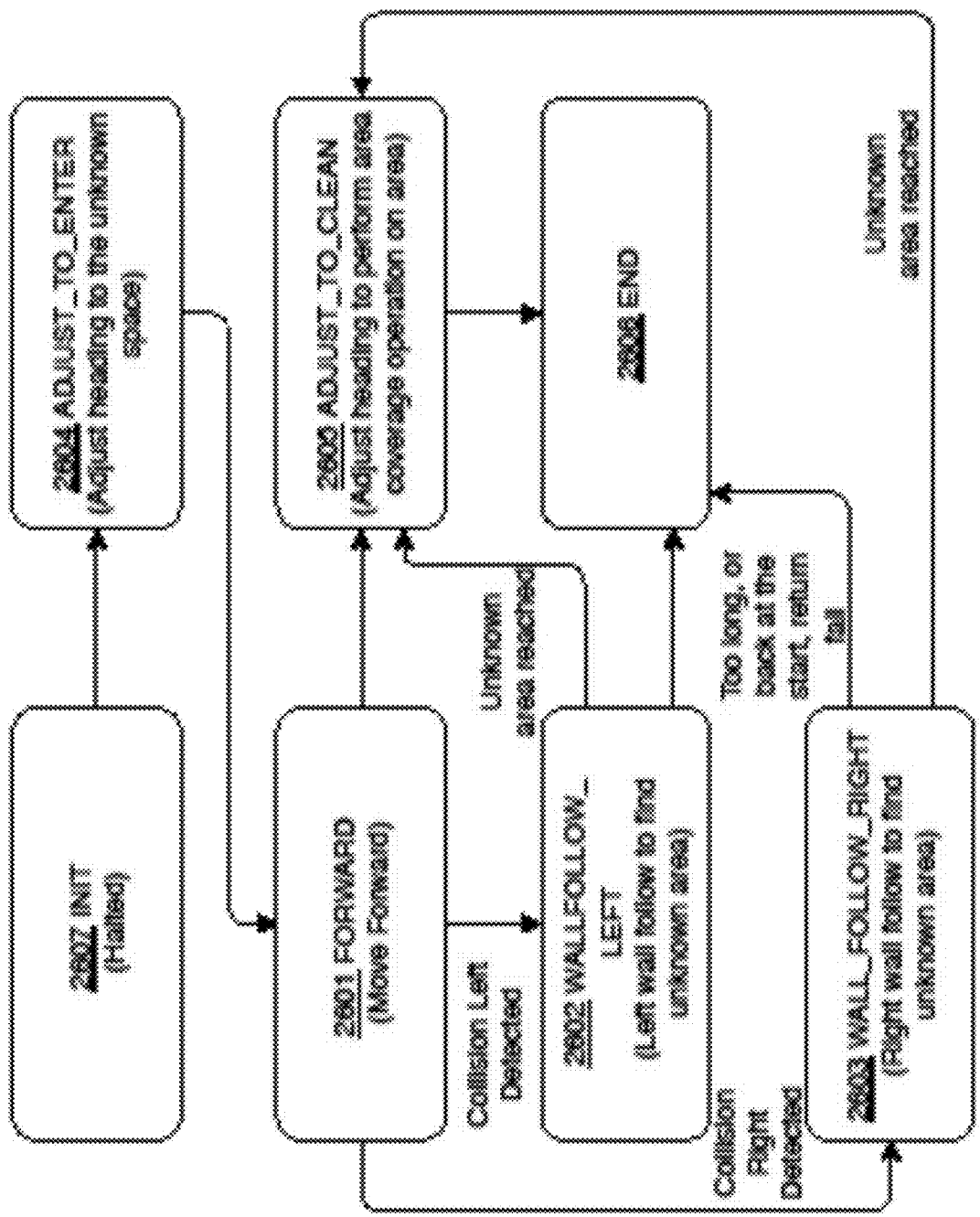
FIG. 26 illustrates an example unknown space commander for an area coverage application in one implementation.

FIG. 26 illustrates an example unknown space commander for an area coverage application in one implementation. In FIG. 26, commander 2600 can be implemented in a variety of special purpose or general purpose robot platforms to perform exploration planning and control for area coverage applications such as cleaning, safety inspection, measurement and the like. In one embodiment, commander 2600 is comprised of a plurality of states. States are entered from prior states upon detection of appropriate entry trigger conditions. States can initiate various processes to acquire information (sensory inputs, visual inputs, audible inputs, receive information from signals conducted using wired or wireless links, IR links, combinations thereof, etc.), perform tasks, and/or provide other outputs (notifications, audible signals, transmit information signals conducted using wired or wireless links, IR links, speech generators, etc.). Behaviors triggered by planner 2600 can include for example and without limitation, handling of entry into an unknown or previously unexplored area and others in order to target cleaning, inspecting or measuring the entire workspace.

The Enter Unknown Commander is one of a plurality of mid-level motion commanders. It will control robot enter an unknown (e.g., uncleaned, unexplored, or unprocessed) space, and adjust headings to initiate an area coverage process (e.g., a zigzag clean, inspection, etc.). However, such activities can fail (e.g., collision) due to the unknown space having obstacles, or change of the environment and map. In such cases, the unknown space commander 2600 will cause the robot to maintain wall following for a certain distance in the event of such failures is detected.

A work flow figure and state machine description of a representative implementation are next described with reference to FIG. 26.

A. States:
1. ENTER FORWARD (FIG. 26; block 2601)
   a) Description: Move forward for certain distance.
   b) In State:
      (1) If command completed, jump to ENTER_ADJUST_TO_ENTER
      (2) If collision, jump to ENTER_WALLFOLLOW_LEFT/ENTER_WALLFOLLOW_RIGHT based on the triggered bumper.
2. ENTER_WALLFOLLOW_LEFT (FIG. 26; block 2602)
   a) Description: Left wall follow to find unknown area.
   b) In State:
      (1) If reach unknown area, jump to ENTER_ADJUST_TO_CLEAN
      (2) If go back to the start point or stay in the wallfollow left for too long, jump to ENTER_END, and set planner_command to FAIL.
3. ENTER_WALLFOLLOW_RIGHT (FIG. 26; block 2603)
   a) Description: right wall follow to find unknown area.
   b) In State:
      (1) If reach unknown area, jump to ENTER_ADJUST_TO_CLEAN
      (2) If go back to the start point or stay in the wallfollow right for too long, jump to ENTER_END, and set planner_command to FAIL.
4. ENTER_ADJUST_TO_ENTER (FIG. 26; block 2604)
   a) Description: adjust heading to the unknown space
   b) In State:
      (1) If command completed, jump to ENTER_FORWARD
5. ENTER_ADJUST_TO_CLEAN (FIG. 26; block 2605)
   a) Description: adjust heading to the clean heading.
   b) In State:
      (1) If command completed, jump to ENTER_END, and set planner_command to Completed.
6. ENTER_END (FIG. 26; block 2606)
   a) Description: Stop 7. INIT (FIG. 26; block 2607)
   a) Description: Init enter unknown commander.
   b) In State:
      (1) Jump to ENTER_ADJUST_TO_ENTER
B. Tunable Params:
   1. Wheel_velocity (rad/s): rotational velocity of the wheel.
   2. forward_distance (m): Forward distance.

An Edge follow commander is one of the plurality of mid-level motion commanders. The Edge follow commander will trigger wall following and end when the robot returns to the start point.

An Escape commander is also one of the mid-level motion commanders. The Escape commander will be invoked once the planning has failed or the robot is stuck. The Escape commander includes wall follow and random walk modes. It ends when the robot finds where it is or explores a new area to be covered.

A Motion commander is the low level robot motion controller. The motion commander includes a move commander (e.g., move forward and backward), a rotate commander (one wheel rotate, two wheels rotate) and a wall follow commander. The move commander and rotate commander is using proportional-integral-derivative (PID) to control the robot. Wall follow controls the robot based on sensor readings. It will first align the robot to the wall and control the robot move along the wall.

Processes

Figure 20:
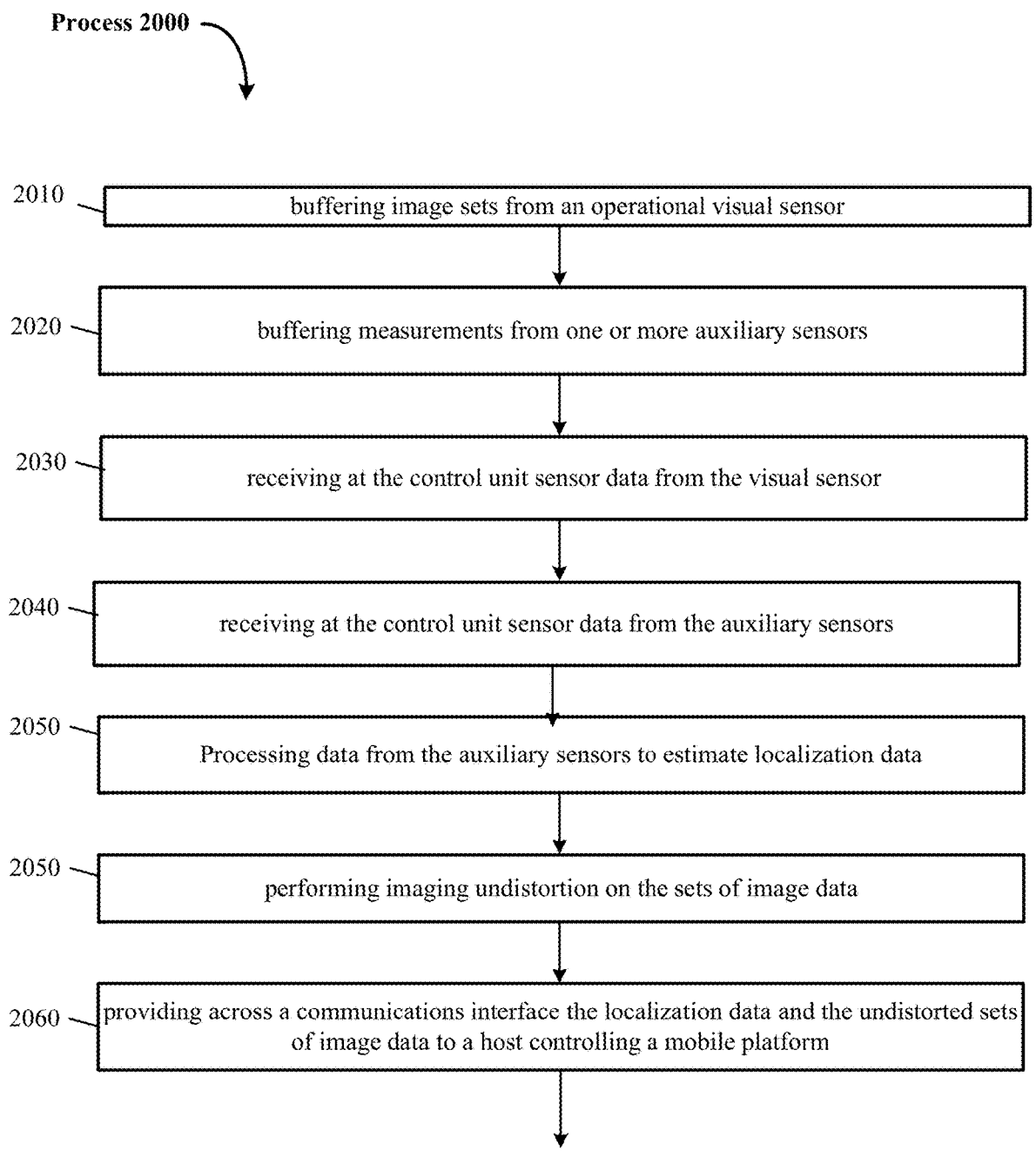
FIG. 20 is a representative method of guiding a mobile device using information from a camera and one or more auxiliary sensors.

FIG. 20 is a representative method 2000 of guiding a mobile device using information from a camera with distance calculation and from the auxiliary sensors. Flowchart 2000 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 20. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, VR/AR implementation, etc.

FIG. 20 includes process 2000 that begins at action 2010, where image sets from a visual sensor are buffered. In some implementations, image sets are received from a visual sensor. The visual sensor is disposed on a mobile platform, such as a robot, autonomous vehicle, or other autonomous or guided mobile platform.

Process 2000 continues at action 2020 where measurements from auxiliary sensors are buffered. The auxiliary sensors can be collocated with the visual sensor or can be disposed at an offset thereto.

At action 2030, the sets of image data are received at a Control Unit. In an embodiment where a depth sensor is used as an auxiliary sensor, a depth map is also received at the Control Unit.

At action 2040, the sets of sensor data from the auxiliary sensors are received at the Control Unit.

At action 2050, the sets of sensor data from the auxiliary sensors are processed to estimate localization data. Inertial data from the multi-axis IMU are timestamped, corrected for bias, scaled using a stored scale factor the corrected inertial data, and then corrected for misalignment in the IMU to form localization data. Odometry data from the WOU are timestamped, adjusted for slippage, and then scaled using a stored scale factor the corrected odometry to form localization data.

At action 2050, imaging undistortion is performed on the sets of image data.

At action 2060, the localization data and the undistorted sets of image data are provided across a communications interface to a host controlling a mobile platform.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Figure 21:
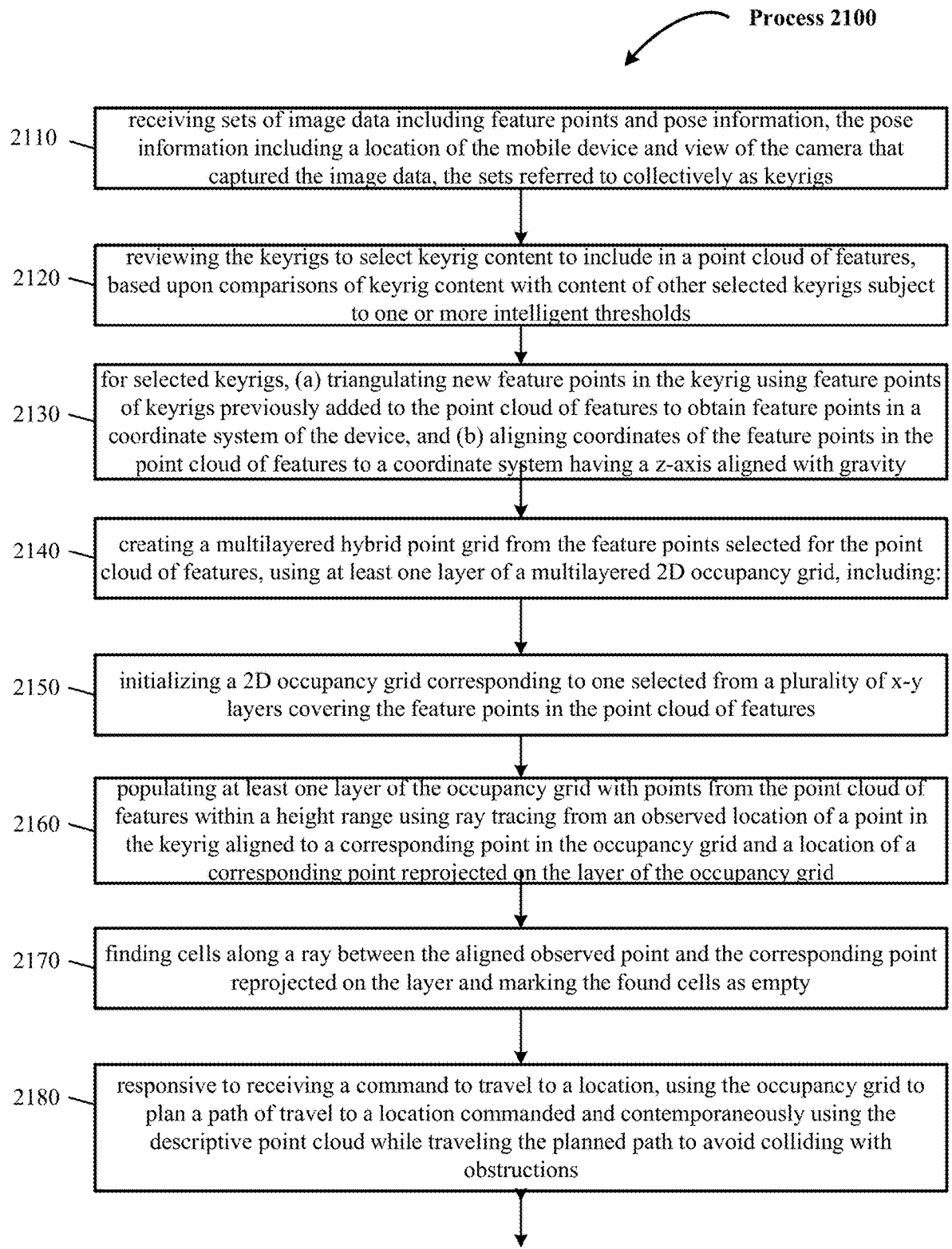
FIG. 21 is a representative method of using a hybrid point grid to guide a mobile device that includes a camera and one or more auxiliary sensors.

FIG. 21 is a representative method 2100 of using a hybrid point grid to guide a mobile device that includes a camera with distance calculation and one or more auxiliary sensors. Flowchart 2100 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 21. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, VR/AR implementation, etc.

FIG. 21 includes process 2100 that begins at action 2110, where sets of image data are received. In some implementations, the sets of image data include feature points and pose information. The pose information includes a location of the mobile device and view of the camera that captured the image data. The sets of image data are referred to collectively as keyrigs.

Process 2100 continues at action 2120 where the keyrigs are reviewed to select keyrig content to include in a point cloud of features, based upon comparisons of keyrig content with content of other selected keyrigs subject to one or more intelligent thresholds. As used herein, intelligent thresholds includes a threshold that is adaptively adjusted based upon device movement, sensor readings, situational or environmental variables (e.g., low light, fog, bright light, and so forth) or combinations thereof.

At action 2130, for selected keyrigs, (a) new feature points in the keyrig are triangulated using feature points of keyrigs previously added to the point cloud of features to obtain feature points in a coordinate system of the device, and (b) coordinates of the feature points in the point cloud of features are aligned to a coordinate system having a z-axis aligned with gravity.

At action 2140, a multilayered hybrid point grid is created from the feature points selected for the point cloud of features, using at least one layer of a multilayered 2D occupancy grid by the following:

At action 2150, a 2D occupancy grid corresponding to one selected from a plurality of x-y layers covering the feature points in the point cloud of features is initialized.

At action 2160, at least one layer of the occupancy grid is populated with points from the point cloud of features within a height range using ray tracing from an observed location of a point in the keyrig aligned to a corresponding point in the occupancy grid and a location of a corresponding point reprojected on the layer of the occupancy grid.

At action 2170, cells along a ray between the aligned observed point and the corresponding point reprojected on the layer are found and the found cells are marked as empty.

At action 2180, responsive to receiving a command to travel to a location, the occupancy grid is used to plan a path of travel to a location commanded and contemporaneously the descriptive point cloud is used while traveling the planned path to avoid colliding with obstructions.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

CONCLUSION AND ADDITIONAL IMPLEMENTATIONS

We describe a system and various implementations for guiding a mobile device using information from one or more camera and one or more auxiliary sensors, e.g. multi-axis inertial measuring unit (IMU), wheel odometry unit (WOU), depth sensor, etc.

Some particular implementations and features are described in the following discussion.

In one implementation, described is a system that guides a mobile platform across areas in different maps while conducting an area coverage application. The robot includes a mobile platform having disposed thereon a sensory interface coupling to one or more sensors including at least some visual sensors and at least some inertial sensors, wherein the one or more sensors are configured to sense one or more of position, motion or environment of the mobile platform. Visual sensors include at least one working camera. Inertial sensors can include a multi-axis inertial measuring unit (IMU). Other sensors, such as wheel odometry units (WOU), depth sensors, tactile and non-tactile sensors can also be implemented by some robot applications. The robot includes a processor(s) coupled to the sensory interface and the mobile platform to provide guidance and control. The processor(s) is/are further coupled to a computer readable storage medium storing computer instructions configured for performing actions and tasks including searching in a plurality of maps for a shared view map point using a current frame image to locate in a global database of features populated with features from the sets of 2D feature points located using image information from the visual sensors, features corresponding to 2D feature points of the current frame is also contemplated.

When candidate frames having corresponding 2D feature points in the database are not in a current map of an area on which an area coverage operation is to be conducted, computer instructions configured to perform operations including storing the feature in the current map and using the feature's position in one or more other maps of the plurality of maps to determine a 3D-3D correspondence between feature points in the current map and corresponding feature points in at least one of the plurality of maps; using correspondences between feature points in the current map and corresponding feature points in at least one of the plurality of maps, determine a relationship including translation and rotation between areas covered by each map; and using the relationship, merging the current map into the at least one of the plurality of maps to form an updated map.

In some implementations, the system provides maintaining a set of time dependent tracking states that include: (i) a pose including at least values for (x, y, and theta) for the mobile platform, and (ii) one or more frames of sensor readings including at least some frames from visual sensors wherein at least some frames include sets of 2D feature points located using image information from the visual sensors. A frame of sensor readings can include sensory information received from any one of a plurality of sensors available to the mobile platform.

The computer instructions are further configured to perform creating a 2D feature correspondences set comprising of common 2D feature points among the at least some frames from visual sensors. The computer instructions are further configured to perform triangulating 2D feature points from the 2D feature correspondences set to form a 3D point set indicating a 3D position of features.

The computer instructions are further configured to perform selecting for each camera pose, a subset of the 3D point set that includes 3D points having errors within a threshold; updating current poses for at least two tracking states within the set of time dependent tracking states subject to a criterion including reduction of a total of errors of the 3D points; and guiding the mobile platform using the updated current poses determined for that at least two tracking states.

In some implementations, the system provides updating current poses for at least two tracking states including reduction of a total errors in map points includes determining a minimum value for errors. One implementation includes minimizing the error of map points and each camera pose subject to a minimization function:

$$\frac{1}{j}\sum_{n=1}^{j}|q_{j_{image}} - P(R, T)p_{j_{map}}| + \alpha\sum_{n=1}^{k}|\delta x_{wheel_k} - \delta x_{RT_k}| +$$

$$\beta\sum_{n=1}^{k}|\delta y_{wheel_k} - \delta y_{RT_k}| + \gamma\sum_{n=1}^{k}|\delta\theta_{wheel_k} - \delta\theta_{RT_k}|$$

Wherein, q is the pixel location(x,y) in image coordinates, P (R, T) is a 3D coordinate transform matrix which transforms pjmap (3D map points in map coordinates) to 2D image coordinate. R stands for rotation, T stands for translation. In an implementation, the pose is calculated based on 2D constraint. The recovered pose is 2d format. (x, y, theta).

In some implementations, the system provides triangulating further includes selecting 3D points having a triangulation error less than a determined number of pixels.

In some implementations, the system provides adjusting a threshold for selecting 3d points to control propagation based upon a quantity of 3D points available to update poses in the set of time dependent tracking states.

In some implementations, the system provides for performing dynamically determining a window size including a number of tracking states in the set of time dependent tracking states by maintaining a fixed manageable window size depending upon a parameter of at least one sensor.

In some implementations, the system provides for performing keeping the window size to be 30 frames for a 30 Hz camera.

In some implementations, the system provides configured for performing dynamically determining a window size including a number of tracking states in the set of time dependent tracking states by maintaining a range of time spanning using the window size determined. In some implementations, the system provides for performing, keeping frames for 1 sec.

In some implementations, the system provides for performing dynamically determining a window size including a number of tracking states in the set of time dependent tracking states by maintaining a manageable number of 3D points. In some implementations, the system provides for performing maintaining a number of 3D points in tracking states using a window size of less than 200.

In some implementations, the system provides for performing refining 3D points using a least squares function.

In some implementations, the system provides performing synchronizing time associated with at least one of the a set of time dependent tracking states with a time maintained by a controller unit controlling the mobile platform, by updating the time associated with the time associated with at least one of the a set of time dependent tracking states by (i) a constant offset and (ii) a transfer delay.

In some implementations, the system provides a motion detector, wherein the processor is further configured for performing: tracking a set of inertial readings from the motion detector; computing a variance for each dimension of a total of 3 dimensions of the set of inertial readings; determining whether the mobile platform is moving or at rest based upon the variance computed; and whenever the mobile platform is determined to be moving, performing extended Kalman filtering on the set of time dependent tracking states to determine pose information from the set of time dependent tracking states and whenever the mobile platform is determined to be static providing a computed pose whenever the mobile platform is determined to be at rest; wherein the computed pose is determined by selectively performing at least one of: (i) propagating a zero velocity applied to location information of the pose and change orientation information of the mobile platform using information obtained from a gyroscopic sensor; and (ii) adding a noise factor to a previous pose.

In some implementations, the system provides for performing: detecting a number of IMU updates occurring after a successful image update; and switching to gyroscopic sensor propagation after N consecutive IMU updates are detected.

In some implementations, the system provides for performing: detecting when one or more visual sensors has failed or is not updating or is insufficiently updating and whenever one or more visual sensors has failed or is not updating or is insufficiently updating, using the motion detector to control pose estimation. A variance above a threshold indicates a moving platform; and a variance below a threshold indicates a static platform.

In some implementations, the system provides for performing: detecting a number of features in an image; and dynamically adjusting an exposure value of at least one visual sensor whenever a lack of features the image is detected.

In some implementations, the system provides for performing: calculating a location of at least one 2D feature in an image using optical flow; reducing features to features existing along an epipolar line based upon a location calculated and a prediction of a camera pose; checking for similarity between descriptors of the feature and descriptors for a corresponding feature from a previous frame; determining whether number of features through optical flow is less than a number of features detected in a current frame, and whenever the number of features through optical flow is less than a number of features, detecting 2D corner features directly from an image at image regions without features; bin the image spatially, and adjust a number of features in each bin so that the number of features in the bins is balanced.

In some implementations, the system provides for performing: linking features in different images captured at different times by a same camera.

In some implementations, the system provides for performing: correlating unmatched features for a camera, by: collecting a set of features that are not matched to any other features by existing links; collecting a set of available links that are do not match to a feature from the camera in a current time frame; calculating a similarity score between each member in the set of features and each member in the set of available links; wherein similarity between a feature and a link is a best similarity score between a descriptor of the feature and descriptors of features in the link; and when the similarity score is greater than a threshold, adding the feature to the link.

In some implementations, the robot includes a mobile platform having disposed thereon at least one camera and a multi-axis inertial measuring unit (IMU). Other sensors, such as wheel odometry units (WOU), depth sensors, tactile and non-tactile sensors can also be implemented by some robot applications. An interface to a host includes one or more processors coupled to memory storing computer instructions to correct at least some estimated poses and locations of at least some 3D points that define a map. The map is used to provide an occupancy grid mapping that provides guidance to the mobile platform that includes the camera with distance calculation and the multi-axis inertial measuring unit (IMU). The computer instructions, when executed on the processors, implement actions comprising: detecting by a sensory input from a set of sensors including at least one non-tactile sensor being monitored while performing the area coverage task, a presence of an obstacle in the robot's path. The system also conducts searching for an unknown space candidate in an occupancy grid mapping generated by the robot using sensory input from the set of sensors. A set of waypoints is generated, including a first waypoint in a path to the unknown space candidate. The processor will then initiate motion to move the robot to the first waypoint.

In some implementations, the system provides a "greedy selection" of unknown areas whenever two or more unknown space candidates are found in the occupancy grid map. The system selects a preferred candidate using an "optimized greedy selection". One implementation of greedy selection includes determining for each unknown space candidate that the unknown space candidate is accessible via an entrance having a size large enough to permit the robot to pass through. In some implementations the entrance having a size large enough to permit the robot to pass through comprises an entrance having a size larger than four times a cell size for cells in an occupancy grid map. In some implementations four times a cell size for cells in the occupancy grid map is at least 40 cm. In some implementations four times a cell size for cells in the occupancy grid map is at least 50 cm.

Greedy selection can further include determining for at least two unknown space candidates, which unknown space is closer to the robot and determining for at least one unknown space candidate that the robot can find a way to the at least one unknown space candidate in a collision map. The collision map is generated based upon an occupancy grid map with an adjustable collision radius. The adjustable collision radius is set large enough to permit the robot to bypass obstacles in the occupancy grid without colliding. In some implementations, setting the collision radius large enough includes the collision map being used in generating the path to a target point, and generated waypoints will be far from obstacles to avoid collision, by generating the collision map as an occupancy grid map; and in the collision map generated, enlarging obstacles in the map by the collision radius, thereby marking as obstacles cells adjacent to an actual obstacle lying within the collision radius. In some implementations the collision radius is at least the size of one cell in the collision map. In some implementations the collision radius in the collision map is at least 40 cm. In some implementations collision radius in the collision map is at least 50 cm.

In some implementations, moving the robot to the first waypoint is implemented by triggering an enter unknown space motion. Triggering can include, for example, moving the robot along the set of waypoints to the unknown space candidate; updating the occupancy grid map with sensory input captured upon relocating to the unknown space candidate; and moving forward to enter the unknown space. When no collision occurs, initiate the robot to process the unknown space. Otherwise, when a collision occurs, command the robot to move following a wall until the robot enters the unknown space, or when the robot cannot enter the unknown space within a specified certain distance, searching for another unknown space candidate.

In some implementations, the area coverage task includes a coverage pattern comprising a zigzag or back-and-forth pattern.

In some implementations, the coverage pattern includes an overlap of at least 7%.

In some implementations, the coverage pattern includes an overlap of at least 12%.

In some implementations, the coverage pattern includes an overlap of at least 15%.

In some implementations, the coverage pattern for an unknown space candidate is oriented in a different direction than a coverage pattern used by the robot while performing the area coverage task.

In some implementations, the system further includes triggering a zigzag or back-and-forth pattern in at most two (2) directions. Some implementations include determining a direction for the zigzag or back-and-forth pattern direction that causes the robot to move towards an unexplored space. When both sides of an area are unexplored space, randomly choose one side. When a current coverage pattern lies inside an area that has already been processed, and known obstacles are present, directing the robot to exit the current coverage pattern and search another unknown area.

In some implementations, the system includes aligning the coverage pattern for the robot to a room using a zigzag or back-and-forth pattern parallel to a wall of the room; thereby reducing a likelihood of the robot colliding with the wall.

In some implementations, the robot initiates motion to a charging station when no unknown space candidates can be located in the occupancy grid mapping.

In some implementations, the system includes moving the robot according to a path to the charging station along an edge by determining from the occupancy grid mapping an edge leading to the charging station; generating a set of waypoints including a first waypoint in a path parallel to the edge leading to the charging station; and initiating motion to move the robot to the first waypoint.

In some implementations, the robot initiates motion to a starting point saved in the occupancy grid mapping when no charging station is found.

In some implementations, the area coverage task includes inspecting a factory floor.

In some implementations, the area coverage task includes cleaning a floor.

In one implementation, described is a system that finding a new area to cover by a robot encountering an unexpected obstacle traversing an area in which the robot is performing an area coverage task. The robot includes a mobile platform having disposed thereon at least one camera and a multi-axis inertial measuring unit (IMU). Other sensors, such as wheel odometry units (WOU), depth sensors, tactile and non-tactile sensors can also be implemented by some robot applications. An interface to a host includes one or more processors coupled to memory storing computer instructions to correct at least some estimated poses and locations of at least some 3D points that define a map. The map is used to provide an occupancy grid mapping that provides guidance to the mobile platform that includes the camera with distance calculation and the multi-axis inertial measuring unit (IMU). The computer instructions, when executed on the processors, implement actions including detecting by a sensory input from a set of sensors including at least one non-tactile sensor being monitored while performing the area coverage task, a presence of an obstacle traversing the robot's path. The system also conducts searching for an unknown space candidate in an occupancy grid mapping generated by the robot using sensory input from the set of sensors. A set of waypoints is generated, including a first waypoint in a path to the unknown space candidate. The processor will then initiate motion to move the robot to the first waypoint.

In some implementations, whenever two or more unknown space candidates are found in the occupancy grid map, the system selects a preferred candidate by determining a projected path for the unexpected obstacle; determining for each unknown space candidates, a likelihood that the unexpected obstacle will traverse unknown space candidates; and selecting from among the unknown space candidates, a preferred candidate having the least likelihood that the unexpected obstacle will traverse. The likelihood that the unexpected obstacle will traverse unknown space candidates is determined from a direction determined for the projected path of the unexpected obstacle and the location of the unknown space candidates in an occupancy grid map. Further, when more than one likely candidate exists, one implementation provides a "greedy selection" of unknown areas whenever two or more unknown space candidates are found in the occupancy grid map.

Other implementations include methods including performing the actions of the system, non-transitory machine readable storage media storing program logic implementing such methods, substituents and components thereof, and devices incorporating any or combinations of the foregoing.

In one implementation, described is an apparatus that guides a mobile device using information from one or more cameras with one or more auxiliary sensors. The apparatus can include a Digital Signal Processor (DSP) that receives image information in frames. In one implementation, images are at least 3 Megabytes (3 MB), arriving from a camera at a rate of at least 30 frames per second (FPS) via an Input/Output (I/O) interface and extracts features from the image information; a feature buffer that includes at least a first bank and a second bank to contain features extracted from the image information; a buffer controller that triggers a notification to consumer processes that features are available in at least one of the first bank and the second bank of the feature buffer; the capability of locking the first bank from further receiving features from the DSP while features from the first bank are being consumed by the consumer processes, once the first bank is filled; and one or more processing cores that executes the consumer processes, including a mapping process that builds a map as a guided vehicle explores and an update process that compares features to the map, and that provides output of one or more of the mapping process and the update process to a guided vehicle. In some implementations, the incoming image size is at least 2 MB. In some implementations, the incoming image size is at least 1 MB. In some implementations, the images may be arriving at the rate of 20 images per second through the Camera Serial Interface (CSI) I/O port.

In some implementations, the buffer controller includes a register to store a memory bank identifier of a currently filled bank and once a bank is filled, a memory bank identifier is written in the register and the buffer controller interrupts a processor; thereby notifying at least one of an update process and a mapping process that there are incoming new features.

In some implementations, the apparatus further includes the capability to clear the memory bank identifier corresponding to a currently filled bank while the DSP is writing to another bank.

In some implementations, the digital signal processor, the feature buffer, the buffer controller, and the one or more processing cores are embodied on a single chip.

In some implementations, the feature buffer includes banks to contain 2-5 KB of feature data per image frame. In some implementations, the feature buffer includes banks to contain 1-10 KB of feature data per image frame.

In some implementations, the apparatus further includes an interface to an inertial measurement unit (IMU) which encodes information from at least one of a gyroscopic sensor, an accelerometer; and wherein a propagation process consumes information from the IMU to prepare a result including a location and a perspective, including view direction, of the camera, referred to collectively as a pose and sends the result to the update process.

In some implementations, the apparatus further includes an interface to a sensor encoding odometry information; and wherein a propagation process consumes the odometry information to prepare a result including a location and a perspective, including view direction, of the camera, referred to collectively as a pose and sends the result to the update process.

In some implementations, the apparatus further includes an interface to a sensor encoding depth information for at least some pixels sensed by a camera; and wherein a propagation process consumes the depth information to prepare a result including a location and a perspective, including view direction, of the camera, referred to collectively as a pose and sends the result to the update process.

Also disclosed is an implementation that includes a method of guiding a mobile unit that includes a visual sensor having at least one operational camera and at least one auxiliary sensor. The auxiliary sensors can be selected from a multi-axis IMU, a wheel odometry sensor, a depth sensor, etc. The method further includes receiving a location of the mobile unit and perspective, including view direction, of a camera, referred to collectively as an initial pose; receiving from an auxiliary sensor, information indicating travel $P_I$ including a rotational portion and a translational portion of movement of the mobile unit; while waiting for a new frame, between successive camera frames, updating the initial pose using information from the auxiliary sensor, to generate a propagated pose; extracting new features from the new frame; matching the new features extracted to retrieved feature points based on (1) reuse of matched features from a previous frame and (2) matching of features in the new frame with reprojected feature positions from a 3D map onto a 2D view from a perspective of the propagated pose, producing a list of matching features; determining a scale factor using information from translational portion of information from the auxiliary sensor and a translational portion of positions of matching features in the list of matching features, wherein a translational portion of positions of matching features describes a difference in perspective from which the new frame was viewed by the camera relative to a previous frame viewed by the camera; calculating a corrected pose $P_m$ using the scale factor applied to at least a magnitude of translational portion of positions of matching features to determine a corrected pose; and providing guidance information based on one or both of the propagated pose and the corrected pose. In some implementations, the method is implemented in a system which includes a processor and a computer readable storage unit storing instructions. In some implementations, the method is implemented in a system which includes a non-transitory computer readable medium to store instructions.

In some implementations, the auxiliary sensor comprises a wheel odometry sensor, the method further including the capability to detect that at least one camera is experiencing impaired visibility, and whenever at least one camera is experiencing impaired visibility, using information from the wheel odometry sensor to determine the corrected pose whenever image information is unusable.

In some implementations, the method further includes the capability to detect that at least one camera is experiencing impaired visibility, and whenever at least one camera experiences impaired visibility, using information from the auxiliary sensor and previous images to determine the corrected pose whenever image information is unusable.

In some implementations, impaired visibility includes diminished light in a spectral area used by the camera.

In some implementations, impaired visibility includes a camera being obstructed.

In some implementations, the auxiliary sensor includes an IMU to determine information indicating travel to $P_I$ including a rotational portion and a translational portion of movement of the mobile unit from IMU information by integrating at least one of linear acceleration and angular velocity.

In some implementations, the auxiliary sensor includes a wheel odometry sensor to determine information indicating travel to $P_I$ including a rotational portion and a translational portion of movement of the mobile unit from odometry information of a rotary encoder coupled to a wheel, from a ratio of a circumference of the wheel to resolution of the rotary encoder.

In some implementations, the method further includes examining a new frame to use a criteria that includes: whether a count of 2D feature points of usable quality meets a threshold; whether a count of triangulated map points between a pairing of a propagated pose with a new image and a pairing of a current pose with an existing image meets a threshold; and to include the new frame that meets the threshold.

In some implementations, the mobile unit includes at least two auxiliary sensors, including a first auxiliary sensor comprising a multi-axis IMU and a second auxiliary sensor selected from (a wheel odometry sensor and a depth sensor). The mobile unit updates the initial pose using information from an IMU, and generates a first propagated pose, while waiting for a new frame, between successive camera frames; extracts new features from the new frame; determines a second propagated pose, updates the initial pose using information from a wheel odometer; determines an error between the first propagated pose and the second propagated pose; minimizes error of a translational portion of first and the second propagated poses and a rotational portion of first and the second propagated poses to find the corrected pose; and uses the corrected pose for guiding a robot.

In some implementations, the minimizing includes receiving an initial translational portion and rotational portion of first and second propagated poses having a first error; determining a new translational portion and rotational portion for first and second propagated poses having a second error; selecting one from the new translational portion and rotational portion and the initial translational portion and rotational portion based upon comparing the second error with the first error as a new initial translational portion and rotational portion of first and second propagated poses; and iteratively repeating the determining and selecting until a translational portion and rotational portion for first and second propagated poses achieves a minimum error criterion.

Further disclosed is an implementation that includes a method of guiding a mobile unit including a visual sensor having at least one operational camera and a depth sensor. The method includes receiving depth information from a depth sensor disposed at a position to sense depth information for features within a field of view of a camera; populating a table of depth values to pixel coordinates to calibrate the depth sensor to the camera; removing from images two dimensional features having no corresponding readings from the depth sensor; using the table of depth values, retrieving corresponding depth values for remaining two dimensional features; obtaining weighted average depth values for each remaining two dimensional feature; and populating a 3D map with remaining two dimensional features using the weighted average depth values; thereby providing a 3D map for guiding a mobile unit.

In some implementations, the method further includes tracking the mobile unit against the 3D map.

In some implementations, the method further includes adding additional poses by performing IMU propagation to obtain a baseline between a latest to-be-added pose and a properly chosen previous pose; and using depth information from the depth sensor to correct depth information for triangulated map points.

In some implementations, the method further includes using the depth information to determine additional 3D map points for 2D feature points which are not triangulated.

Other implementations include methods including performing the actions of the system, non-transitory machine readable storage media storing program logic implementing such methods, substituents and components thereof, and devices incorporating any or combinations of the foregoing.

In some implementations where an IMU is used as an auxiliary sensor, a motion sensor keeps a window of readings from the accelerometer of the IMU. The motion sensor computes the variance of the accelerations in the window of accelerator readings and determines whether the mobile unit is moving or static, based on the calculated variance. A variance greater than a predetermined threshold variance indicates the mobile unit is moving, and propagation is performed by using the EKF method. A variance smaller than a predetermined threshold variance indicates the mobile unit is static and propagation is performed by using the EKF method assuming zero velocity. The predetermined threshold variance can be estimated by various techniques as readily apparent to those skilled in the art.

In some implementations where an IMU is used as an auxiliary sensor, the image update from the camera in the mobile unit with one operational camera can fail due to a blurred image captured due to fast motion of the mobile unit, poor illumination in the surrounding environment, camera's viewpoint is being blocked by an object, etc. Also, there can be a significant number of IMU propagations between two successful image update. After a certain number of consecutive image update failures, propagation is performed by using the EKF method on the gyroscope reading of the IMU. Propagation based on the on the gyroscope reading of the IMU predicts a propagated pose by assuming the mobile unit is rotating in place.

In some implementations, the tracking can be entirely mapless by keeping a window of image frames during the tracking process. A 2D-2D feature matching correspondence is maintained by two consecutive image frames in the window of image frames. At any time, a small local map can be reconstructed by triangulating the 2D features.

In some implementations, 2D features matching from two consecutive image frames can be performed by combining corner feature detection and optical flow. Given the set of 2D features detected in the first image at time t-1, the location of each 2D feature in the second image at time t is estimated by using optical flow. If the number of 2D features detected through optical flow in the second image is less than the number of 2D features in the second image. The 2D corner features can be detected by using Eigen values of neighboring pixels or by binning the second image spatially. 2D features can be matched temporally between a first image taken at time t-1 and a second image taken at time t from the same camera by matching the 2D features by optical flow or establishing links between 2D features from consecutive time frames with similar description and location proximity (i.e., within 20 pixels).

In some implementations, if there is more than one operational camera, 2D features can be matched spatially through links. A link is set of 2D features from different cameras with different spatial viewpoints. 2D features can be matched spatially for each camera to existing links by collecting the set of 2D features that are not matched to any existing links (i.e. features that are left out from temporal matching), collecting the set of links that are available to be connected to features from this camera, and calculating the similarity between each available feature and each available link. The similarity between a feature and a link is the best similarity score between the descriptor of this feature and the descriptors of the features in the link. If the similarity score is more than a threshold, match the 2D feature to the link. If the similarity score is less than a threshold, check the similarity score of the 2D feature with another available link. New links can be created by collecting the set of features that are not matched to any existing links (i.e. features that are left out from both temporal matching and spatial matching to existing links), collecting the set of links that are available to be connected to features from the current camera (a link is available when it does not contain a feature from this camera at the current time), and calculating the similarity between each feature and each available link. If the similarity score is more than a threshold, add the available 2D feature to the available link. New links can be created across one or more camera by collecting a set of features that are not matched to any existing links, and calculating the similarity between a pair of 2D features from different.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A system for obtaining position features for guiding a mobile platform, the system including:
    a mobile platform;
    a sensory interface coupled to one or more sensors including at least some visual sensors and at least some inertial sensors, wherein a sensor of the one or more sensors senses one or more of: a position, a motion, or an environment of the mobile platform;
    a database comprising feature point data obtained from sets of feature points identified in frames of images previously obtained by the visual sensors;
    a processor coupled to the sensory interface, the mobile platform, the database, and a non-transitory computer readable storage medium, wherein the non-transitory computer readable storage medium stores computer instructions, which, when executed, cause the processor to guide and control the mobile platform and further cause the processor to:
        determine, based upon a parameter of the one or more sensors, a statistical window of confidence, wherein the statistical window of confidence comprises a threshold number of sensor readings of the one or more sensors per a threshold length of time, wherein the statistical window of confidence provides a predetermined statistical degree of confidence in the sensor readings;
        obtain sensor readings above the statistical degree of confidence using the statistical window of confidence;
        maintain time dependent tracking state data using the sensor readings obtained according to the statistical window of confidence, wherein the time dependent tracking state data includes: (i) 3D coordinate pose data (x, y, and theta) of the mobile platform, and (ii) one or more frames of sensor readings including at least some frames from the visual sensors, and wherein sensor readings can include sensory information received from any one of a plurality of sensors available to the mobile platform;
        create a set of shared 2D features comprising of 2D feature points identified in at least some frames of images obtained from visual sensors; and
        triangulate 2D feature points from the set of shared 2D features thereby forming a 3D point set indicating a 3D position of features;
        calculate a location of at least one 2D feature in a current frame using optical flow;
        identify features existing along an epipolar line based upon the calculated location and a prediction of a camera pose;
        check for similarity between descriptors of an identified feature and descriptors of a corresponding feature from a previous frame;
        determine whether the number of features identified through optical flow is less than a number of corresponding features detected in the current frame, and when the number of features identified through optical flow is less than a number of corresponding features detected in the current frame, detect 2D corner features directly from the current frame at image regions without features; and
        bin the image spatially, and adjusts a number of features in each bin so that the number of features in the bins is balanced.

2. The system of claim 1, wherein the processor: links features in different images captured at different times by a same camera.

3. The system of claim 1, wherein the processor: correlates unmatched features for a camera, by:
    collecting a set of features that are not matched to any other features by existing links;
    collecting a set of available links that do not match a feature from the camera in a current time frame;
    calculating a similarity score between each member in the set of features and each member in the set of available links;
    wherein similarity between a feature and a link is a best similarity score between a descriptor of the feature and descriptors of features in the link; and
    if the similarity score is greater than a threshold, adding the feature to the link.

4. A non-transitory computer readable medium having instructions stored thereon, which, when executed, cause a processor to obtain position features for guiding a mobile platform, including causing the processor to:
    determine, based upon a parameter of one or more sensors, a statistical window of confidence, wherein the statistical window of confidence comprises a threshold number of sensor readings of the one or more sensors per a threshold length of time, wherein the statistical window of confidence provides a predetermined statistical degree of confidence in the sensor readings;
    obtain sensor readings above the statistical degree of confidence using the statistical window of confidence;
    maintain time dependent tracking state data using the sensor readings obtained according to the statistical window of confidence, wherein the time dependent tracking state data includes:
        (i) 3D coordinate pose data (x, y, and theta) of the mobile platform, and (ii) one or more frames of sensor readings including at least some frames from one or more visual sensors, and wherein sensor readings can include sensory information received from any one of a plurality of sensors available to the mobile platform;

create a set of shared 2D features comprising of 2D feature points identified in at least some frames of images obtained from visual sensors;

triangulate 2D feature points from the set of shared 2D features thereby forming a 3D point set indicating a 3D position of features;

calculate a location of at least one 2D feature in a current frame using optical flow;

identify features existing along an epipolar line based upon the calculated location and a prediction of a camera pose;

check for similarity between descriptors of an identified feature and descriptors of a corresponding feature from a previous frame;

determine whether the number of features identified through optical flow is less than a number of corresponding features detected in the current frame, and when the number of features identified through optical flow is less than a number of corresponding features detected in the current frame, detect 2D corner features directly from the current frame at image regions without features; and bin the image spatially, and adjusts a number of features in each bin so that the number of features in the bins is balanced.

5. A method of obtaining position features for guiding a mobile platform, including:

determine, based upon a parameter of one or more sensors, a statistical window of confidence, wherein the statistical window of confidence comprises a threshold number of sensor readings of the one or more sensors per a threshold length of time, wherein the statistical window of confidence provides a predetermined statistical degree of confidence in the sensor readings;

obtain sensor readings above the statistical degree of confidence using the statistical window of confidence;

maintain time dependent tracking state data using the sensor readings obtained according to the statistical window of confidence, wherein the time dependent tracking state data includes:
  (i) 3D coordinate pose data (x, y, and theta) of the mobile platform, and
  (ii) one or more frames of sensor readings including at least some frames from one or more visual sensors, and wherein sensor readings can include sensory information received from any one of a plurality of sensors available to the mobile platform;

create a set of shared 2D features comprising of 2D feature points identified in at least some frames of images obtained from visual sensors;

triangulate 2D feature points from the set of shared 2D features thereby forming a 3D point set indicating a 3D position of features;

calculating a location of at least one 2D feature in a current frame using optical flow;

identifying features existing along an epipolar line based upon the calculated location and a prediction of a camera pose;

checking for similarity between descriptors of an identified feature and descriptors for a corresponding feature from a previous frame;

determining whether the number of features identified through optical flow is less than a number of corresponding features detected in the current frame, and when the number of features identified through optical flow is less than a number of corresponding features detected in the current frame, detecting 2D corner features directly from the current frame at image regions without features; and binning the image spatially and adjusting a number of features in each bin so that the number of features in the bins is balanced.

6. The method of claim 5, further including: linking features in different images captured at different times by a same camera.

7. The method of claim 5, further including:

correlating unmatched features for a camera, by:

collecting a set of features that are not matched to any other features by existing links;

collecting a set of available links that do not match a feature from the camera in a current time frame;

calculating a similarity score between each member in the set of features and each member in the set of available links;

wherein similarity between a feature and a link is a best similarity score between a descriptor of the feature and descriptors of features in the link; and if the similarity score is greater than a threshold, adding the feature to the link.

* * * * *